US012523423B2

(12) United States Patent
Heilskov et al.

(10) Patent No.: US 12,523,423 B2
(45) Date of Patent: Jan. 13, 2026

(54) ENCLOSED MIXED-FLOW GRAIN DRYER

(71) Applicant: Sukup Manufacturing Co., Sheffield, IA (US)

(72) Inventors: Casey Scott Heilskov, Hampton, IA (US); Kerry Hartwig, Iowa Falls, IA (US); Jacob Wernet, Ankeny, IA (US); Ryan Eilertson, Sheffield, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 1079 days.

(21) Appl. No.: 17/519,664

(22) Filed: Nov. 5, 2021

(65) Prior Publication Data

US 2022/0146197 A1 May 12, 2022

Related U.S. Application Data

(60) Provisional application No. 63/112,964, filed on Nov. 12, 2020.

(51) Int. Cl.

*F26B 3/14* (2006.01)
*F26B 17/12* (2006.01)
*F26B 23/00* (2006.01)

(52) U.S. Cl.

CPC .............. *F26B 3/14* (2013.01); *F26B 23/007* (2013.01); *F26B 17/128* (2013.01); *F26B 2200/06* (2013.01)

(58) Field of Classification Search

CPC ........ F26B 3/14; F26B 23/007; F26B 17/128; F26B 2200/06; F26B 17/126; F26B 21/04; F26B 3/02

See application file for complete search history.

(56) References Cited

U.S. PATENT DOCUMENTS 2,245,664 A 6/1941 Gronert
3,053,522 A 9/1962 Applegate
(Continued)

FOREIGN PATENT DOCUMENTS

BY 13728 1/2010
EP 2647935 7/2016
(Continued)

OTHER PUBLICATIONS

Translation FR-2994101-A1 (Year: 2014).*
(Continued)

*Primary Examiner* — Jessica Yuen
(74) *Attorney, Agent, or Firm* — Christopher A. Proskey; BrownWinick Law Firm

(57) ABSTRACT

An improved mixed flow grain dryer is presented having a grain column with upper, middle and lower drying sections. The system includes a set of plenums and ducts configured to move air through the middle and lower drying sections at one or more lower temperatures, recover the air moved through the middle and lower drying sections, and move the recovered air through the upper drying section at a higher temperature. The system is configured to move grain through the upper drying section, then through the middle drying section, then through the lower drying section, while also: moving air of one or more lower temperatures through lower drying section and middle drying section, combining air moved through lower drying section and middle drying section, and moving the combined air through the upper drying section at a higher temperature.

46 Claims, 46 Drawing Sheets

(56) References Cited

U.S. PATENT DOCUMENTS

| | | | |
|---|---|---|---|
| 3,237,315 | A | 3/1966 | Benecke |
| 3,300,873 | A | 1/1967 | Bussell et al. |
| 3,896,562 | A | 7/1975 | Zimmerman |
| 4,125,945 | A | 11/1978 | Westelaken |
| 4,242,806 | A | 1/1981 | McClaren |
| 4,249,891 | A | 2/1981 | Noyes et al. |
| 4,263,722 | A | 4/1981 | Botkins |
| 4,398,356 | A | 8/1983 | Westelaken |
| 4,404,756 | A | 9/1983 | Noyes |
| 4,424,634 | A | 1/1984 | Westelaken |
| 4,502,229 | A | 3/1985 | Kitzman |
| 4,800,653 | A | 1/1989 | Steffen |
| 4,914,834 | A | 4/1990 | Sime |
| 5,046,265 | A | 9/1991 | Kalb |
| 5,228,207 | A | 7/1993 | Michel et al. |
| 5,653,043 | A | 8/1997 | Bestwick |
| 6,122,838 | A | 9/2000 | Bloemendaal |
| 7,818,894 | B2 | 10/2010 | Noyes |
| 9,506,693 | B2 | 11/2016 | Pauling |
| 9,835,375 | B2 | 12/2017 | Bloemendaal |
| 9,863,703 | B2 | 1/2018 | Morrison |
| 9,915,474 | B2 | 3/2018 | Pauling |
| 10,378,820 | B2 | 8/2019 | Heilskov |
| 10,767,926 | B2 | 9/2020 | Heilskov |
| 11,067,337 | B2 | 7/2021 | Heilskov |
| 2006/0123655 | A1 | 6/2006 | Valfioani |
| 2013/0014404 | A1 | 1/2013 | Bloemendaal |
| 2015/0226482 | A1 | 8/2015 | Bloemendaal |
| 2015/0241123 | A1 | 8/2015 | Morrison |
| 2015/0260455 | A1 | 9/2015 | Lallouet |
| 2015/0369537 | A1 | 12/2015 | Meier |
| 2016/0054058 | A1 | 2/2016 | Pauling |
| 2019/0170437 | A1 | 6/2019 | Heilskov |
| 2020/0386476 | A1 | 12/2020 | Heilskov et al. |

FOREIGN PATENT DOCUMENTS

| | | | | |
|---|---|---|---|---|
| FR | 2630621 | A1 * | 11/1989 | |
| FR | 2675569 | A1 * | 10/1992 | ............ F26B 17/122 |
| FR | 2994101 | A1 * | 2/2014 | ............ F26B 17/122 |
| RU | 2183308 | | 6/2002 | |
| RU | 2261404 | | 9/2005 | |
| RU | 80545 | | 2/2009 | |
| SU | 1502924 | | 8/1989 | |

OTHER PUBLICATIONS

Translation FR-2675569-A1 (Year: 1992).*

Translation FR-2630621-A1 (Year: 1989).*

Bonfanti; Bonfanti Cereal Dryer Brochure Jan. 1, 2019.

Strahl; Strahl Range FR Energy Saving Dryer Brochure Jan. 1, 2019.

Cimbria; Dantoaster Dryer Brochure Jan. 1, 2019.

Chief Agri; Continuous Mixed-Flow Dryer Brochure Jan. 1, 2019.

LMM (Law-Marot-Milpro); Grain Dryer PL2B Model Brochure Jan. 1, 2019.

Buhler BmbH; Eco Dry Grain Drying Brochure Jan. 1, 2019.

Grain Handler, "Continuous Mixed Flow Dryers Fan Under Series" www.grainhandler.com, Grain Handler Brochure, 1991(?). 6 pages.

NECO, "The Right Dryer for the Job" "Unsurpassed Grain Quality" Brochure 2015, 6 pages.

SUKUP Grain Dryers Brochure, L1130-012015P, 2015, 12 pages.

Danish Patent and Trademark Office—Search Opinion for Danish Patent Application No. PA 2017 00254 Oct. 17, 2017.

Russian Federal Institute of Industrial Property—Search Report for Application No. 2017112710/06(022285) Apr. 13, 2017.

* cited by examiner

ENCLOSED MIXED-FLOW GRAIN DRYER

CROSS REFERENCE TO RELATED APPLICATIONS

This application claims priority to U.S. Provisional Patent Application 63/112,964, which was filed on Nov. 12, 2020 entitled "ENCLOSED MIXED-FLOW GRAIN DRYER", the entirety of which is hereby fully incorporated by reference herein.

This application is also related to U.S. Patent Publication No. 2020-0386476 titled "BRIDGE REDUCING MIXED-FLOW GRAIN DRYER WITH CROSS-FLOW VACUUM COOL HEAT RECOVERY SYSTEM", which was filed Aug. 11, 2020, the entirety of which is hereby fully incorporated by reference herein.

FIELD OF THE DISCLOSURE

This disclosure relates generally to the grain handling, grain storage and grain conditioning arts. More specifically and without limitation, this disclosure relates to the grain drying arts.

Overview

Grain dryers are old and well known in the art. Grain dryers are commonly used to dry various types of grain, such as corn, wheat, rice, sorghum, and the like, so as to allow the grain to be stored in bulk, such as in a grain bin, tote or other bulk grain storage device, for extended periods of time. If grain is stored in bulk with a moisture content that is too high, the grain will spoil. As such, particular care is taken to ensure that grain that is to be stored does not have too high of a moisture content.

Optimally, drying grain is a particularly complex, difficult and delicate matter. Care must be taken to ensure that the grain is dried enough to have a low enough moisture content to ensure that it does not spoil while being stored. However, it is also undesirable to overly dry grain.

Overly drying grain is wasteful in various ways. Overly drying grain consumes additional and unnecessary energy and/or fuel used to dry the grain beyond the moisture content level that is needed for stable storage. Overly drying grain often takes additional and unnecessary time to dry the grain beyond the moisture content level that is needed for stable storage. Overly drying grain can damage the grain by causing it to be burned, cracked or otherwise damaged, which can reduce the value of the grain. Overly drying grain can reduce the test weight of the grain thereby causing a deduction and/or reduction in the price of the grain when it is sold. For these and other reasons, overly drying grain is undesirable.

As such, optimally drying grain requires striking a delicate balance between overly drying grain on one side, and not drying grain enough on the other side.

Various configurations of grain dryers and methods of operation have been developed to help facilitate efficient grain drying. However, all of the presently available grain dryers and methods of operation suffer from various disadvantages.

Cross-Flow Grain Dryers: One form of a grain dryer is what is known as a cross-flow grain dryer. Cross-flow grain dryers are known for having a pair of grain columns on each side that are formed by perforated screens. A plenum, or open space, is positioned between the grain columns. Wet grain is loaded into the grain columns using a loading system 30. The wet grain travels down the grain columns under the force of gravity, between the perforated screens. As the wet grain travels down the grain columns, between the perforated screens, heated air is blown into the plenum. This heated air flows outward from the plenum and through the columns of grain. As the heated air blows through the columns of grain, the heated air warms the grain and carries away moisture from the grain. Dry grain is unloaded from the grain columns using an unloading system 40. In this way, the grain is dried.

Cross-flow grain dryers suffer from many disadvantages. One disadvantage of cross-flow grain dryers is that they are relatively harsh on grain. This is because the grain toward the interior side of the grain columns is often exposed to high levels of heat which can cause the interior-positioned grain to crack, burn, and/or be overly dried. Another disadvantage of cross-flow grain dryers is that the grain within the grain columns tends to dry in an uneven manner. That is, the grain positioned toward the interior side of the grain column has a tendency to be dried more than the grain positioned toward the exterior side of the grain column. Another disadvantage of cross-flow grain dryers is that they tend to require relatively high operating pressures and high air-flow. Another disadvantage of cross-flow grain dryers is that they tend to consume a lot of fuel, or said another way they are energy inefficient. Another disadvantage of cross-flow grain dryers is the screens tend to get covered and plugged with fines from the grain which affects the operational characteristics of the grain dryer as well as requires periodic cleaning.

For these and other reasons, cross-flow grain dryers suffer from many disadvantages and are undesirable to use.

Mixed-Flow Grain Dryers: One form of a grain dryer is what is known as a mixed-flow grain dryer. Mixed-flow grain dryers are known for having one or more grain columns that have a plurality of inlet ducts and exhaust ducts that extend across the grain columns. Wet grain is loaded into the grain column using a loading system. The wet grain travels down the grain columns under the force of gravity. As the wet grain travels down the grain columns, between the interior wall and exterior wall of the grain columns, heated air is blown into the plenum. This heated air flows into the inlet ducts through the columns of grain and out the exhaust ducts. As the heated air blows through the columns of grain, the heated air warms the grain and carries away moisture from the grain. Dry grain is unloaded from the lower end of each of the grain columns using an unloading system. In this way, the grain is dried.

Mixed-flow grain dryers suffer from many disadvantages. One disadvantage of mixed-flow grain dryers is that they do not allow for heat recovery and as such they waste energy and consume unnecessary fuel. Another disadvantage of mixed-flow grain dryers is that each column requires its own unloading system. Another disadvantage of mixed-flow grain dryers is that they are susceptible to bridging of grain in grain columns.

For these and other reasons, mixed-flow grain dryers suffer from many disadvantages and are undesirable to use.

Therefore, for all the reasons stated above, and the reasons stated below, there is a need in the art for a grain drying system that improves upon the state of the art.

Thus, it is a primary objective of the disclosure to provide a grain dryer system that improves upon the state of the art.

Another object of the disclosure is to provide a grain dryer system that is efficient to use.

Yet another object of the disclosure is to provide a grain dryer system that facilitates heat recovery.

Another object of the disclosure is to provide a grain dryer system that reduces fuel consumption.

Yet another object of the disclosure is to provide a grain dryer system that is gentle on grain.

Another object of the disclosure is to provide a grain dryer system does not damage grain when drying.

Yet another object of the disclosure is to provide a grain dryer system that does not overly dry grain.

Another object of the disclosure is to provide a grain dryer system that facilitates cooling of grain before it is discharged.

Yet another object of the disclosure is to provide a grain dryer system that evenly dries grain.

Another object of the disclosure is to provide a grain dryer system that does not have variability of grain quality across the grain column.

Yet another object of the disclosure is to provide a grain dryer system that does not have variability of moisture across the grain column.

Another object of the disclosure is to provide a grain dryer system that can be precisely controlled.

Yet another object of the disclosure is to provide a grain dryer system that provides optimum results.

Another object of the disclosure is to provide a grain dryer system that facilitates unloading of grain from the dryer at a single point.

Yet another object of the disclosure is to provide a grain dryer system that is relatively compact.

Another object of the disclosure is to provide a grain dryer system that is relatively inexpensive.

Yet another object of the disclosure is to provide a grain dryer system that can be used with all kinds of grain.

Another object of the disclosure is to provide a grain dryer system that minimizes maintenance.

Yet another object of the disclosure is to provide a grain dryer system that requires less cleaning.

Another object of the disclosure is to provide a grain dryer system that is cleaner to use than prior art systems.

Yet another object of the disclosure is to provide a grain dryer system that is safe to use.

Another object of the disclosure is to provide a grain dryer system that reduces the potential for a fire.

Yet another object of the disclosure is to provide a grain dryer system that requires less air pressure.

Another object of the disclosure is to provide a grain dryer system that requires less airflow.

Yet another object of the disclosure is to provide a grain dryer system that provides improved grain quality.

Another object of the disclosure is to provide a grain dryer system that is easy to use.

Yet another object of the disclosure is to provide a grain dryer system that has a robust design.

Another object of the disclosure is to provide a grain dryer system that is high quality. Yet another object of the disclosure is to provide a grain dryer system that provides a unique solution to grain drying needs.

Another object of the disclosure is to provide a grain dryer system that reduces bridging of grain.

SUMMARY OF THE DISCLOSURE

An improved mixed-flow grain dryer system is presented. In one or more arrangements, the grain dryer system includes a forward exterior wall, a rearward exterior wall, a forward interior wall, a rearward interior wall, and exterior side walls. The grain dryer system includes at least one grain column extending between the forward interior wall and the rearward interior wall and between the exterior side walls. The grain column has an upper drying section, a middle drying section, and a lower drying section. The grain dryer system includes a set of plenums and ducts positioned between the forward exterior wall and forward interior wall and between the rearward exterior wall and the rearward interior wall. The set of plenums and ducts are configured to move air of a lower temperature through the middle drying section, move air having a temperature less than or equal to the lower temperature through the lower drying section, combine air moved through the middle drying section and lower drying section to produce combined air, and move the combined air through the upper drying section at a higher temperature.

In one or more arrangements, a mixed flow dryer system includes the at least one grain column having an upper drying section, a middle drying section, and a lower drying section. The system includes an intake plenum configured to receive ambient outside air. The system includes a lower heat plenum. A first duct is configured to move air from the intake plenum to the lower heat plenum. The lower heat plenum is configured to move air from the first duct to the middle drying section. A second duct is configured to move air from the intake plenum to the lower drying section. A recovery plenum is configured to receive air from the middle drying section and from the lower drying section. A fan is configured to move air from the recover plenum to a third duct. The third duct is configured to move air from the fan to a higher heat plenum. The higher heat plenum is configured to move air from the third duct to the upper drying section. An exhaust plenum is configured to move air from the upper drying section to the outside.

DETAILED DESCRIPTION OF THE DISCLOSURE

Figure 1:
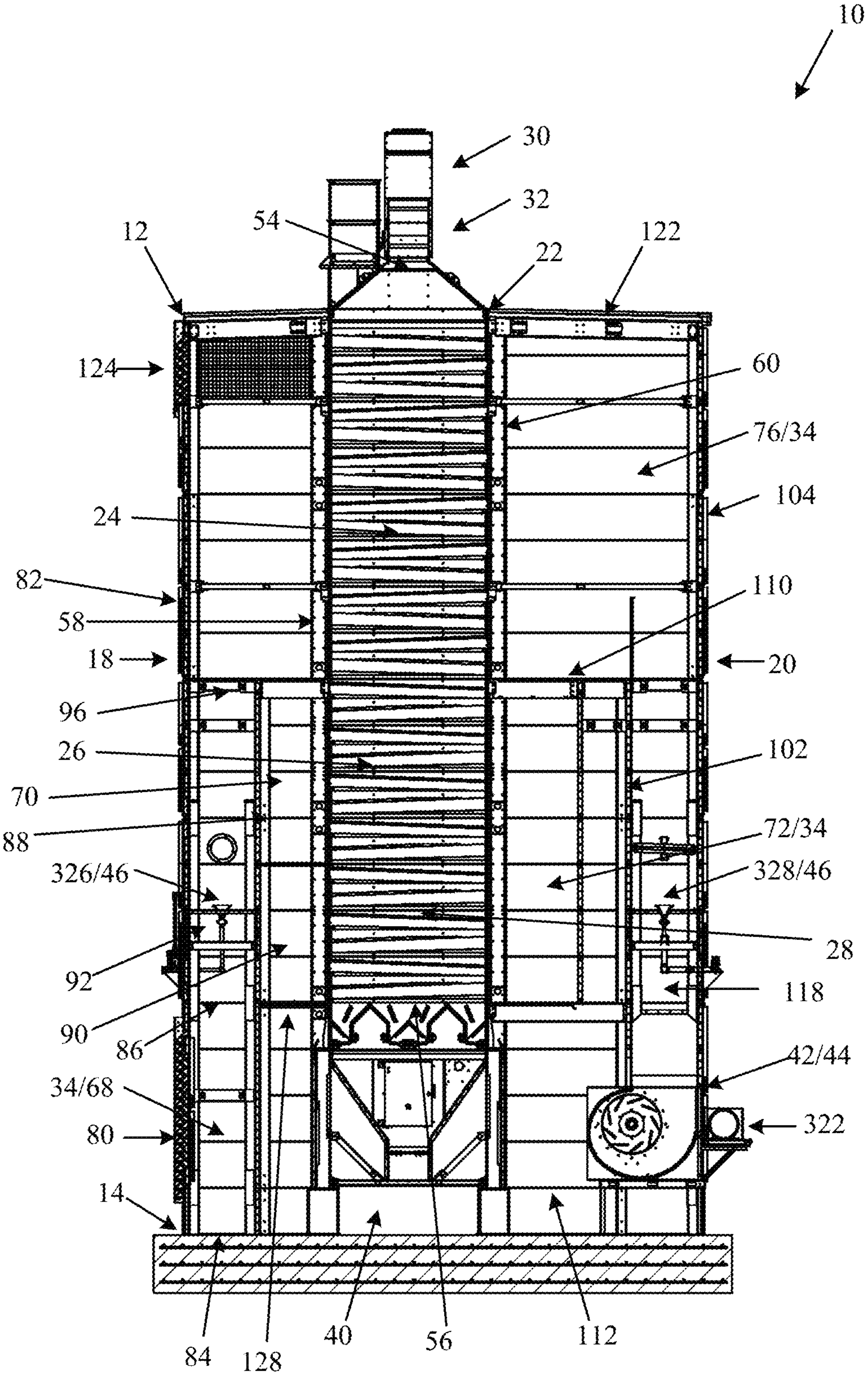
FIG. 1 shows a sectional left side view of a mixed-flow grain dryer system, in accordance with one or more embodiments of the present disclosure.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods. Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of agricultural grain dryers. However, the embodiments are not so limited. It is appreciated that the embodiments may be adapted for use in other agricultural implements and/or in other applications, which may be improved by the disclosed structures, arrangements and/or methods. The system is merely shown and described as being used in the context of agricultural grain dryers for ease of description and as one of countless examples.

System 10:

With reference to the figures, an enclosed mixed-flow grain dryer system 10, grain dryer system 10, or simply system 10, is presented that extends vertically from an upper end 12 to a lower end 14, extends a width between opposing sides 16, and extends a depth between an opposing forward end 18 and an opposing rearward end 20.

Enclosed mixed-flow grain dryer system 10 is formed of any suitable size, shape, and design and is configured to gently and efficiently dry grain while providing a single loading point, a single unloading point and heat recovery. In one or more arrangements, system 10 is formed of any suitable size, shape, and design and is configured to gently and efficiently dry grain using a multi-stage drying process using an upper drying section 24, a middle drying section 26, and a lower drying section 28.

In the arrangement shown, as one example, system 10 includes at least one grain column 22 having an upper drying section 24, a middle drying section 26, and a lower drying section 28, a loading system 30, a wet hold section 32, plenums 34, an unloading system 40, an air handling system 42 having a fan system 44, a heating system 46, and a support system 50, among other components, structures and features as is further described herein.

In an arrangement shown, as one example, in one configuration (a heat and cool mode configuration), system 10 is configured to move grain through upper drying section 24, then through a middle drying section 26, then through a lower drying section 28, while also, moving ambient temperature air through lower drying section 28, moving lower temperature heated air through the middle drying section 26, and moving higher temperature heated air through upper drying section 24. In this example arrangement, system 10 is configured to move the lower temperature air through the middle section and ambient temperature air (or a mixture of ambient temperature air and the lower temperature air) through the lower drying section 28, combine the lower temperature air and ambient air after it is moved through the lower drying section 28 and middle drying section 26 to produce intermediate air, heat the intermediate air to a higher temperature, and move the higher temperature air through the upper drying section 24. In this manner, air moving through lower drying section 28, and to some degree the middle drying section 26, recaptures heat from grain after it has been heated with higher temperature air in upper drying section 24.

In an arrangement shown, as one example, in one configuration (a full heat mode configuration), system 10 is configured to move grain through upper drying section 24, then through a middle drying section 26, then through a lower drying section 28, while also, moving lower temperature heated air through lower drying section 28, moving lower temperature heated air through the middle drying section 26, and moving higher temperature heated air through upper drying section 24. In this example arrangement, system 10 is configured to move the lower temperature heated air through the middle drying section 26 and lower temperature heated air through the lower drying section 28, combine air after it is moved through the lower drying section 28 and middle drying section 26 to produce intermediate air, heat the intermediate air to a higher temperature, and move the higher temperature air through the upper drying section 24. In this manner, air moving through lower drying section 28, and to some degree the middle drying section 26, recaptures heat from grain after it has been heated with higher temperature air in upper drying section 24.

Grain Columns 22:

In the arrangement shown, as one example, mixed-flow grain dryer system 10 includes at least one grain column 22. Grain column 22 is formed of any suitable size, shape, and design and is configured to hold grain therein while the grain moves vertically through the system 10 under the force of gravity while being exposed to flow of air of various temperatures to facilitate drying of the grain.

In the arrangement shown, as one example, grain column 22 includes an upper drying section 24, a middle drying section 26, and a lower drying section 28. In this example arrangement, grain column 22 extends in each section a width between a forward interior wall 58 and a rearward interior wall 60 and extends a depth between exterior side walls 62.

In the arrangement shown, as one example, grain column 22 extends vertically from the lower end of loading system 30, through upper drying section 24, middle drying section 26, and lower drying section 28, to the upper end of unloading system 40 in a continuous and uninterrupted manner. In this way, when grain enters the grain column 22, the grain travels vertically through the grain column 22 from its upper end to its lower end under the force of gravity while being exposed to the airflow through upper drying section 24, middle drying section 26, and lower drying section 28.

In the arrangement shown, as one example, the width and depth of grain column 22 remains generally constant and consistent throughout the length of the upper drying section 24, middle drying section 26, and lower drying section 28. However, embodiments are not so limited. Rather, it is contemplated that, in one or more embodiments, width, depth and/or shape of grain column 22 may change in one or more of the upper drying section 24, middle drying section 26, and/or lower drying section 28 to facilitate adjustments to the manner in which the grain is dried and/or cooled.

While arrangements are primarily shown and discussed with reference to system 10 having one grain column 22, embodiments are not so limited. Rather, it is contemplated that system 10 may include any number of grain columns 22 for drying grain such as one, two, three, four, five, six or more.

Plenums 34:

In the arrangement shown, as one example, enclosed mixed-flow grain dryer system 10 includes a set of plenums 34. Plenums 34 are formed of any suitable size, shape, and design and are configured to provide a space to facilitate heating of air and/or a passageway for the movement of air to and through grain column 22. In the arrangement shown, as one example, grain column 22 is generally centrally positioned between plenums 34 positioned forward and rearward of grain column 22 between forward exterior wall 82 and rearward exterior wall 104 and grain column 22. In this example arrangement, plenums 34 include an intake plenum 68, a lower heat plenum 70, a recovery plenum 72, an upper heat plenum 76, and an exhaust plenum 78.

Intake Plenum 68:

Intake plenum 68 is formed of any suitable size, shape, and design and is configured to facilitate intake of ambient outside air for movement through grain column 22. However, it is hereby contemplated that air received within intake plenum 68 may go through a pre-heating step, such as by way of a heater or burner or the like, thereby heating the air received in intake plenum 68. In this way, the term “ambient” as used herein with respect to the system 10 is not meant to mean room temperature air or air of the general outside temperature. Instead, the term “ambient” is intended to mean air of the temperature that enters the system 10, which can be room temperature air, air of the outside temperature or air that is heated to a first temperature that enters the system 10.

In the arrangement shown, as one example, intake plenum 68 is under a vacuum or negative pressure created by air handling system 42, which causes air to be pulled into intake plenum 68 through an intake vent 80 positioned at a lower end of forward exterior wall 82. However, it is hereby contemplated that intake plenum 68 may receive forced air by way of a blower that blows air into intake plenum 68. Alternatively, intake plenum 68 may operate by a combination of vacuum as well as blown forced air movement.

In this example arrangement, intake plenum 68 extends between forward exterior wall 82 and forward interior wall 58, and between exterior side walls 62, from a lower end 84 to an upper end 86.

Cool Duct 90 and Heat Duct 92:

In the arrangement shown, as one example, intake plenum 68 is bounded by forward exterior wall 82, forward interior wall 58, and exterior side walls 62. In the arrangement shown, as one example, upper end 86 of intake plenum is divided by a divider 88 to form a pair of ducts 90 and 92, which are cool duct 90 and heat duct 92 of air handling system 42.

In this example arrangement, cool duct 90 extends between divider 88, forward interior wall 58, and exterior side walls 62 from upper end 86 of intake plenum 68 to a lower end 94 of lower heat plenum 70. In this example arrangement, heat duct 92 extends between divider 88, forward exterior wall 82, and exterior side walls 62 from upper end 86 of intake plenum 68 to lower end 94 of lower heat plenum 70.

In a heat and cool mode configuration, a portion of the ambient air received by intake plenum 68 is pulled through cool duct 90 and through lower drying section 28 of grain column 22 by air handling system 42. Another portion of ambient air received by intake plenum 68 is pulled into heat duct 92 by air handling system 42, where it is heated by heating system 46 before providing the air to a lower heat plenum 70. In a full heat mode, all of the ambient air received by intake plenum 68 is pulled through heat duct 92 by air handling system 42, where it is heated by heating system 46 before providing the air to lower heat plenum 70, where it is distributed to lower drying section 28 and middle drying section 26.

Lower Heat Plenum 70:

Lower Heat Plenum 70 is formed of any suitable size, shape, and design and is configured to receive heated air from heat duct 92 and heating system 46 and facilitate flow of the heated air into middle drying section 26 of grain column 22. In the arrangement shown, as one example, lower heat plenum 70 extends between forward exterior wall 82 and forward interior wall 58, and between exterior side walls 62, from a lower end 94 and divider 88 to an upper divider 96.

In this example arrangement, vacuum created by air handling system 42 causes heated air to be pulled from heat duct 92, through lower heat plenum 70 into middle drying section 26 of grain column 22, and through middle drying section 26 into recovery plenum 72.

Airflow Diverters 128 and 130:

In one or more arrangements, system 10 includes one or more airflow diverters 128 and 130. Airflow diverters 128 and 130 are formed of any suitable size, shape, and design and are configured to redirect and/or mix lower temperature air and/or ambient air that is provided to middle drying section 26 and lower drying section 28 and facilitate the conversion of the system between a heat and cool mode configuration and full heat mode configuration.

In the arrangement shown, as one example, system 10 includes a lower airflow diverter 128 positioned between intake plenum 68 and cool duct 90 at the upper end 86 of plenum 68 and includes an upper airflow diverter 130 positioned between lower heat plenum 70 and cool duct 90. In this example arrangement, lower airflow diverter 128 and upper airflow diverter 130 may be adjusted to divert lower temperature heated air, ambient temperature air, or a mixture thereof into cool duct 90 and lower drying section 28.

Airflow diverters 128 and 130 are formed of any suitable size, shape, and design and are configured to provide or facilitate airflow through the airflow diverters 128 and 130 that is adjustable to facilitate increasing decreasing, and/or stopping the airflow.

Upper Airflow Diverter 130:

Upper airflow diverter 130 is formed of any suitable size, shape, and design and is configured to open to allow air to pass there through in a full heat mode and close to prevent air to pass there through in a heat and cool mode. In the arrangement shown, as one example, upper airflow diverter 130 has a generally rectangular planar shape extending between divider 88, forward interior wall 58, and exterior side walls 62. In this example arrangement, upper airflow diverter 130 includes a set of doors 132.

Doors 132 are formed of any suitable size, shape, and design and are configured to be opened and closed to provide access between cool duct 90 and lower heat plenum 70 to facilitate repair and cleaning and to facilitate the blocking of airflow or the allowance of airflow from lower heat plenum 70 through upper airflow diverter 130 to cool duct 90. In the arrangement shown, as one example, doors 132 have a generally rectangular planar shape extending between opposing sides 138 from a front end 134 to a rear end 136. In this example arrangement, the rear end 136 of doors 132 are attached to upper airflow diverter 130 by a hinged connector 140. Hinged connector 140 permits front end 134 of doors 132 to swing downward to an open position and swing upward to a closed position.

In this example arrangement, doors 132 include a connection member 142 (not shown) at front end 134 to facilitate holding of doors 132 in the closed position. In various arrangements, connection members 142 may be implemented using, for example, manual mechanical devices such as latches, fasteners, locks, screws, bolts, and/or any other mechanism for holding doors 132 in a closed position. In one arrangement, connection members 142 may be actuated through the use of an electronic system having motors, solenoids, actuators or the like, for example, which may be controlled by control system 400.

In this example arrangement, doors 132 include a number of stiffening members 144. Stiffening members 144 are formed of any suitable size, shape, and design and are configured to provide rigidity and structural support to doors 132. In this example, stiffening members 144 are elongated support structures attached to a lower surface of the doors 132 and extending in a direction parallel to opposing sides 138 of doors 132. However, it is contemplated that any other form of a stiffening member 144 is hereby contemplated for use as is it contemplated that stiffening members 144 may have any other placements and/or shapes.

In one or more arrangements, upper airflow diverter 130 may be moved upward and downward to adjust the position where upper airflow diverter 130 is connected between forward interior wall 58 and divider 88 to define the lower end 94 of lower heat plenum 70. By moving upper airflow diverter 130 up and/or down, the number of inlet ducts 200 connecting lower heat plenum 76 to middle drying section 26 and the number of inlet ducts 200 connecting cool duct 90 to lower drying section 28 can be adjusted. Said another way, by moving upper airflow diverter 130 up and/or down, the effective size of middle drying section 26 and lower drying section 28 can be adjusted. For example, upper airflow diverter 130 may be moved downward to increase the amount of time grain is in the middle drying section 26 and decrease the amount of time the grain is in lower drying section 28. Conversely, upper airflow diverter 130 may be moved upward to decrease the amount of time grain is in the middle drying section 26 and increase the amount of time the grain is in lower drying section 28.

Lower Airflow Diverter 128:

Lower airflow diverter 128 is formed of any suitable size, shape, and design and is configured to open to allow air to pass there through in a heat and cool mode and close to prevent air to pass there through a full heat mode. In the arrangement shown, as one example, lower airflow diverter 128 is similar to upper airflow diverter 130, having a generally rectangular planar shape extending between divider 88, forward interior wall 58, and exterior side walls 62, and including a set of doors 132.

Additionally, in this example arrangement, lower airflow diverter 128 includes an airflow adjustment member 146 which in the arrangement shown, as one example, is a set of louvers. Airflow adjustment member 146 may be hereinafter referred to as louvers 146, however the term “louvers” is to be interpreted as any mechanism that adjusts the amount of airflow through lower airflow diverter 128, which in one arrangements may be a first member having plurality of openings or slots that may be selectively covered by a second member having a plurality of covering members that selectively cover or uncover the plurality of openings of the first member. More specifically, louvers 146 are formed of any suitable size, shape, and design and are configured to facilitate increase/decrease in flow of ambient temperature air from intake plenum 68, through lower airflow diverter 128, into cool duct 90 and lower drying section 28. As louvers 146 are closed, more air is drawn through the lower heat plenum 70, which means more air is drawn through middle drying section 26 of grain column 22 and less air is drawn through lower drying section 28 of grain column 22. Conversely, as louvers 146 are opened, more air is drawn from intake plenum 68 and into lower drying section 28, which means less air is drawn through lower heat plenum 70 and middle drying section 26 of grain column 22.

In this example arrangement, louvers 146 are elongated openings through lower airflow diverter 128 extending in a direction parallel to an edge of front end 134 of doors 132 that are selectively covered or uncovered by a similarly shaped member having a plurality of elongated covering members. However, it is contemplated that some various embodiments stiffening members 144 having any other placements and/or shapes.

In the arrangement shown, lower airflow diverter 128 includes a slidable gate 148 attached to a bottom side of lower airflow diverter 128. Slidable gate 148 is formed of any suitable size, shape, and design and is configured to facilitate opening and closing or covering and uncovering of louvers 146. In the arrangement shown, as one example, slidable gate 148 has a generally rectangular planar shape extending between opposing sides 154 from a front end 150 to a rear end 152.

In this example arrangement, slidable gate 148 includes slots 160 to facilitate attachment of slidable gate 148 to lower airflow diverter 128 by fasteners 158. In this example arrangement, fasteners 158 are movable within slots 160 to permit slidable gate 148 to be moved from side to side, relative to lower airflow diverter 128 between an open position, a closed position, and/or any position in between.

In this example arrangement, slidable gate 148 includes a set of openings 156. Openings 156 are formed of any suitable size, shape, and design and are configured to facilitate opening and closing louvers 146 via sliding of slidable gate 148. In the arrangement shown, as one example, openings 156 having the same approximate shape as louvers 146. In this example arrangement, openings 156 are aligned with louvers 146 when slidable gate 148 is in the open position. Conversely, when slidable gate 148 is in the closed position, no portion of openings 156 overlaps with louvers so slidable gate 148 completely closes openings through louvers 146.

In one or more arrangements, lower airflow diverter 128 includes a locking mechanism 162. Locking mechanism 162 is formed of any suitable size, shape, and design and is configured to prevent slidable gate 148 from moving relative to lower airflow diverter 128. In the arrangement shown, as one example, locking mechanism 162 is a manually operated mechanical member such as a rotatable bolt configured to extend through one of the slots 160 and thread into lower airflow diverter 128. When slidable gate 148 is in a desired position, the bolt may be tightened to clamp slidable gate 148 in position. It is hereby contemplated that locking mechanism 162 may be formed of any manual mechanical device such as latches, fasteners, locks, screws, bolts, and/or any other mechanism for holding slidable gate 148 in a set position. In one alternative arrangement, locking mechanism 162 may be actuated through the use of an electronic system having motors, solenoids, actuators or the like, for example, which may be controlled by control system 400.

Recovery Plenum 72:

In one or more arrangements, system 10 includes a recovery plenum 72 to facilitate recovery of air after it is passed through middle drying section 26 and lower drying section 28 of grain column 22. As air passes through middle drying section 26 and lower drying section 28 of grain column 22, the air is warmed by falling grain that was heated in upper drying section 24 of grain column 22. In one or more embodiments, warmed air recovered by recovery plenum 72 is heated and reused for drying grain in the upper drying section 24 of grain column 22. Because the air was warmed in middle drying section 26 and lower drying section 28, less energy is required to heat the air to a proper temperature for use in upper drying section 24 of grain column 22.

Recovery plenum 72 is formed of any suitable size, shape, and design and is configured to receive air passed from lower heat plenum 70 through middle drying section 26 and is also configured to receive air passed from intake plenum 68 through cool duct 90 and lower drying section 28. In the arrangement shown, as one example, air from middle drying section 26 and lower drying section 28 are mixed in recovery plenum 72 and transported to fan system 44 of air handling system 42.

Figure 2:
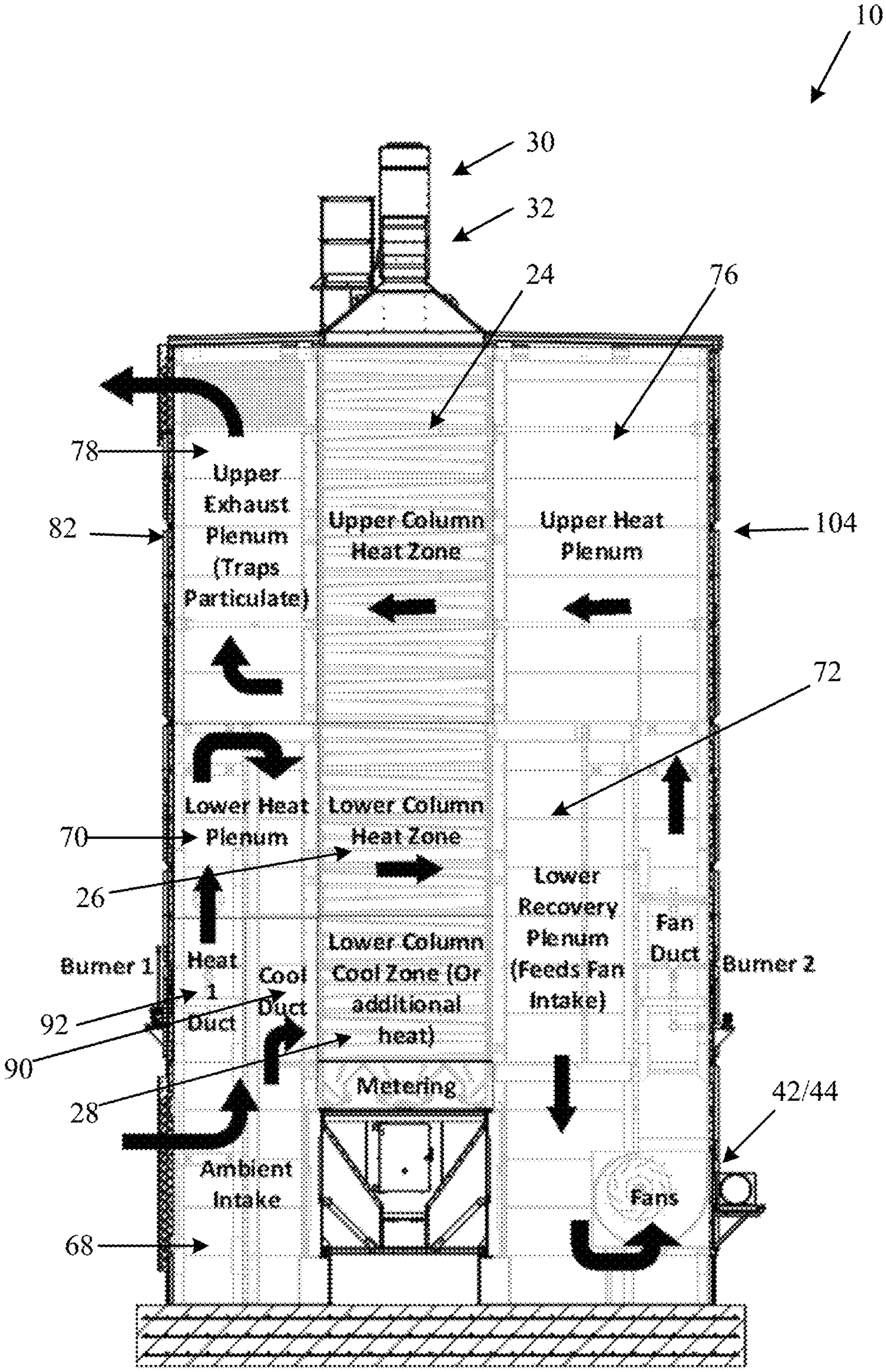
FIG. 2 shows a sectional left side view of a mixed-flow grain dryer, in accordance with one or more embodiments of the present disclosure; the view showing high level description of some various sections of the system; the view showing airflow through the mixed-flow grain dryer when operated in a heat and cool mode.
Figure 3:
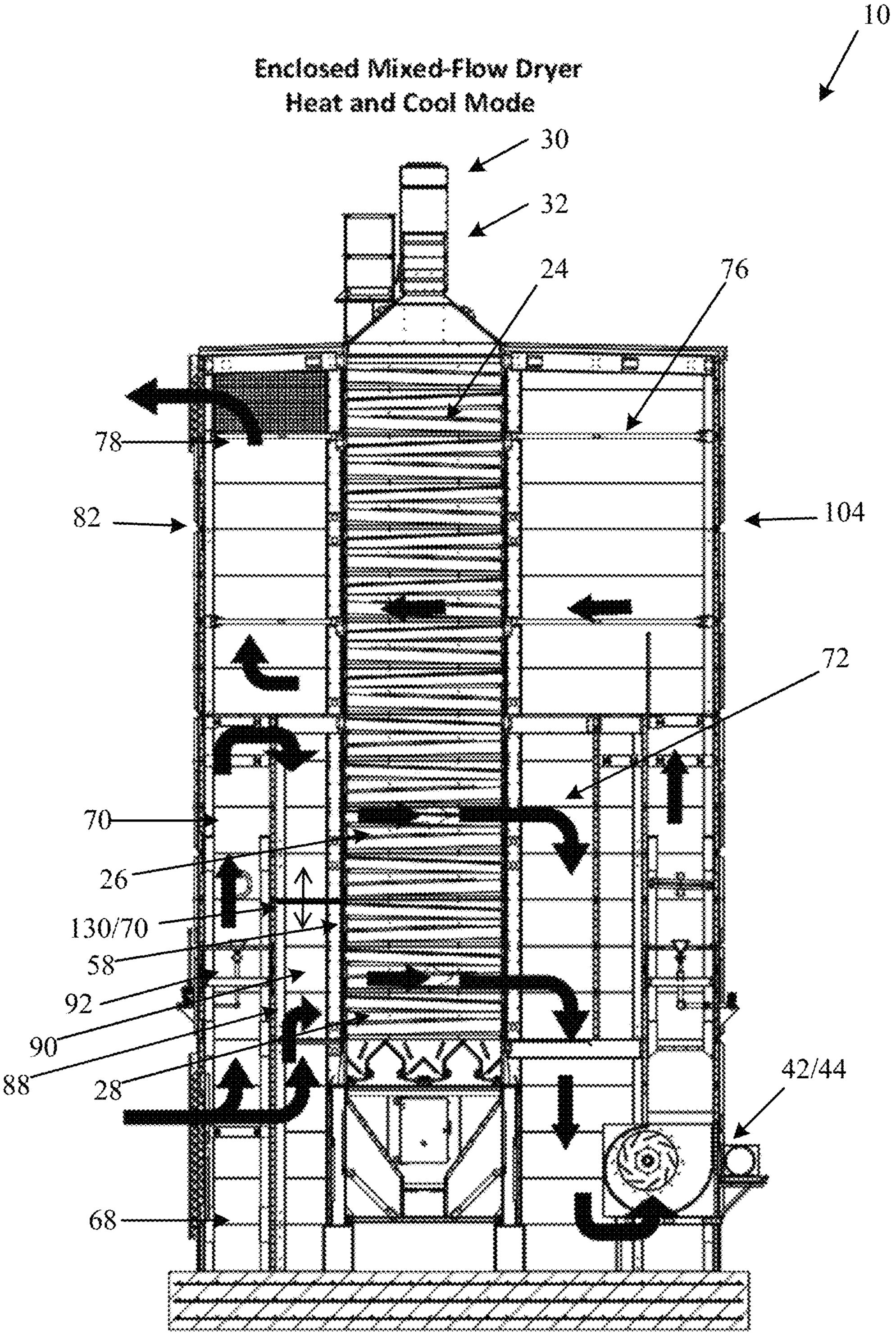
FIG. 3 shows a sectional left side view of a mixed-flow grain dryer, in accordance with one or more embodiments of the present disclosure; the view showing airflow through the mixed-flow grain dryer when operated in a heat and cool mode.
Figure 4:
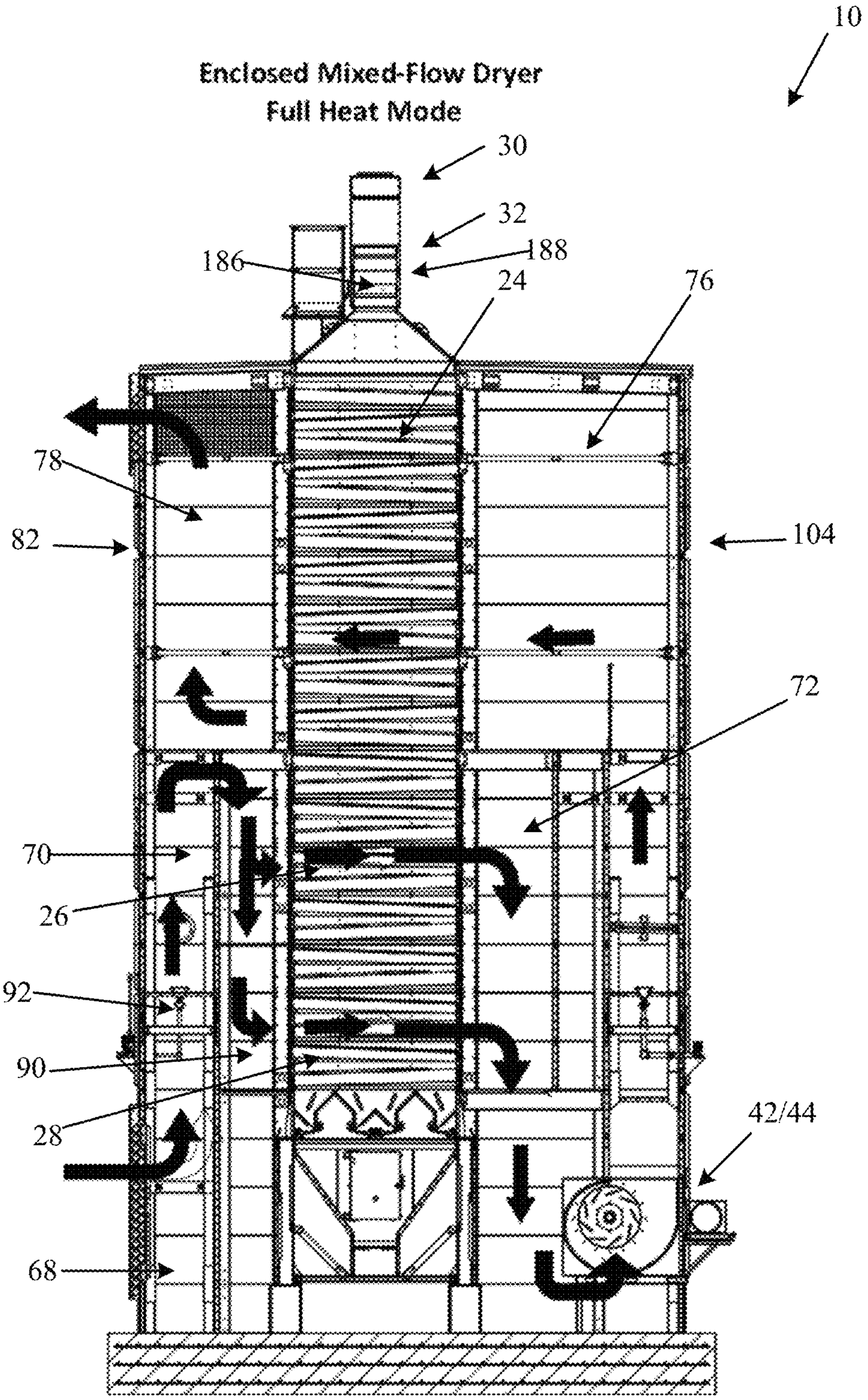
FIG. 4 shows a sectional left side view of a mixed-flow grain dryer, in accordance with one or more embodiments of the present disclosure; the view showing airflow through the mixed-flow grain dryer when operated in a full heat mode.
Figure 5:
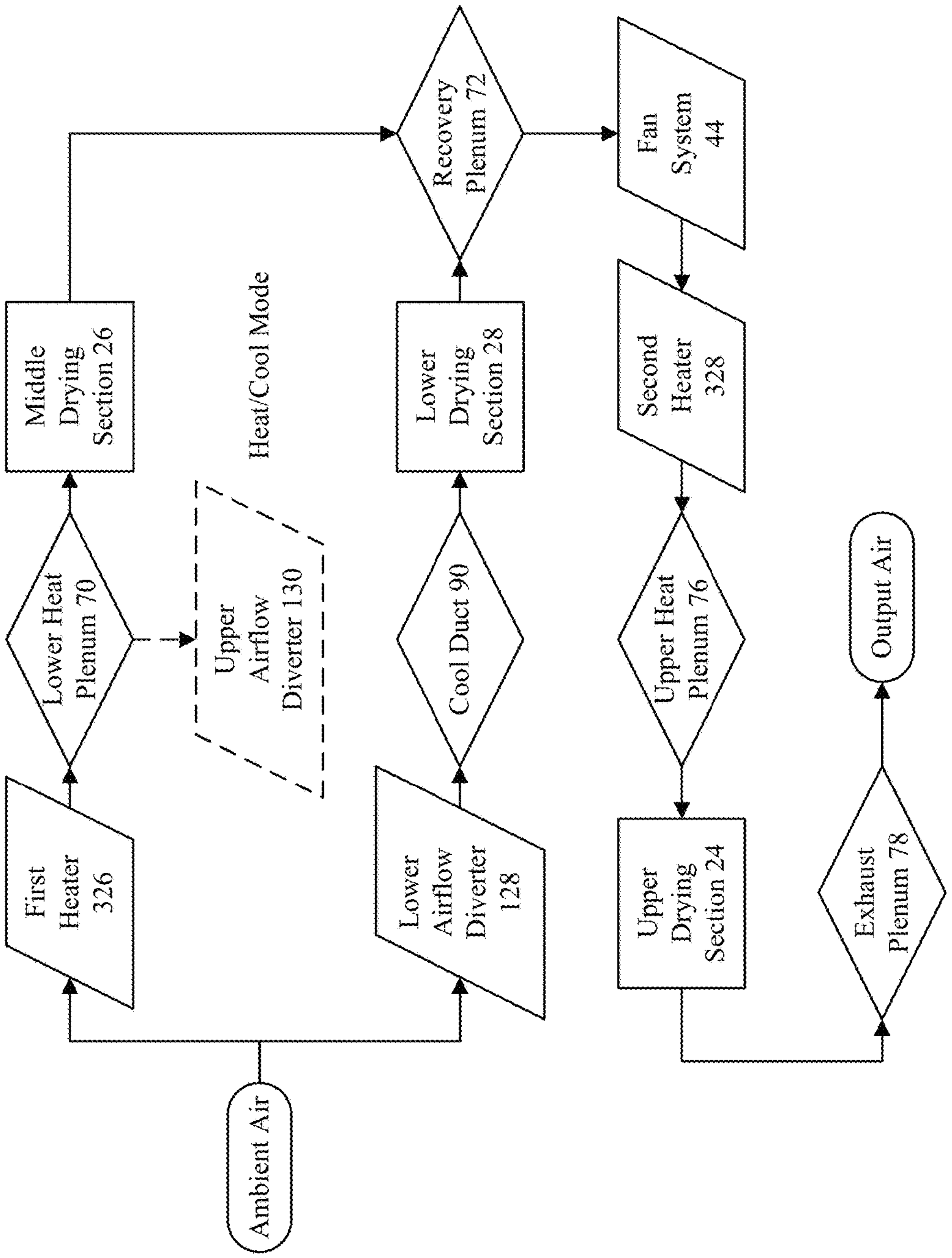
FIG. 5 shows a flowchart depicting airflow through a mixed-flow grain dryer system operated in a heat and cool mode, in accordance with one or more embodiments of the present disclosure.
Figure 6:
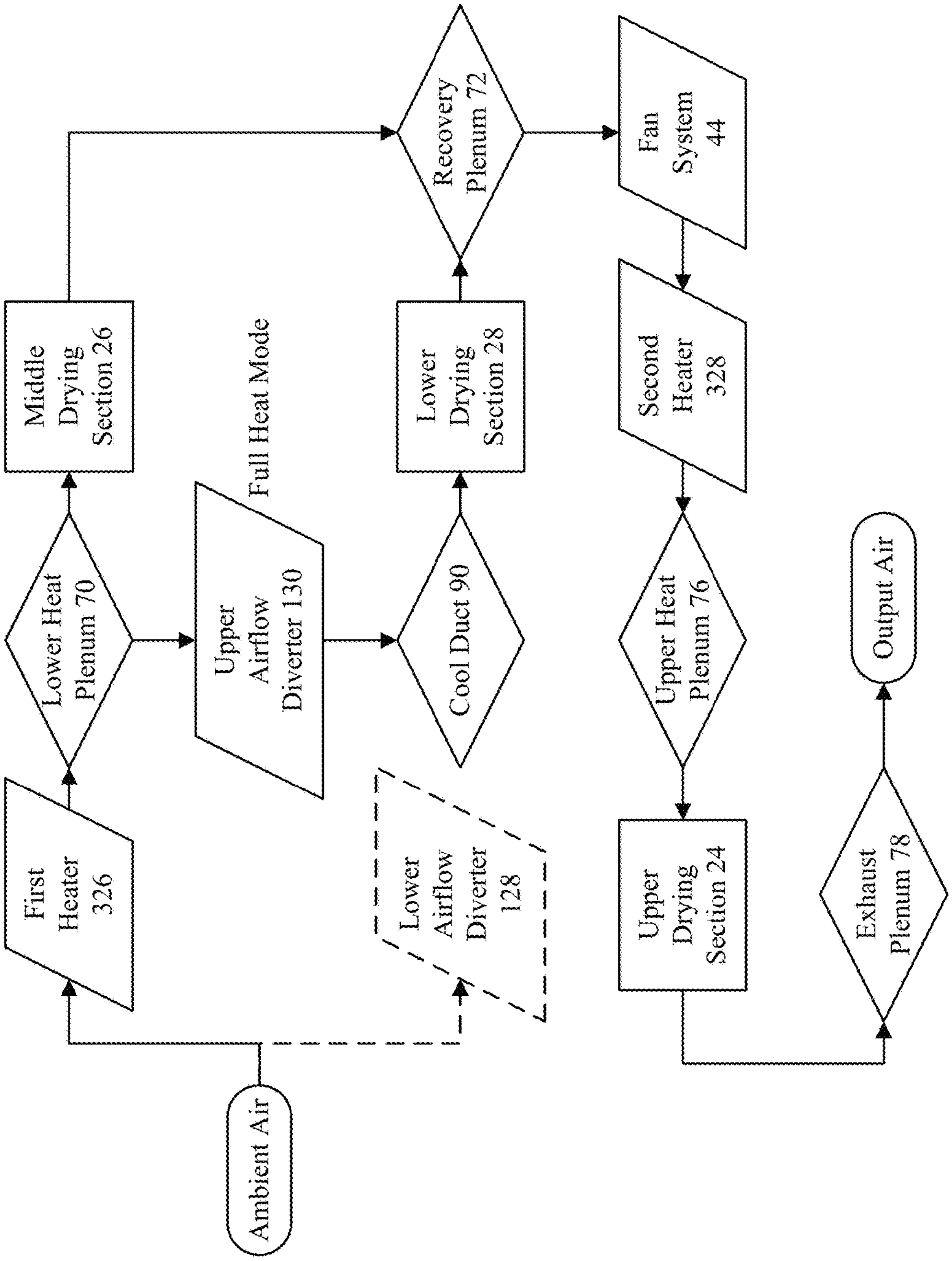
FIG. 6 shows a flowchart depicting airflow through a mixed-flow grain dryer system operated in a full heat mode, in accordance with one or more embodiments of the present disclosure.
Figure 7:
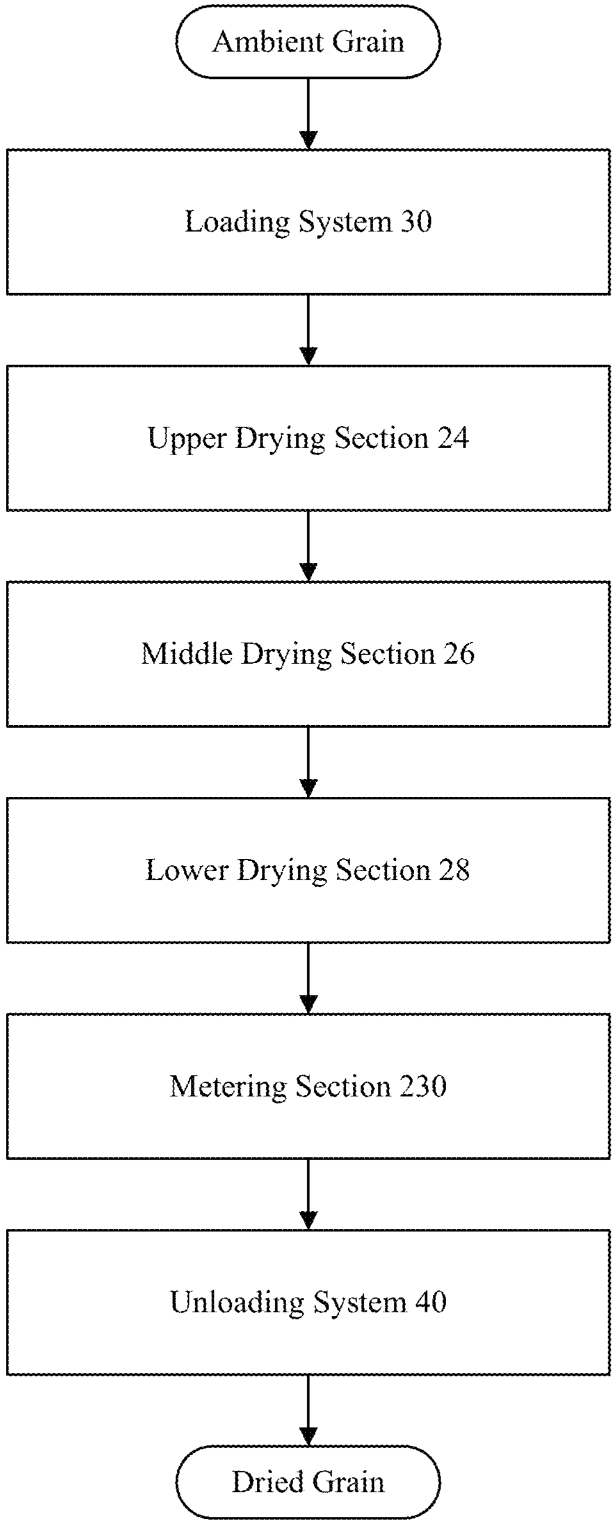
FIG. 7 shows a flowchart depicting the flow of grain through a mixed-flow grain dryer system, in accordance with one or more embodiments of the present disclosure.
Figure 8:
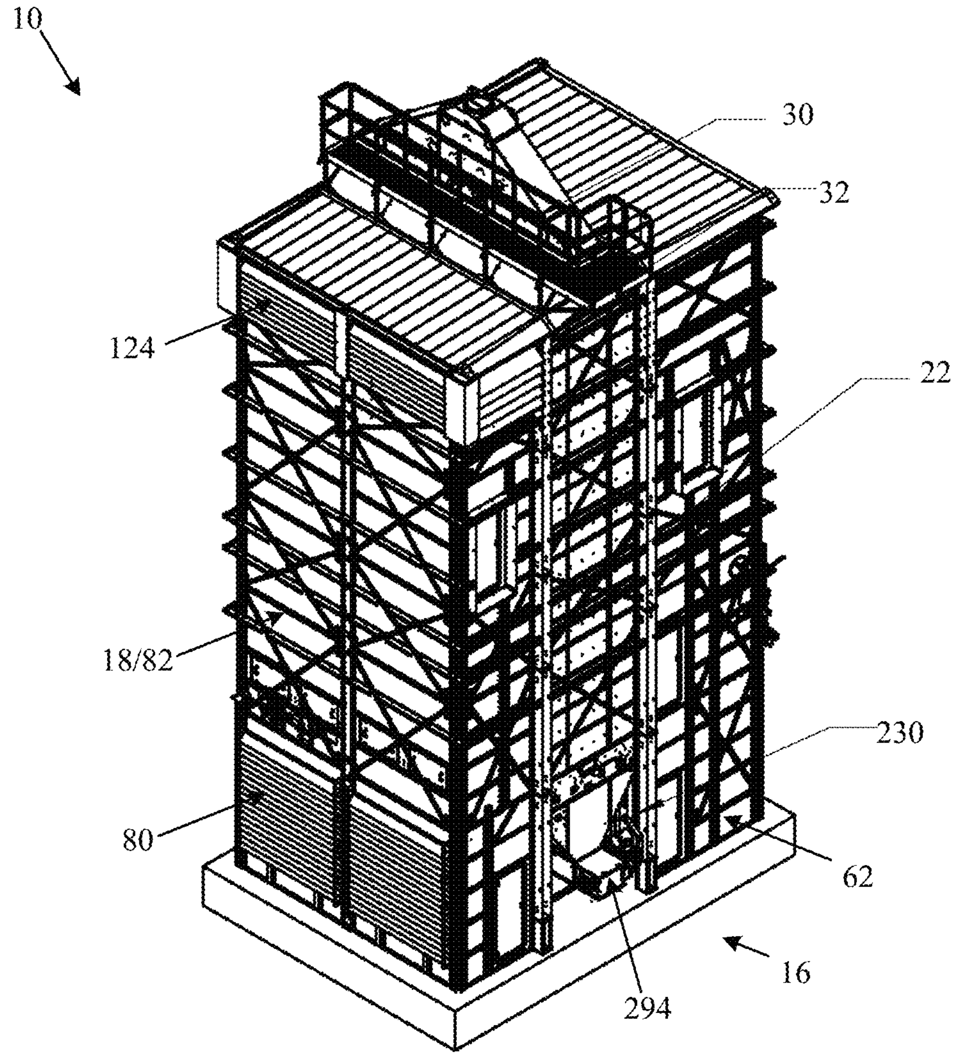
FIG. 8 shows an upper front left perspective view of a mixed-flow grain dryer system, in accordance with one or more embodiments of the present disclosure.
Figure 9:
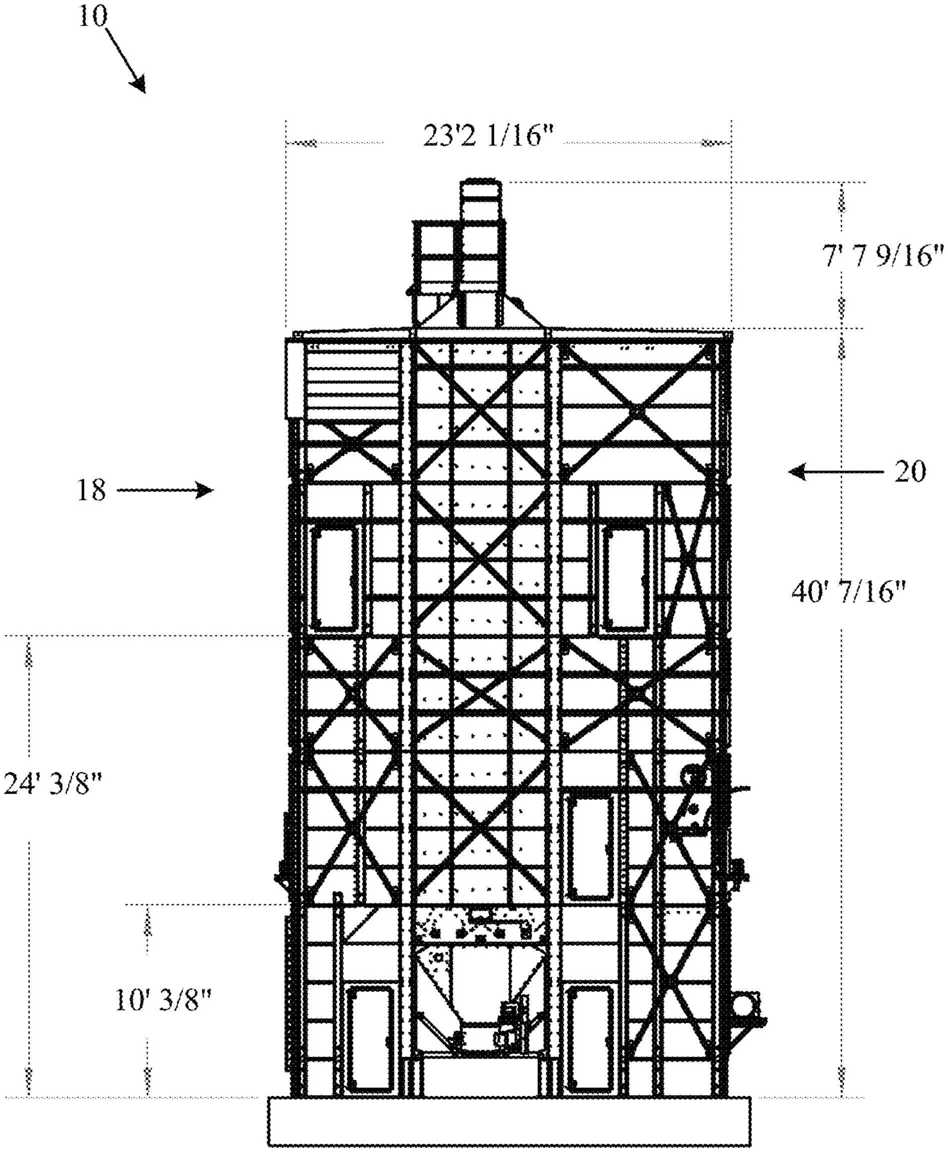
FIG. 9 shows a left side view of a mixed-flow grain dryer system, in accordance with one or more embodiments of the present disclosure.
Figure 10:
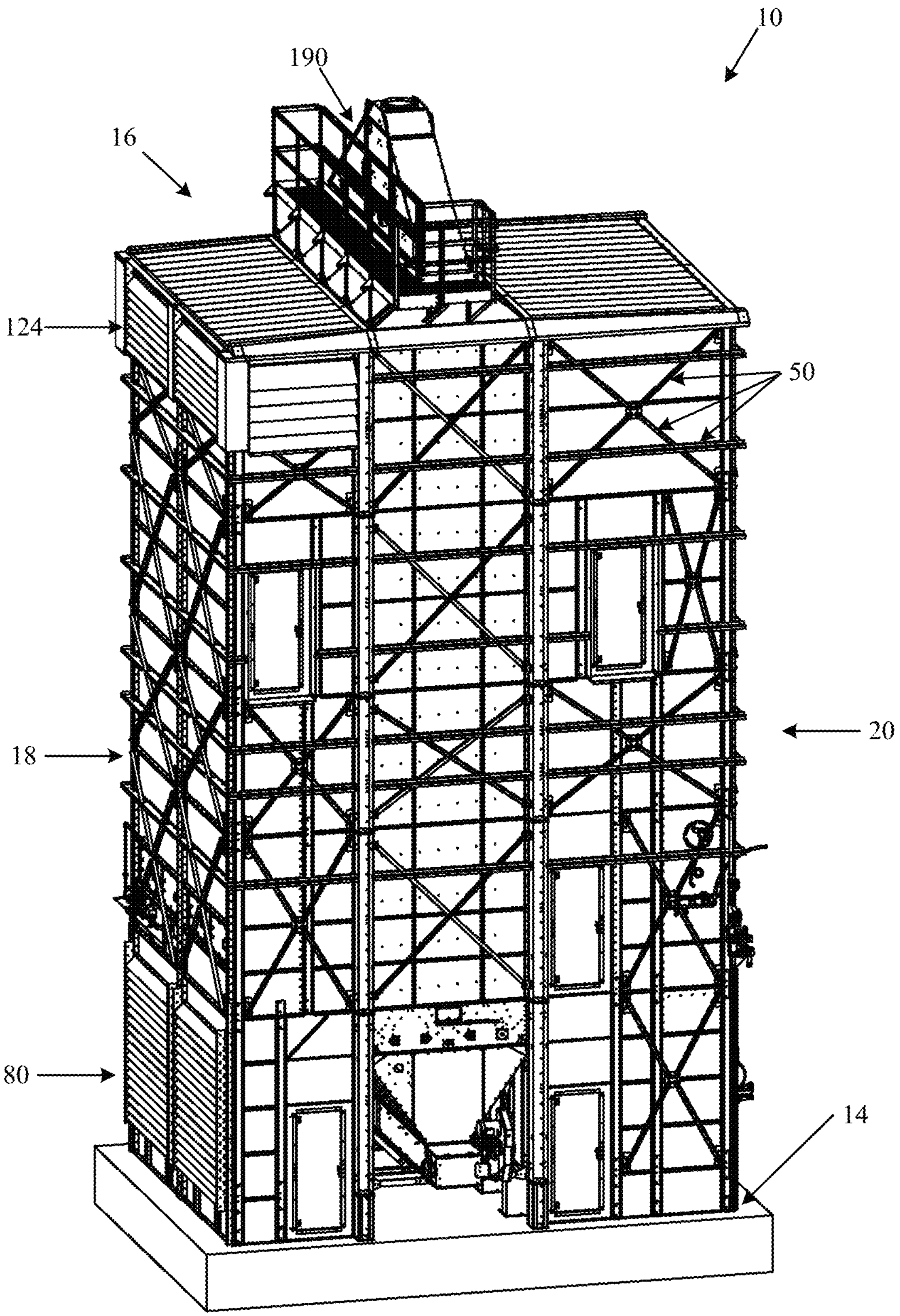
FIG. 10 shows an upper front left perspective view of a mixed-flow grain dryer system, in accordance with one or more embodiments of the present disclosure.
Figure 11:
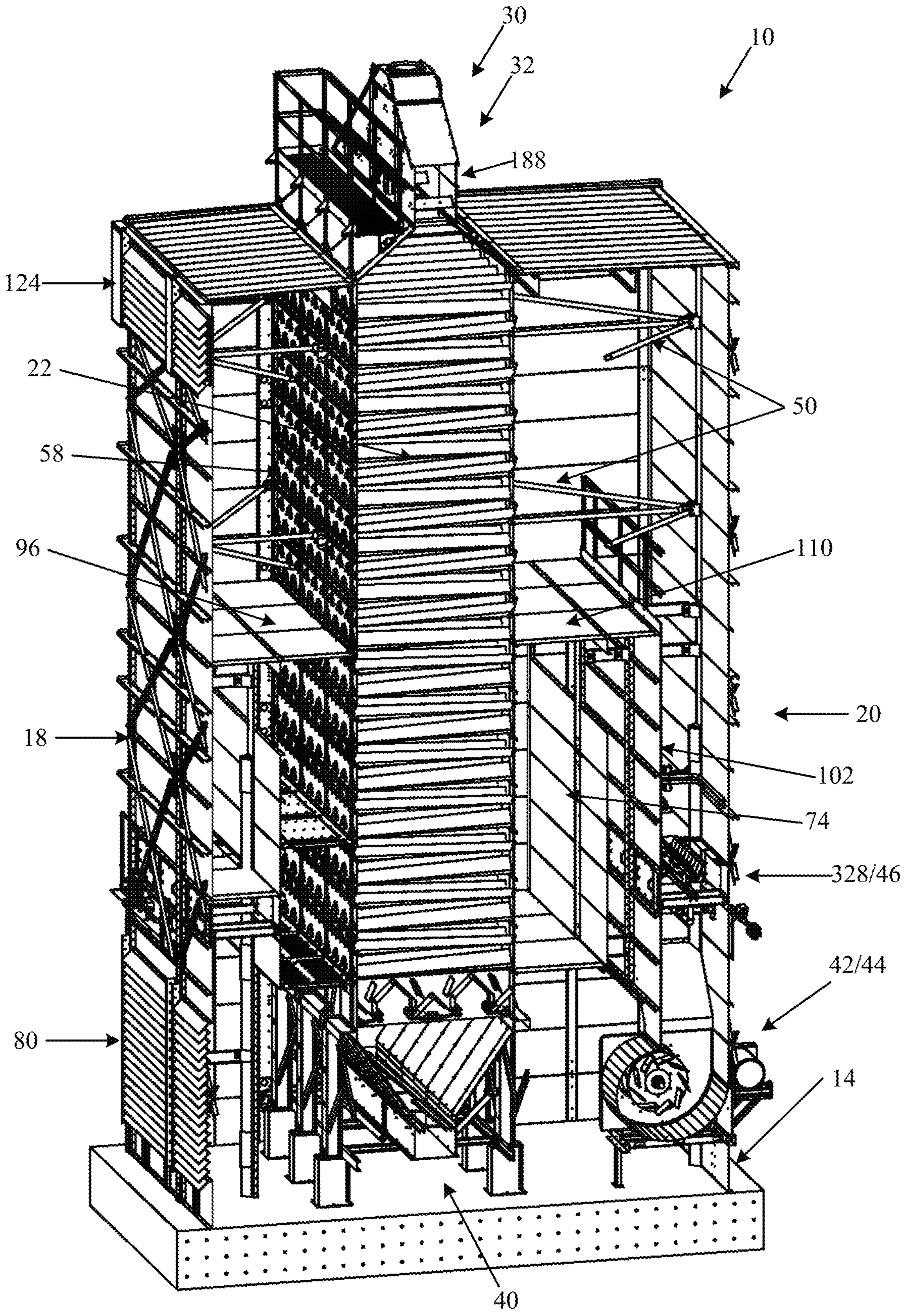
FIG. 11 shows an upper front left perspective view of a mixed-flow grain dryer system, in accordance with one or more embodiments of the present disclosure; the view showing left side wall of the mixed-flow grain dryer system omitted.
Figure 12:
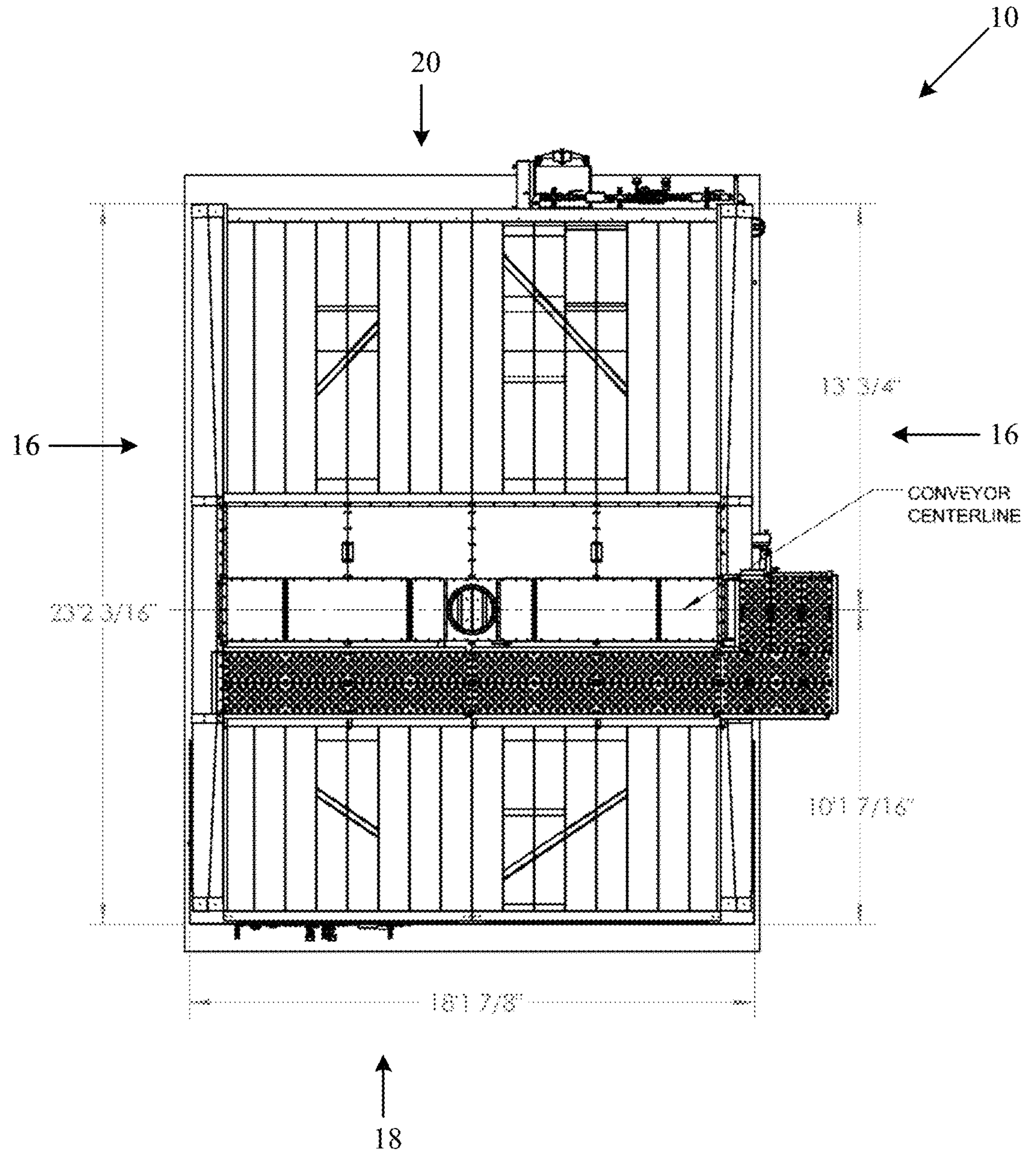
FIG. 12 shows a top view of a mixed-flow grain dryer system, in accordance with one or more embodiments of the present disclosure.
Figure 13:
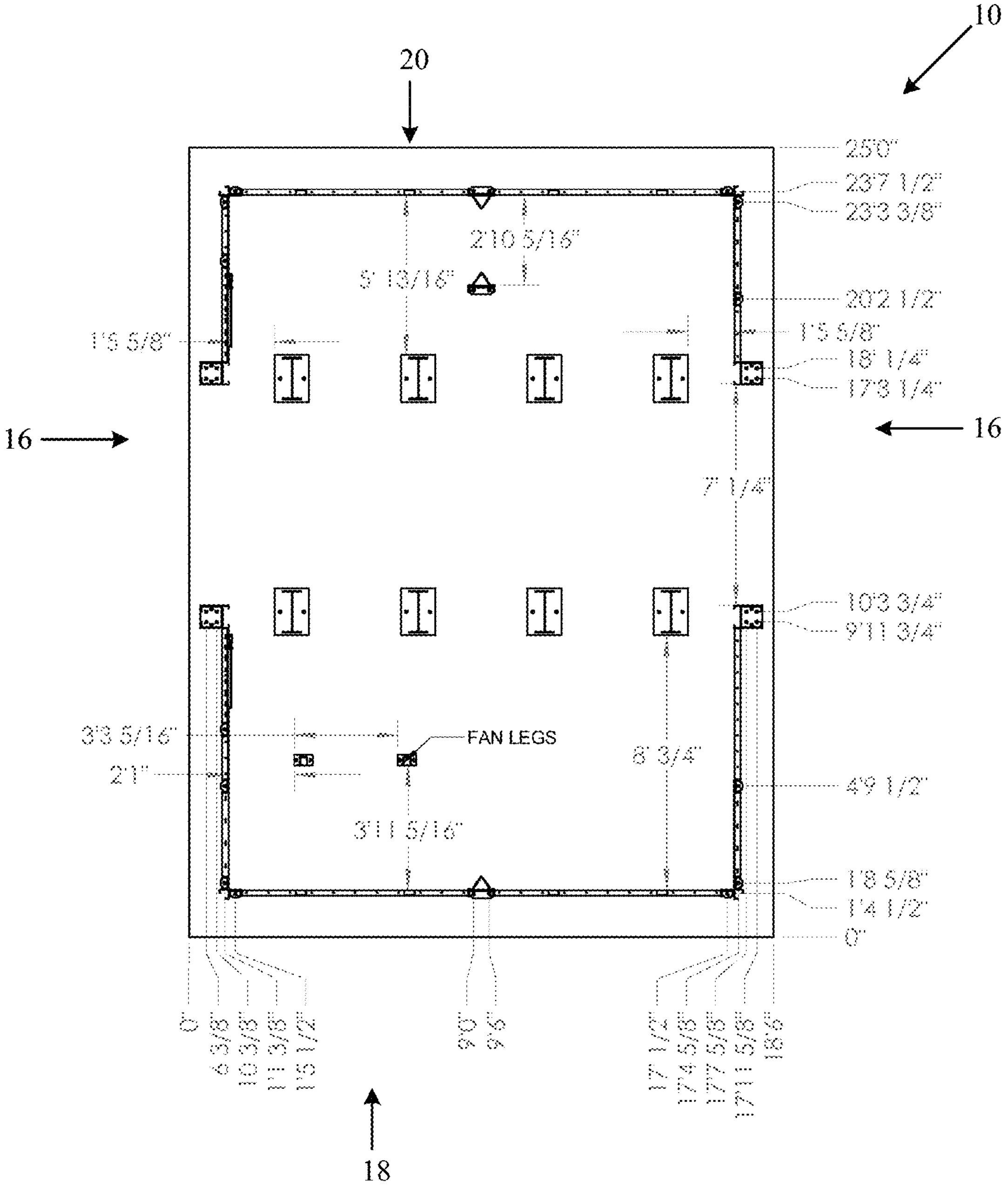
FIG. 13 shows a top side cross sectional view of a mixed-flow grain dryer system, in accordance with one or more embodiments of the present disclosure.
Figure 14:
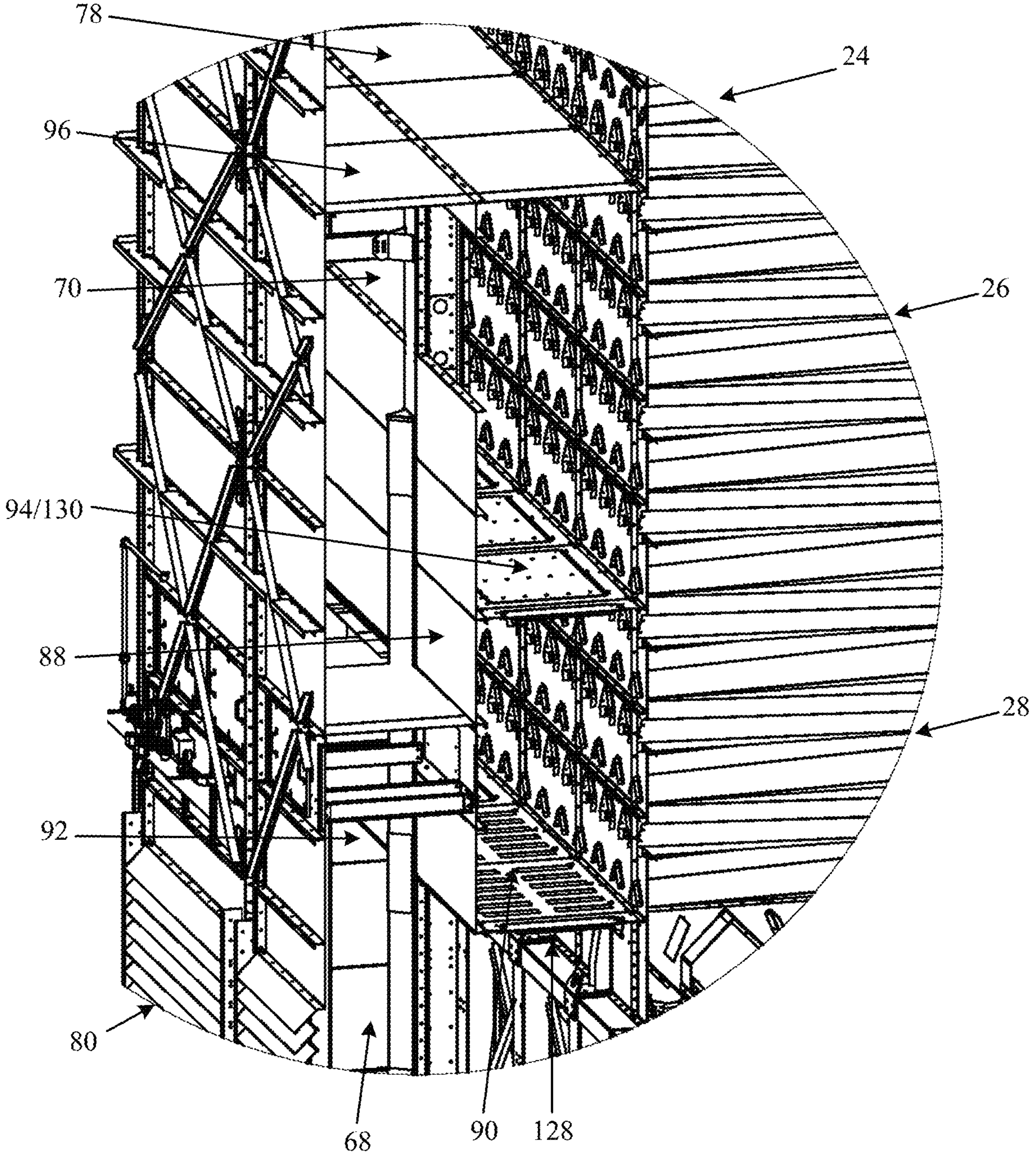
FIG. 14 shows a close up view of a front left perspective view of a mixed-flow grain dryer system, in accordance with one or more embodiments of the present disclosure; the view showing left side wall of the mixed-flow grain dryer system omitted; the view showing a close up of an intake plenum, lower heat plenum, and cool duct, which provide air to lower drying section and middle drying section.
Figure 15:
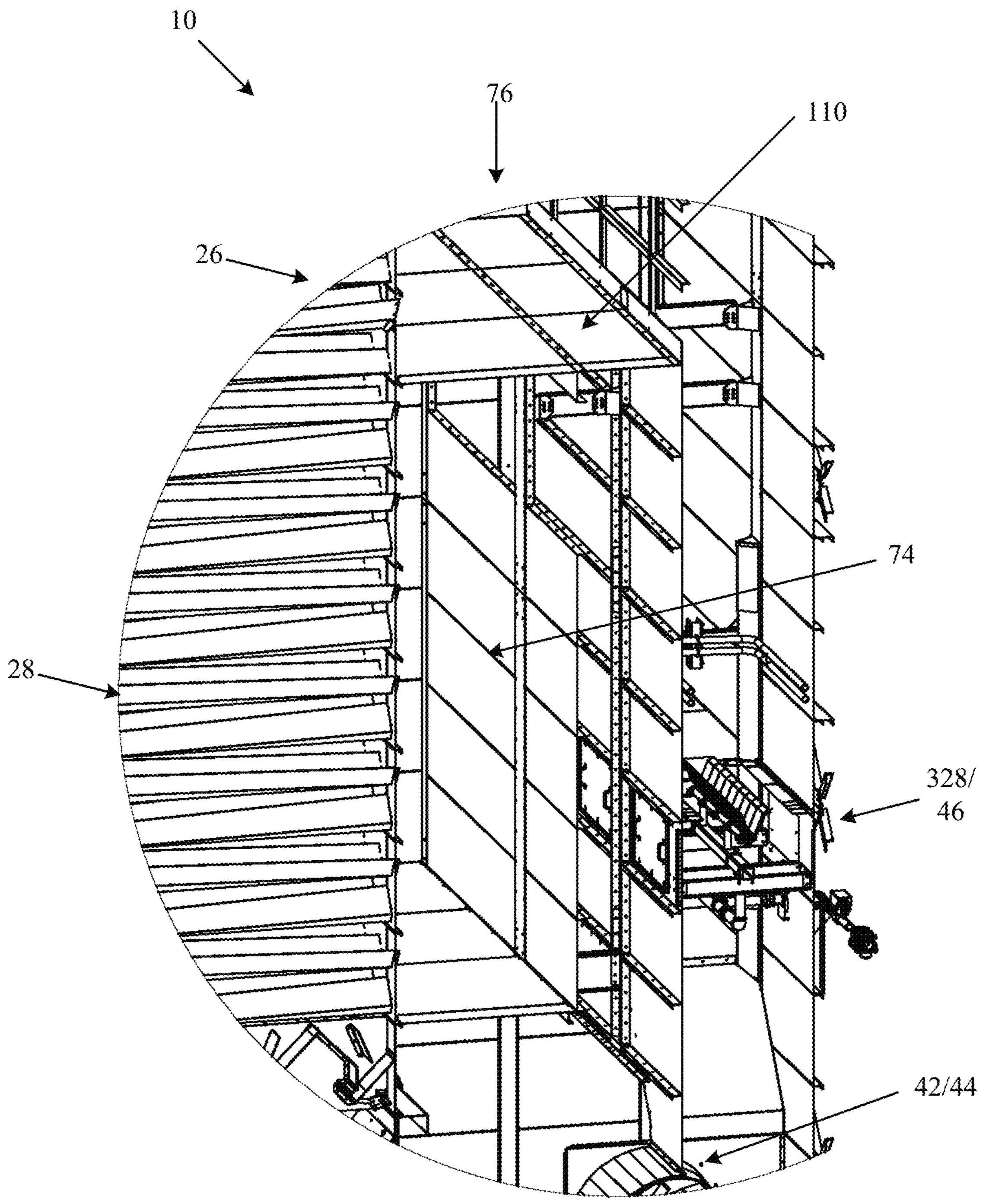
FIG. 15 shows a close up view of a front left perspective view of a mixed-flow grain dryer system, in accordance with one or more embodiments of the present disclosure; the view showing left side wall of the mixed-flow grain dryer system omitted; the view showing a close up of a recovery plenum which receives air after passing through the lower drying section and middle drying section.
Figure 16:
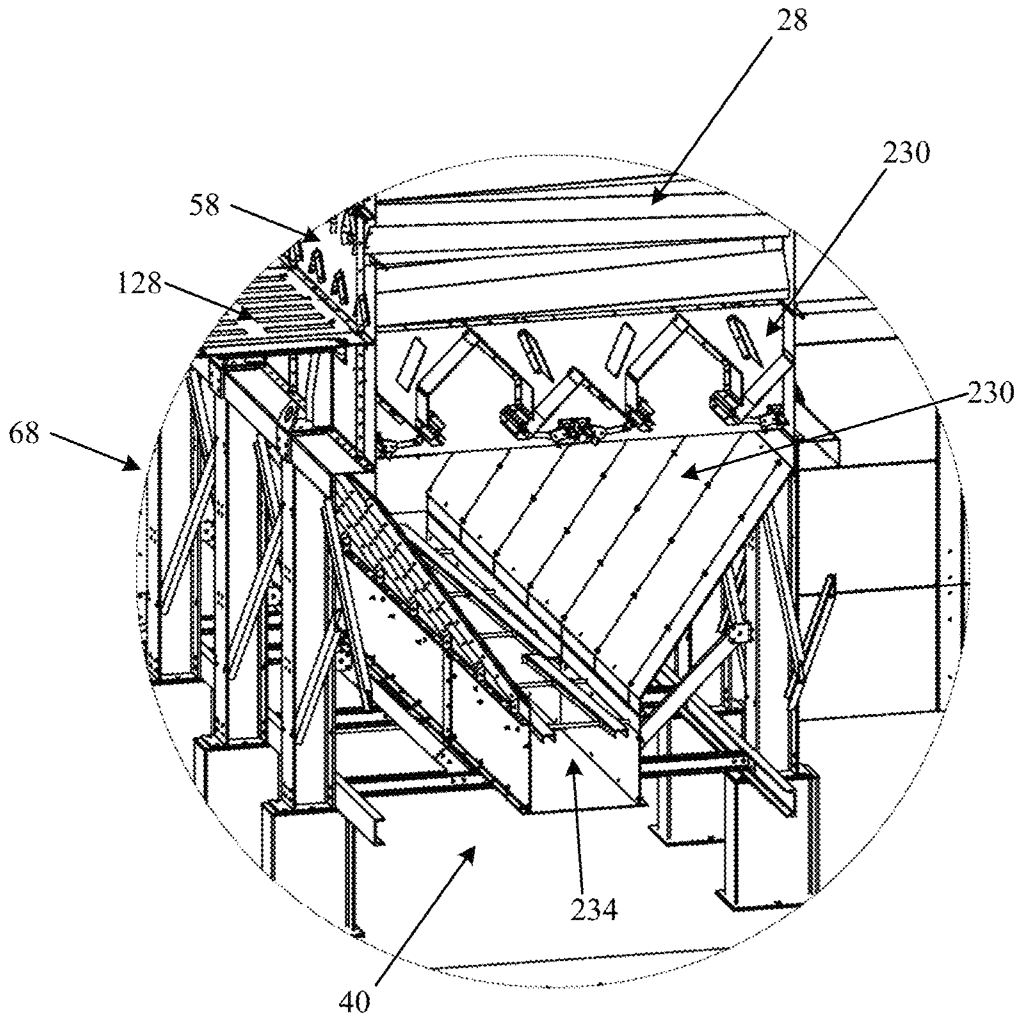
FIG. 16 shows a close up view of a front left perspective view of an unloading system of a mixed-flow grain dryer system, in accordance with one or more embodiments of the present disclosure.
Figure 17:
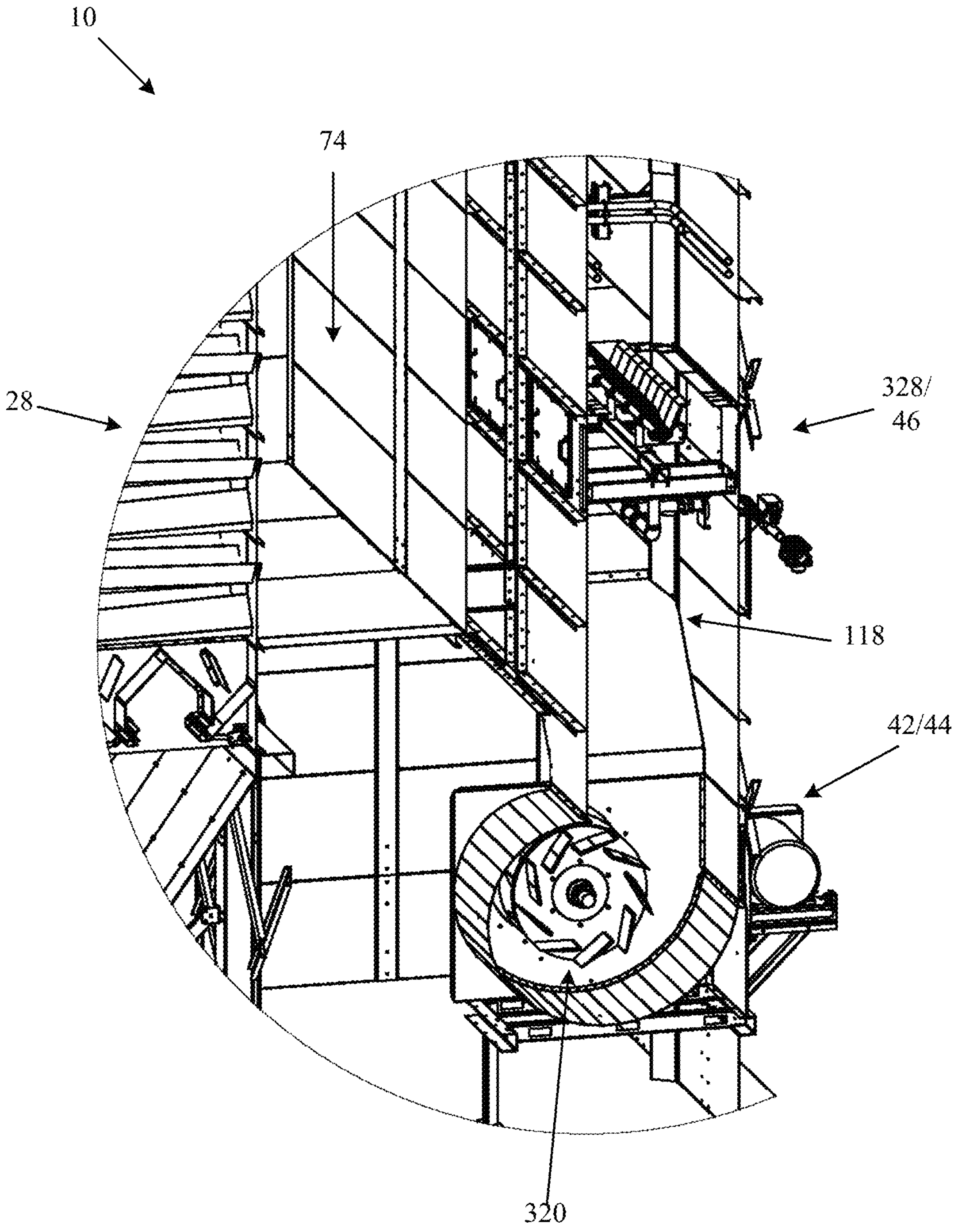
FIG. 17 shows a close up view of a front left perspective view of a mixed-flow grain dryer system, in accordance with one or more embodiments of the present disclosure; the view showing left side wall of the mixed-flow grain dryer system omitted; the view showing a close up of a recovery plenum and a fan system of an air handling system used to move air through the mixed-flow grain dryer system.
Figure 18:
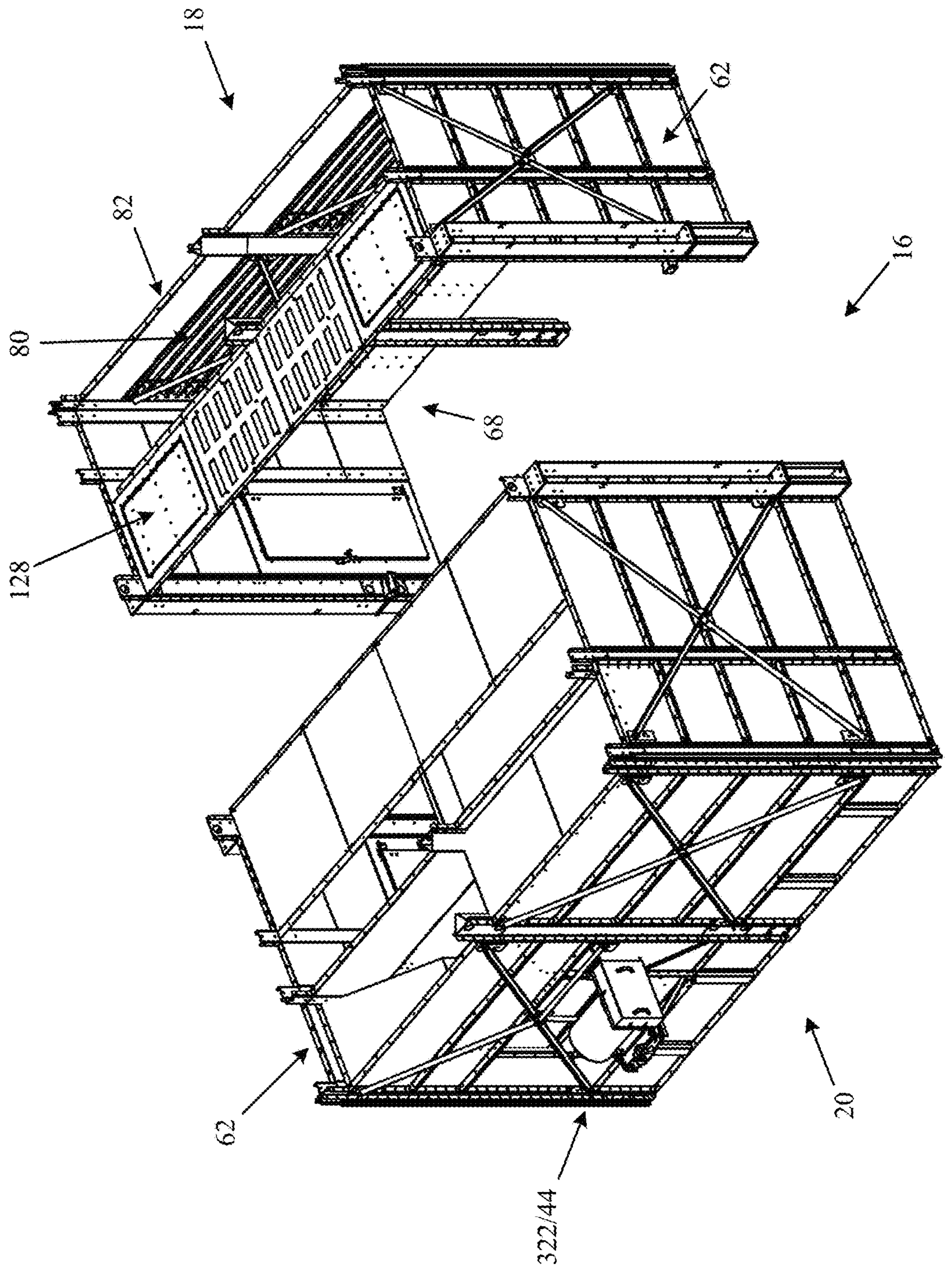
FIG. 18 shows an upper rear right perspective view of a lower portion of a mixed-flow grain dryer system proximate to an unloading section, in accordance with one or more embodiments of the present disclosure; the view showing grain column and unloading section of the mixed-flow grain dryer system omitted.
Figure 19:
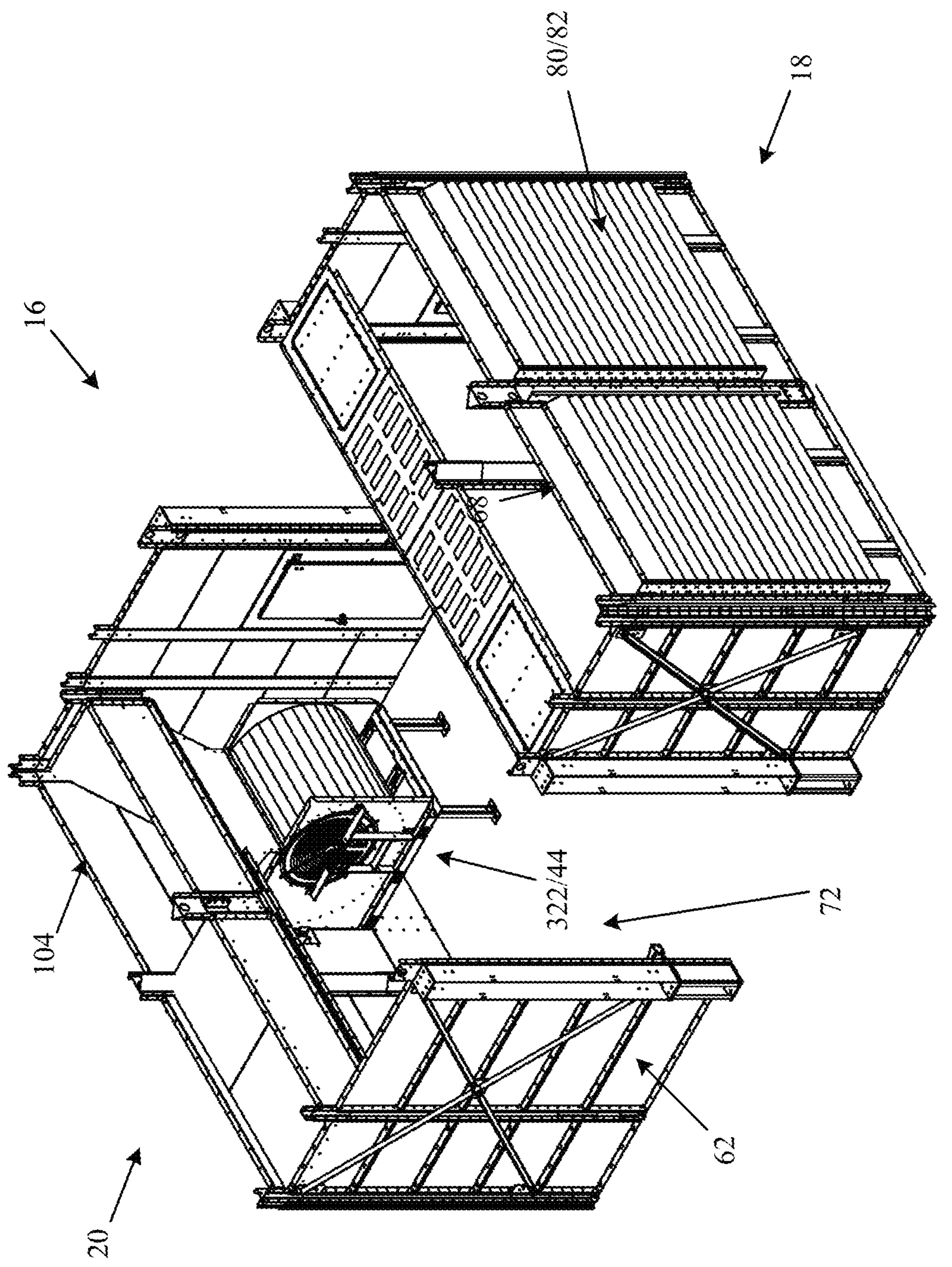
FIG. 19 shows an upper front right perspective view of a lower portion of a mixed-flow grain dryer system proximate to an unloading section, in accordance with one or more embodiments of the present disclosure; the view showing grain column and unloading section of the mixed-flow grain dryer system omitted.
Figure 20:
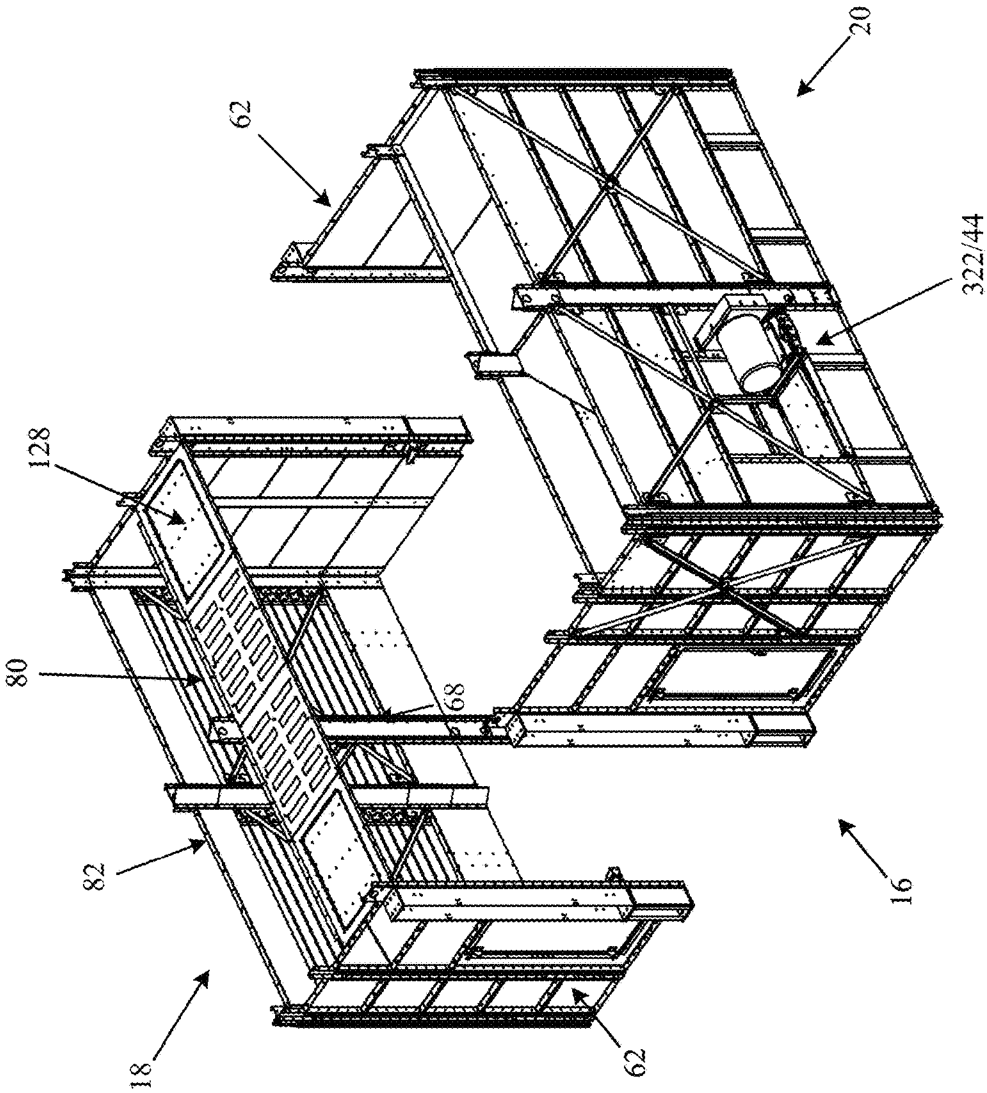
FIG. 20 shows an upper rear left perspective view of a lower portion of a mixed-flow grain dryer system proximate to an unloading section, in accordance with one or more embodiments of the present disclosure; the view showing grain column and unloading section of the mixed-flow grain dryer system omitted.
Figure 21:
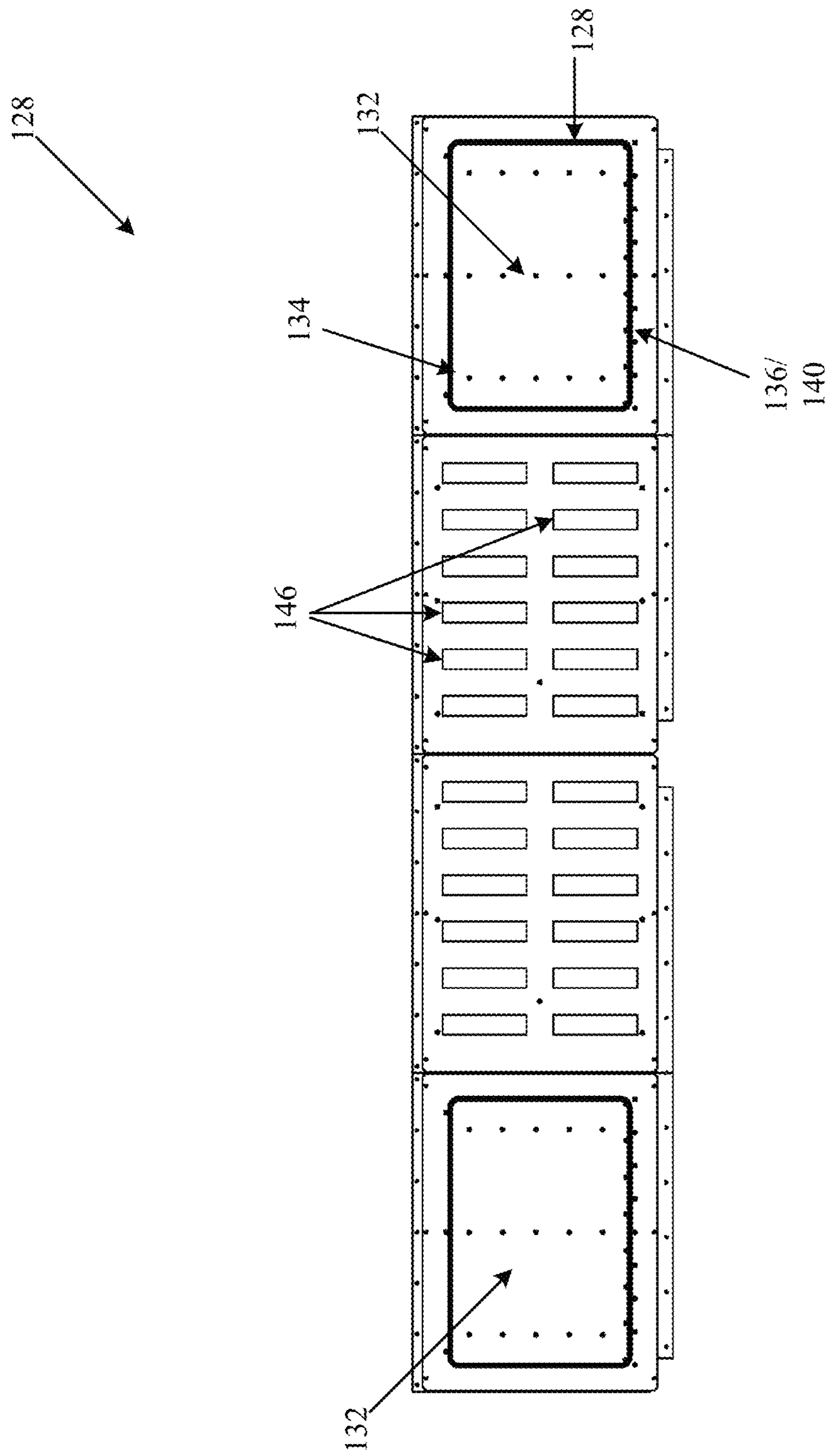
FIG. 21 shows a top side view of a lower airflow diverter of a mixed-flow grain dryer system, in accordance with one or more embodiments of the present disclosure.
Figure 22:
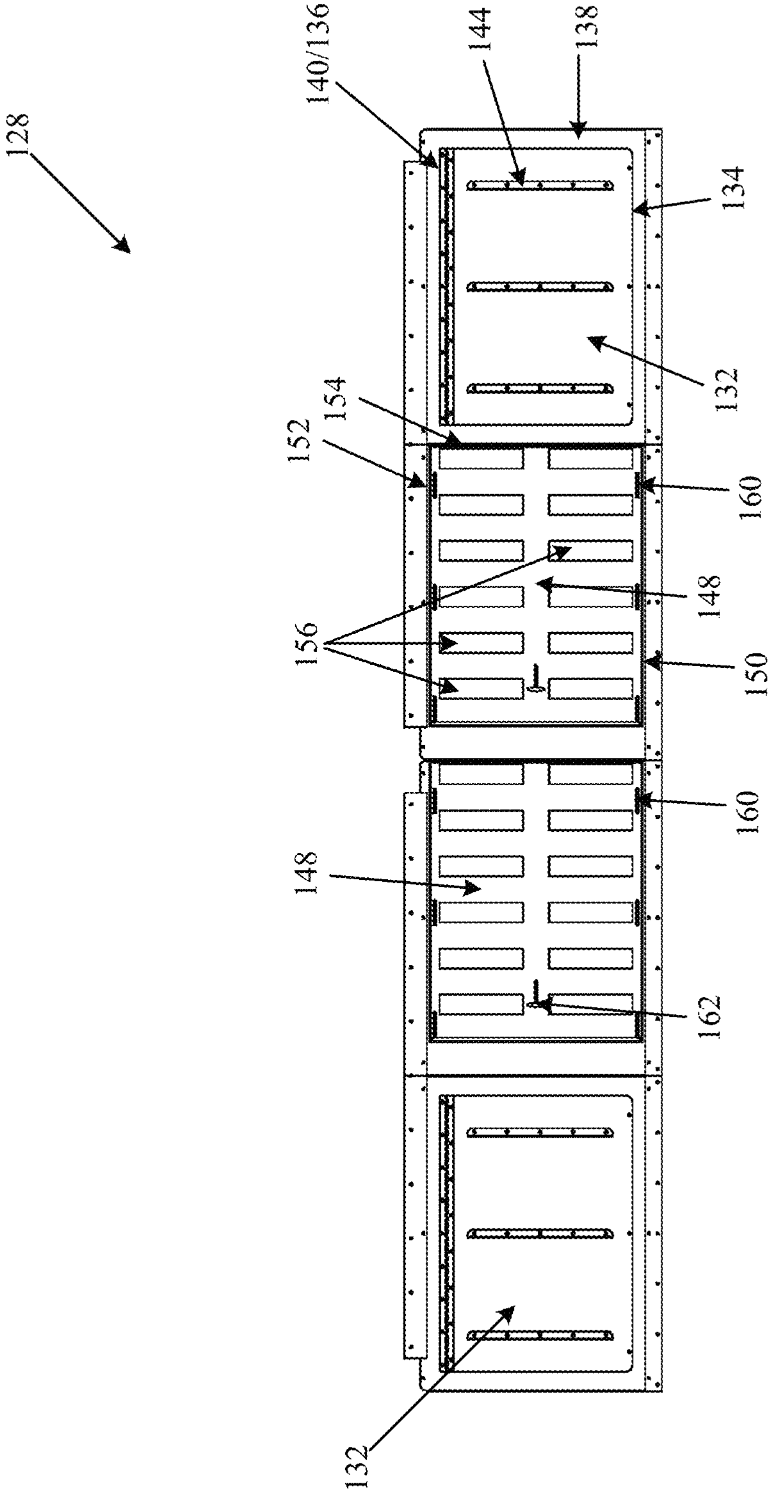
FIG. 22 shows a bottom side view of a lower airflow diverter of a mixed-flow grain dryer system, in accordance with one or more embodiments of the present disclosure.
Figure 23:
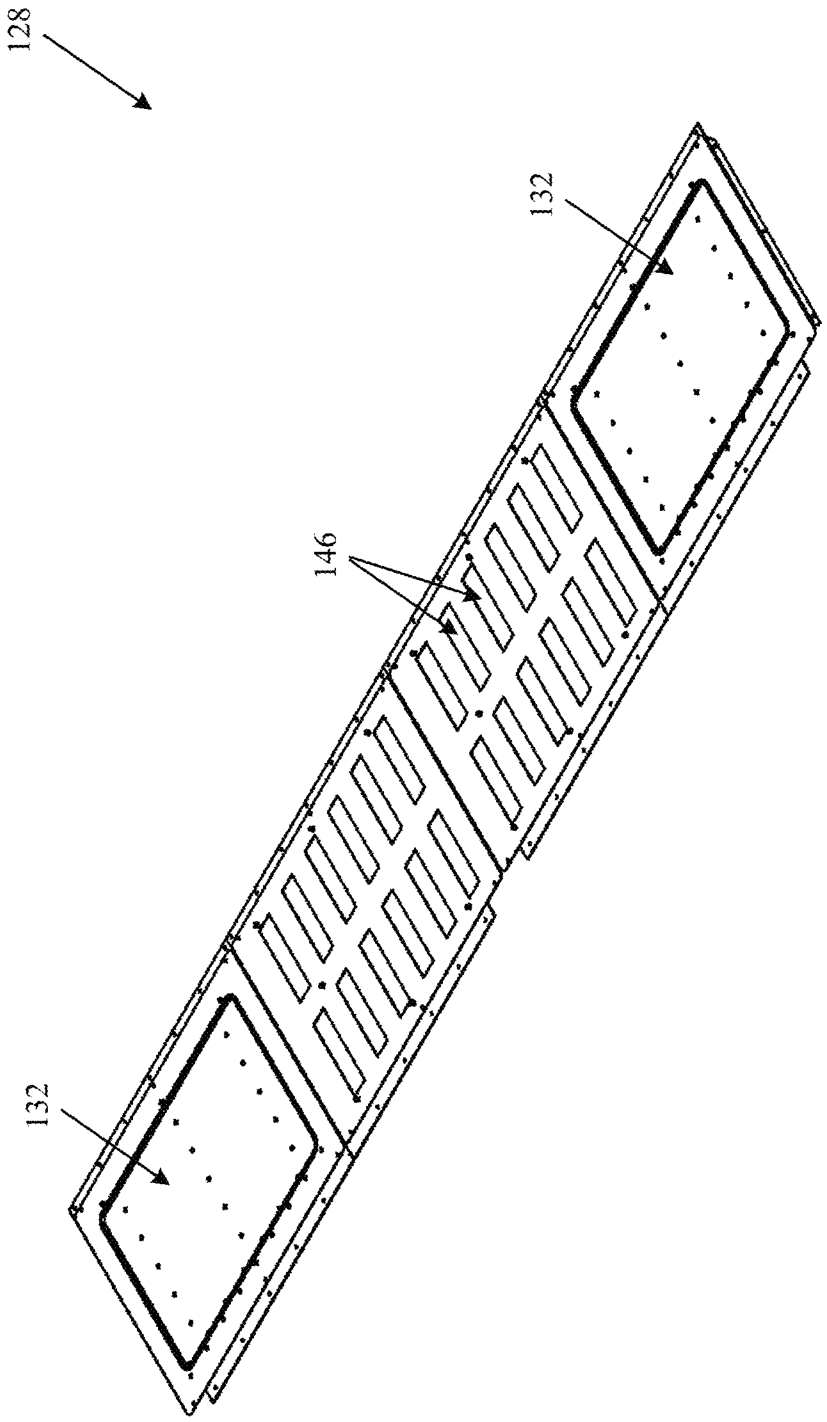
FIG. 23 shows an upper rear right perspective view of a lower airflow diverter of a mixed-flow grain dryer system, in accordance with one or more embodiments of the present disclosure.
Figure 24:
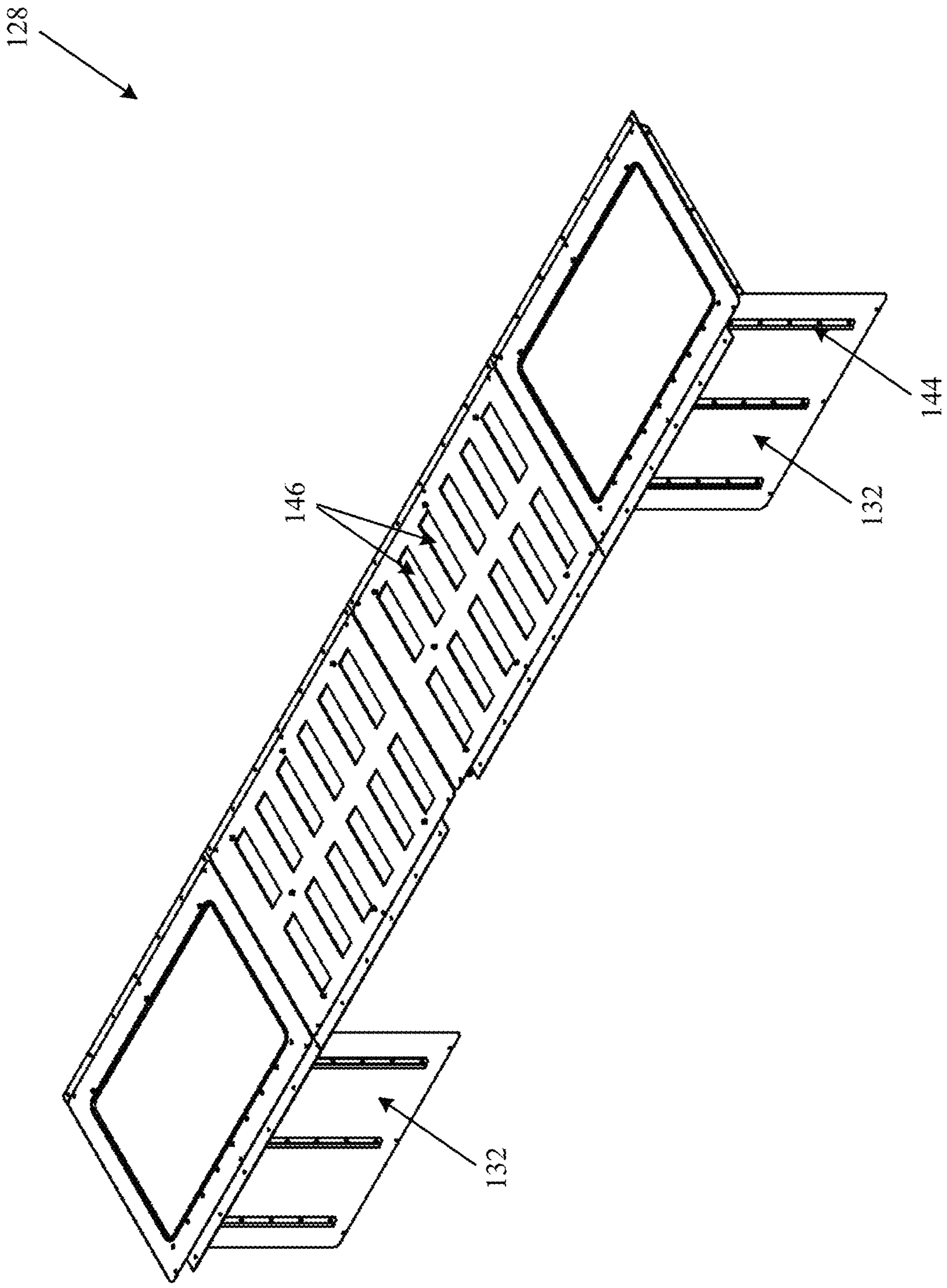
FIG. 24 shows an upper rear right perspective view of a lower airflow diverter of a mixed-flow grain dryer system, in accordance with one or more embodiments of the present disclosure; the view showing doors of the lower airflow diverter open.
Figure 25:
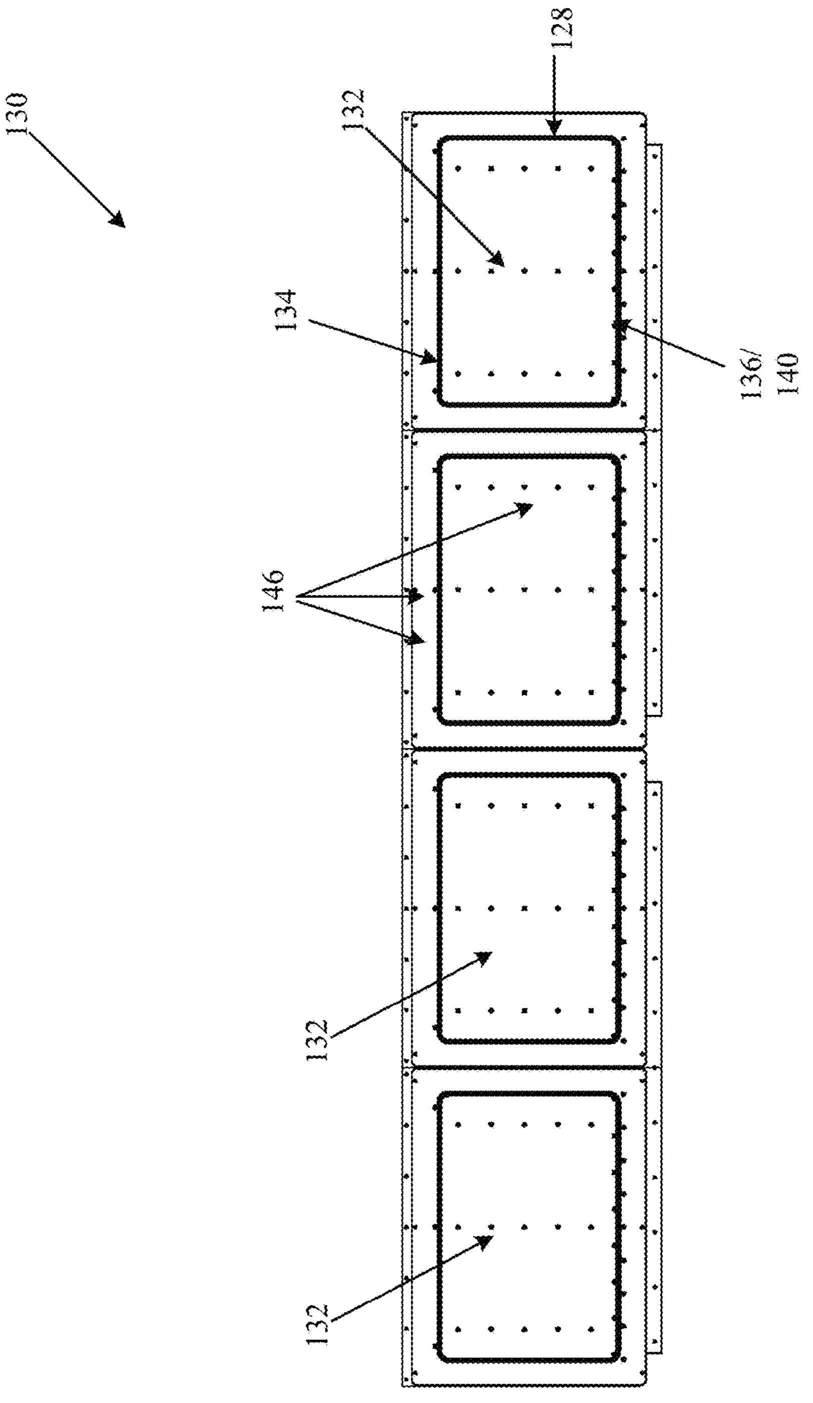
FIG. 25 shows a top side view of an upper airflow diverter of a mixed-flow grain dryer system, in accordance with one or more embodiments of the present disclosure.
Figure 26:
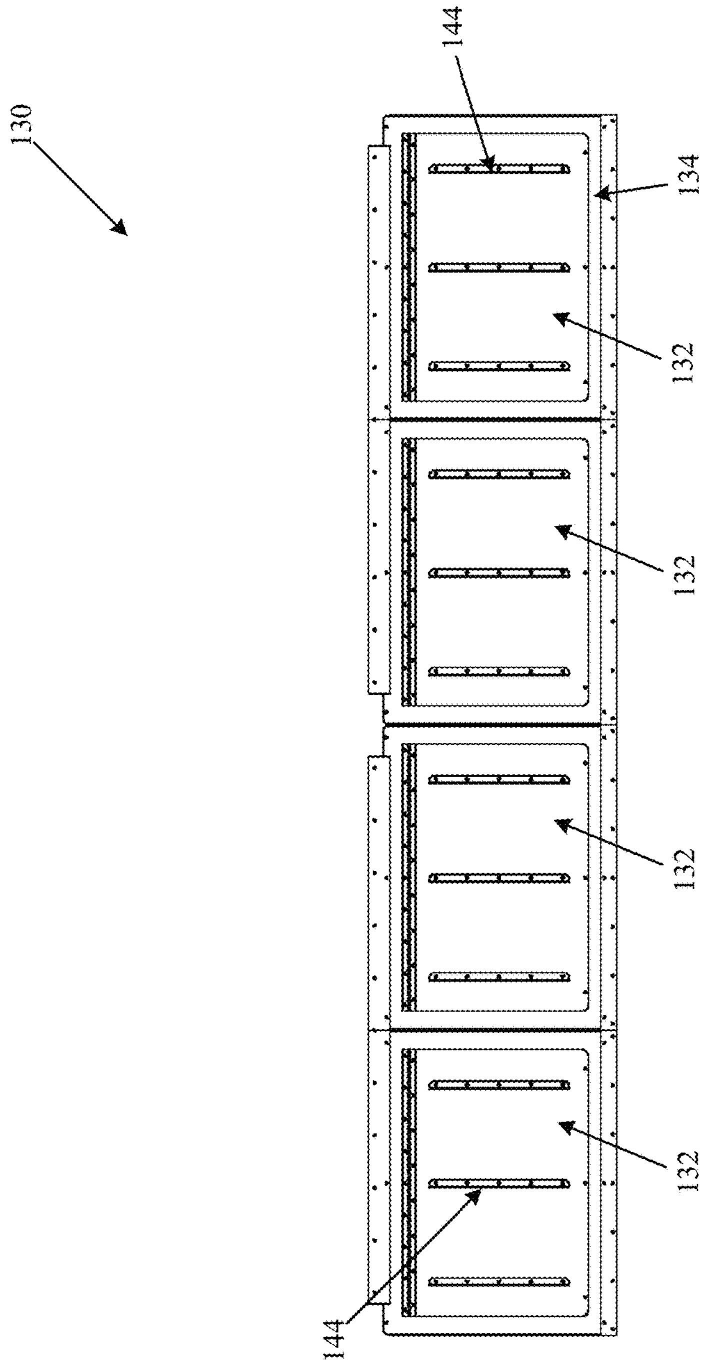
FIG. 26 shows a bottom side view of an upper airflow diverter of a mixed-flow grain dryer system, in accordance with one or more embodiments of the present disclosure.
Figure 27:
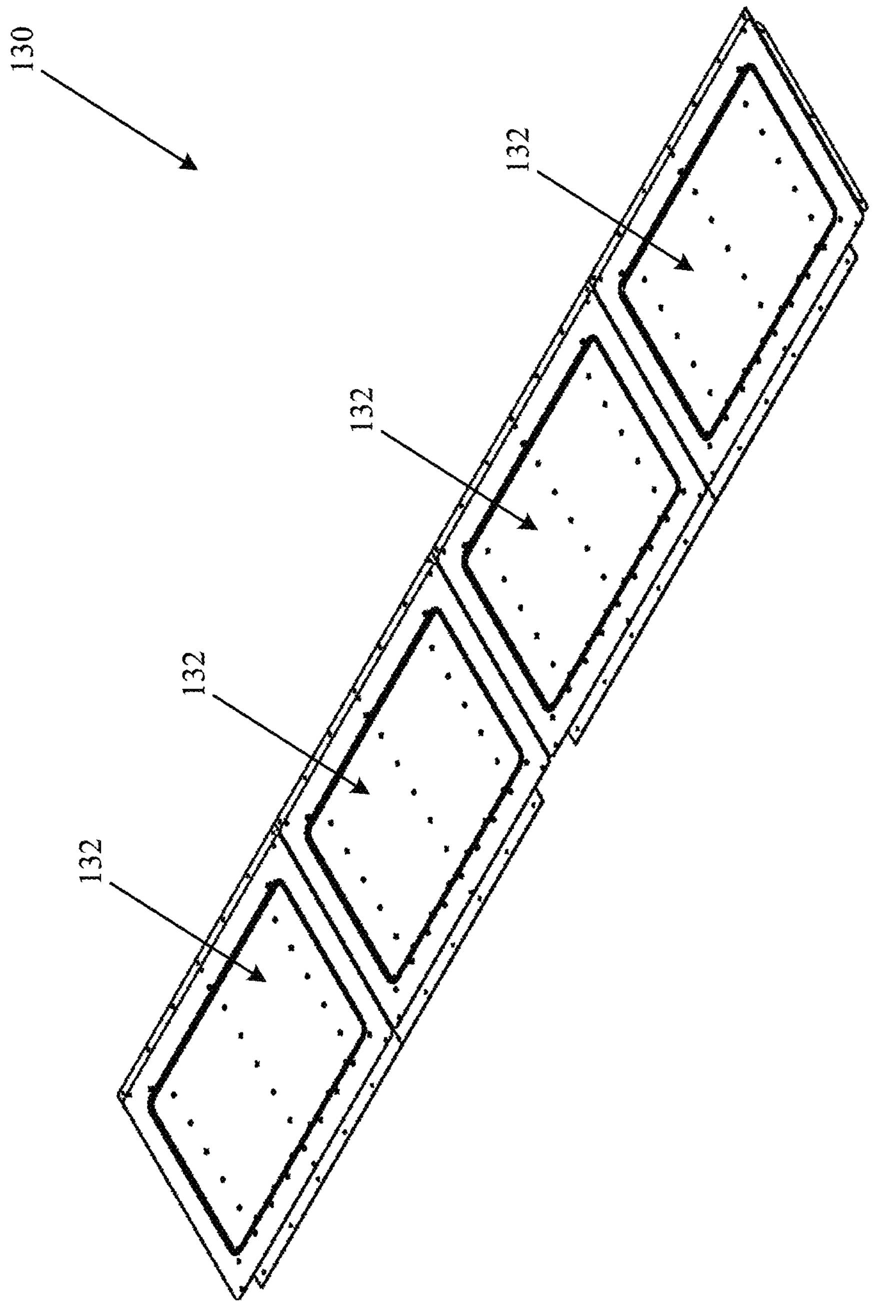
FIG. 27 shows an upper rear right perspective view of an upper airflow diverter of a mixed-flow grain dryer system, in accordance with one or more embodiments of the present disclosure.
Figure 28:
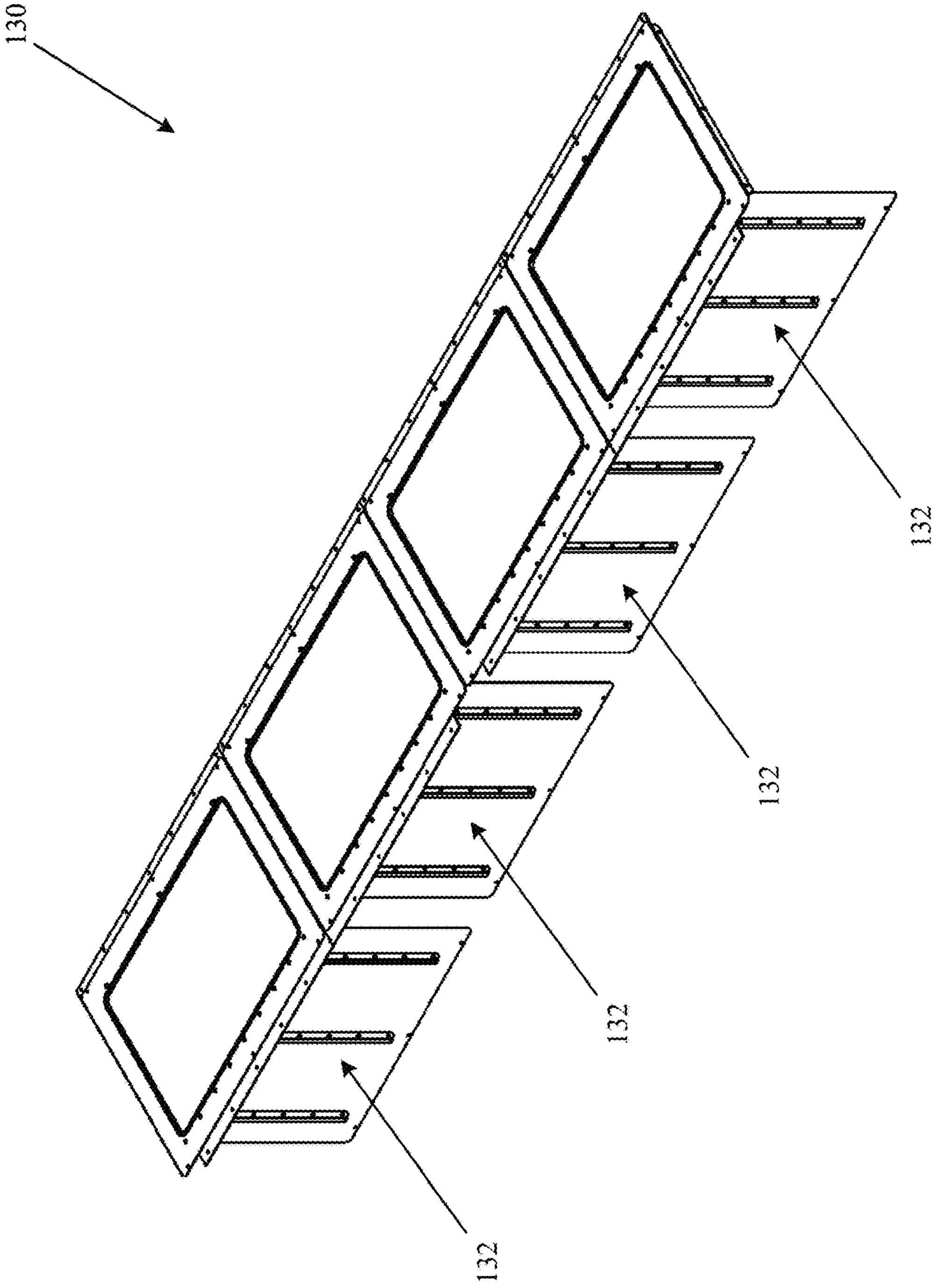
FIG. 28 shows an upper rear right perspective view of an upper airflow diverter of a mixed-flow grain dryer system, in accordance with one or more embodiments of the present disclosure; the view showing doors of the upper airflow diverter open.
Figure 29:
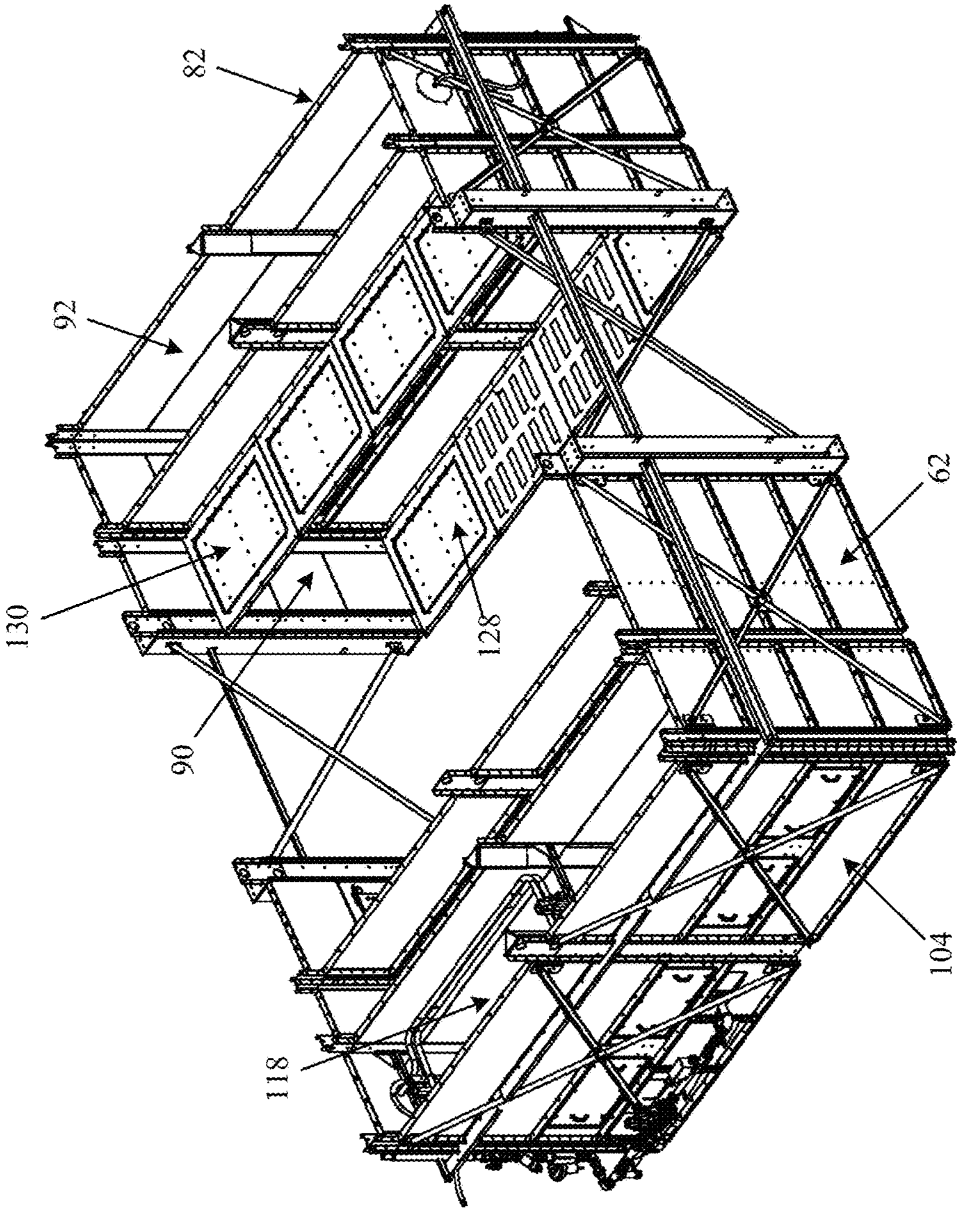
FIG. 29 shows an upper rear right perspective view of a lower portion of a mixed-flow grain dryer system proximate to a lower drying section, in accordance with one or more embodiments of the present disclosure; the view grain column of the mixed-flow grain dryer system omitted.
Figure 30:
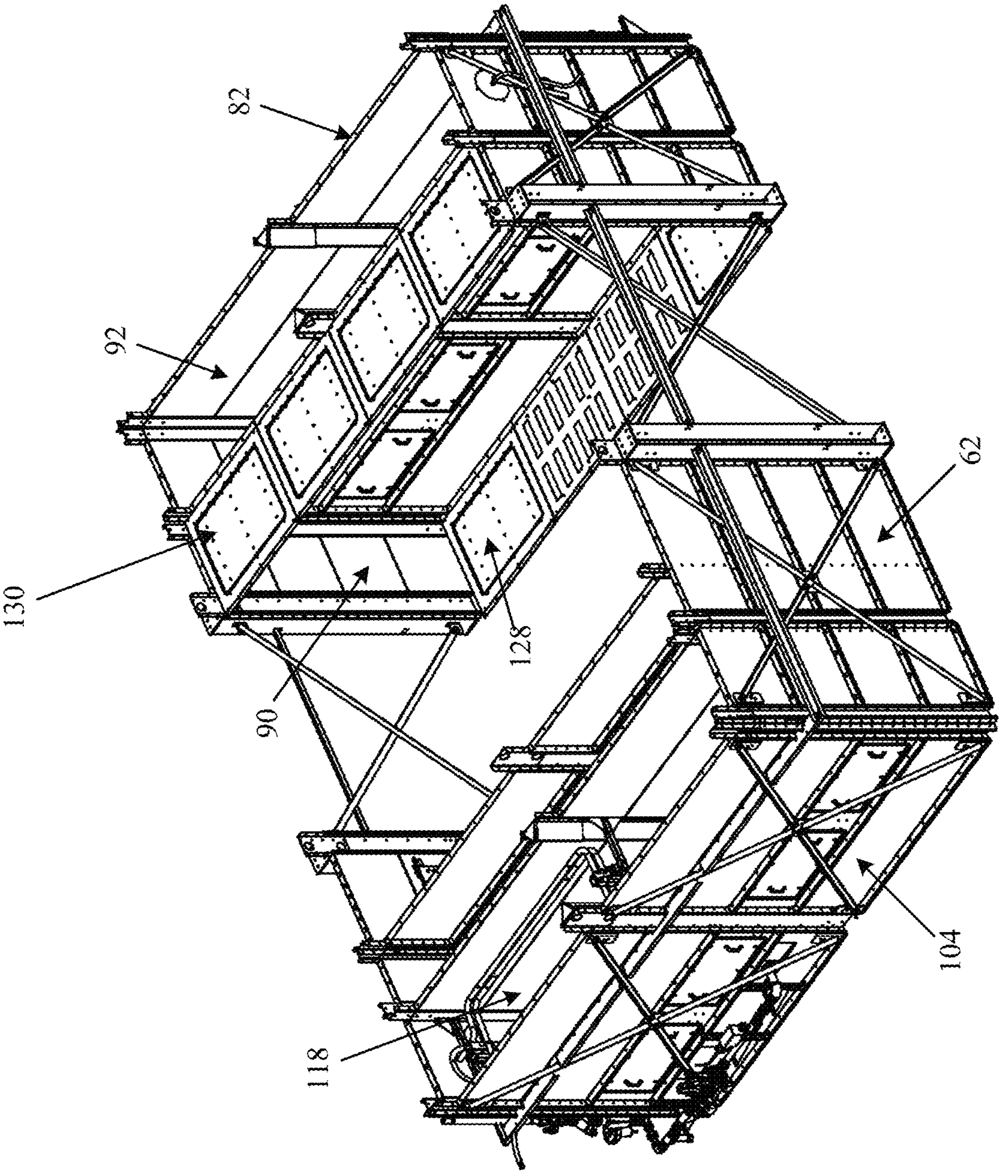
FIG. 30 shows an upper rear right perspective view of a lower portion of a mixed-flow grain dryer system proximate to a lower drying section, in accordance with one or more embodiments of the present disclosure; the view grain column of the mixed-flow grain dryer system omitted.
Figure 31:
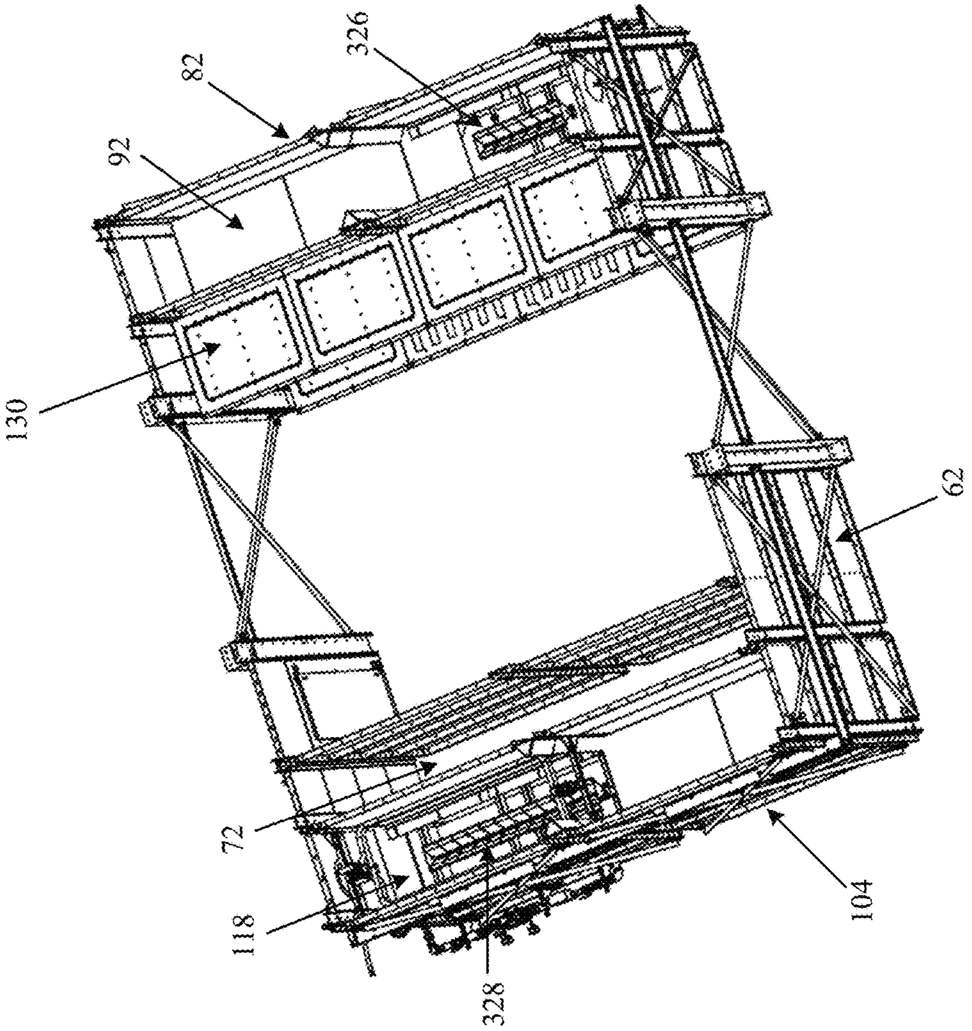
FIG. 31 shows an upper rear right perspective view of a lower portion of a mixed-flow grain dryer system proximate to a lower drying section, in accordance with one or more embodiments of the present disclosure; the view grain column of the mixed-flow grain dryer system omitted.
Figure 32:
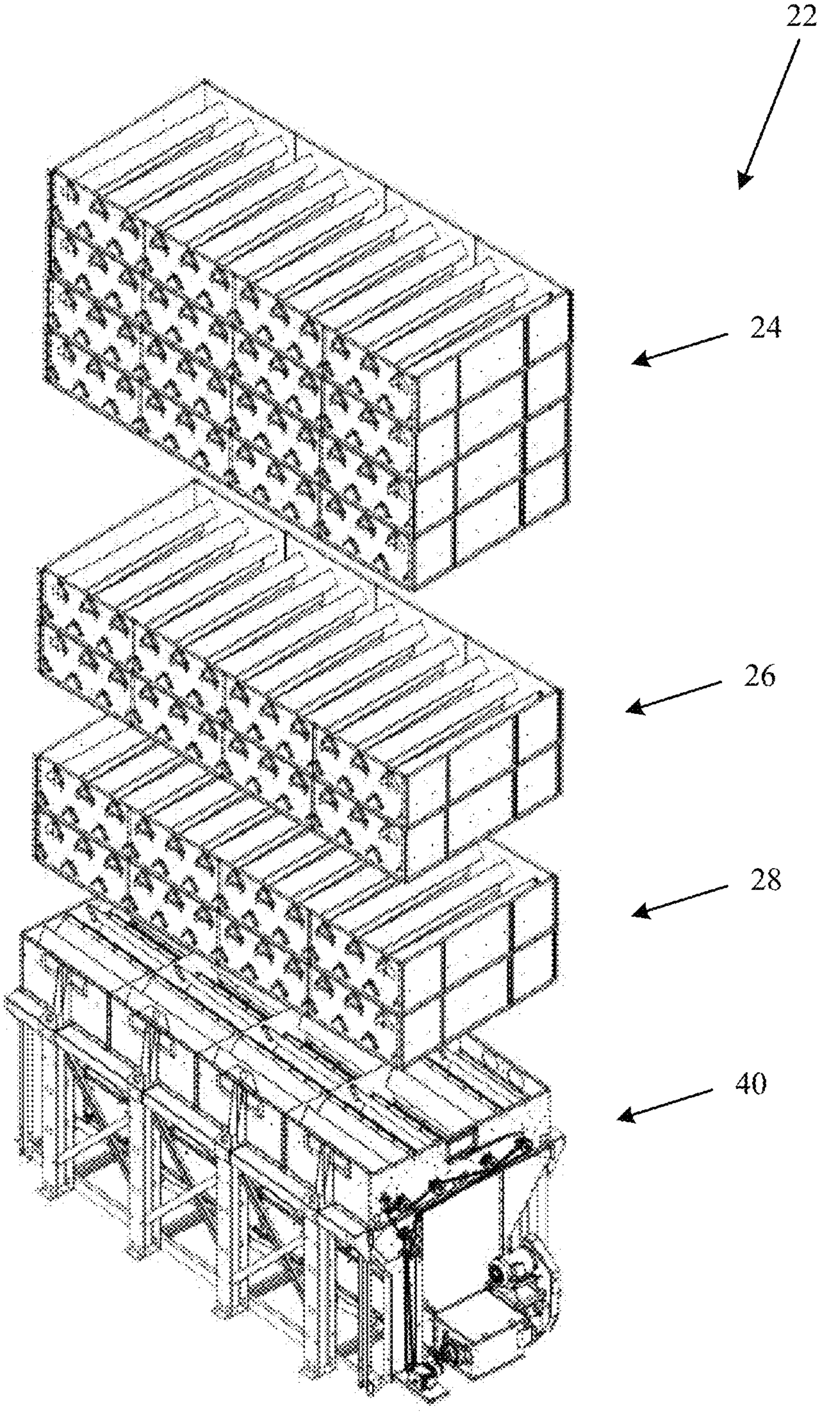
FIG. 32 shows an exploded upper front left perspective view of a grain column and unloading system of a mixed-flow grain dryer system, in accordance with one or more embodiments of the present disclosure.
Figure 33:
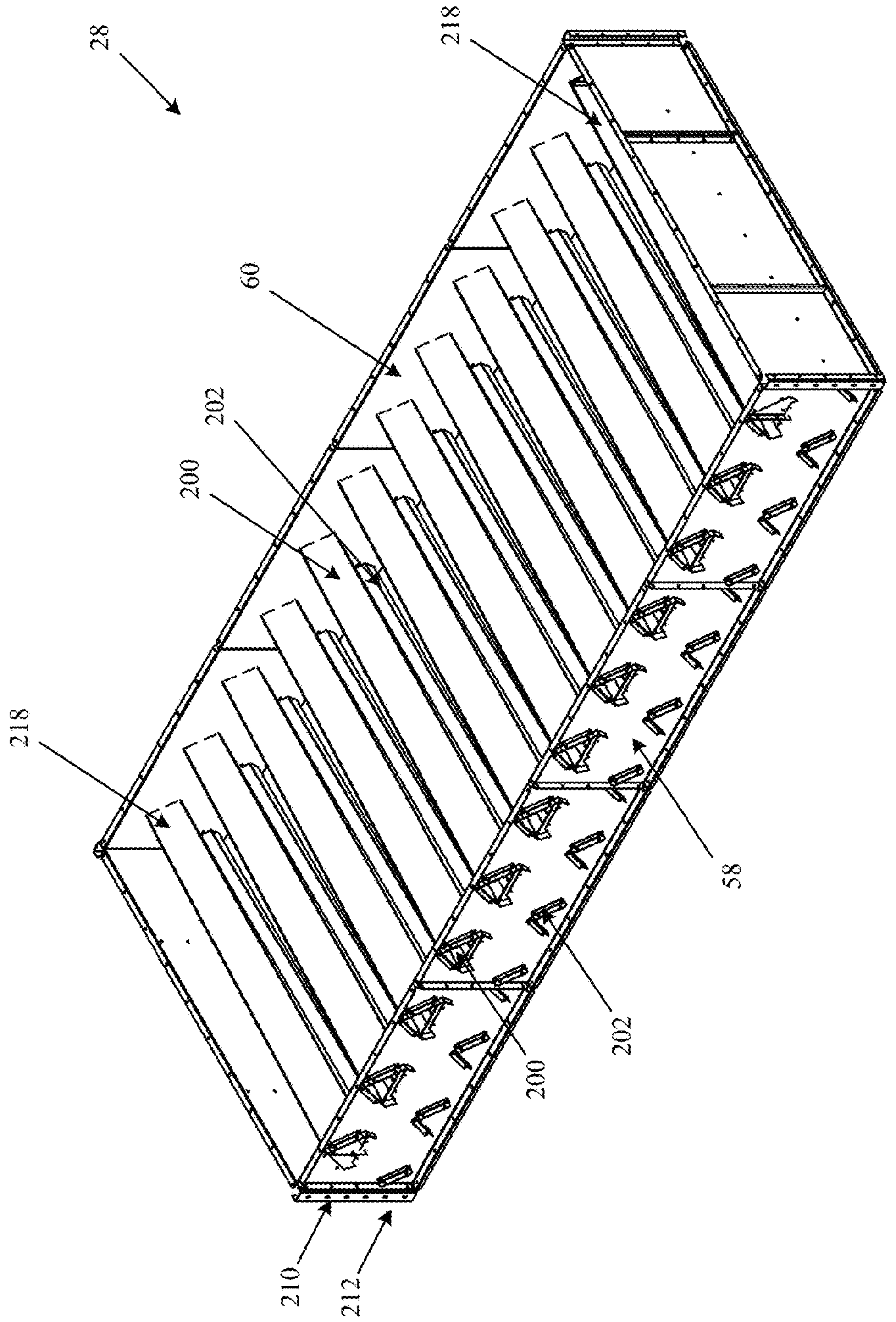
FIG. 33 shows an exploded upper front left perspective view of a portion of a drying section, in accordance with one or more embodiments of the present disclosure.
Figure 34:
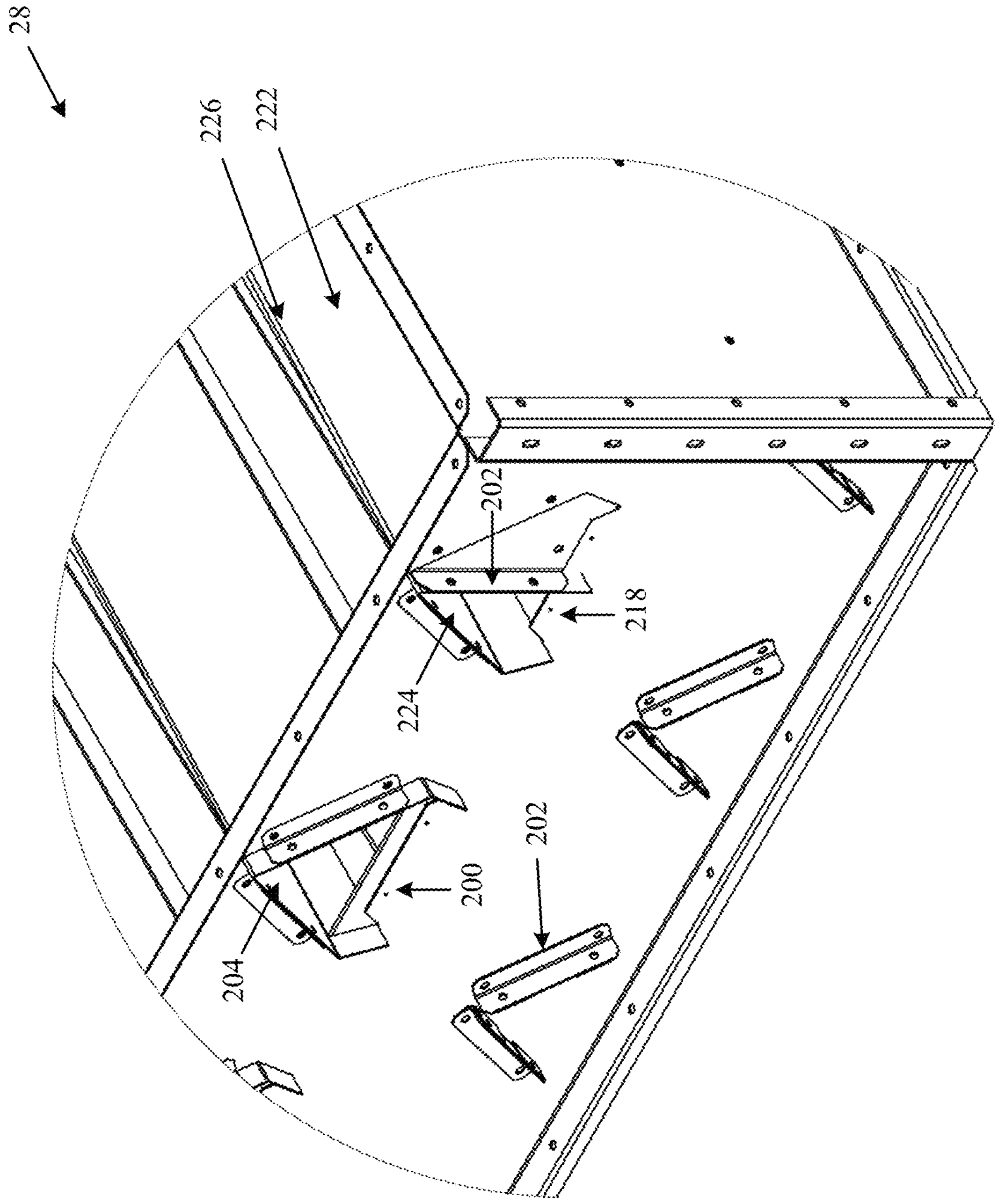
FIG. 34 shows a close-up of view of intake and exhaust vents of the portion of the drying section shown in FIG. 33, in accordance with one or more embodiments of the present disclosure.
Figure 35:
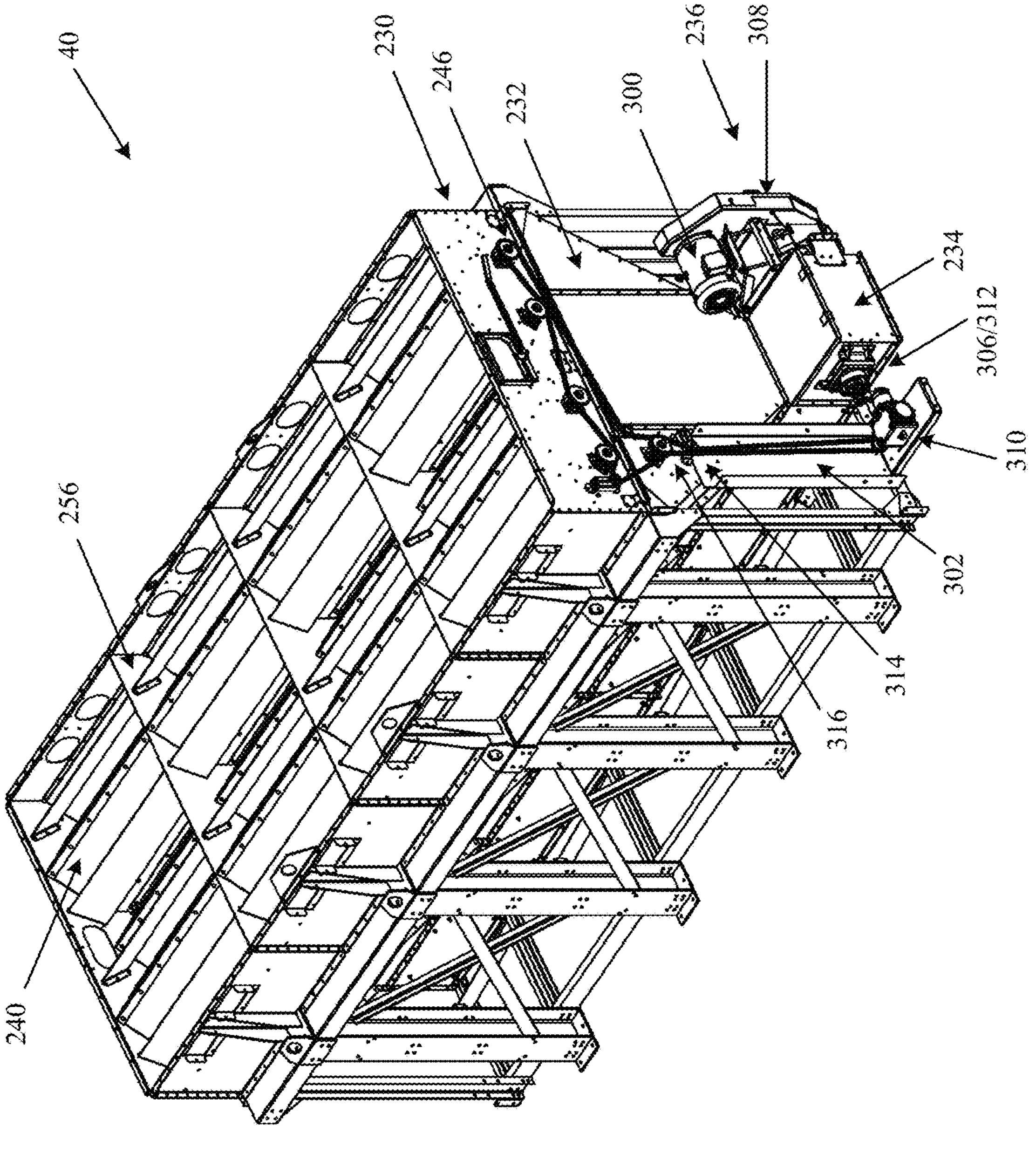
FIG. 35 shows an upper front left perspective view of an unloading system of a mixed-flow grain dryer system, in accordance with one or more embodiments of the present disclosure.
Figure 36:
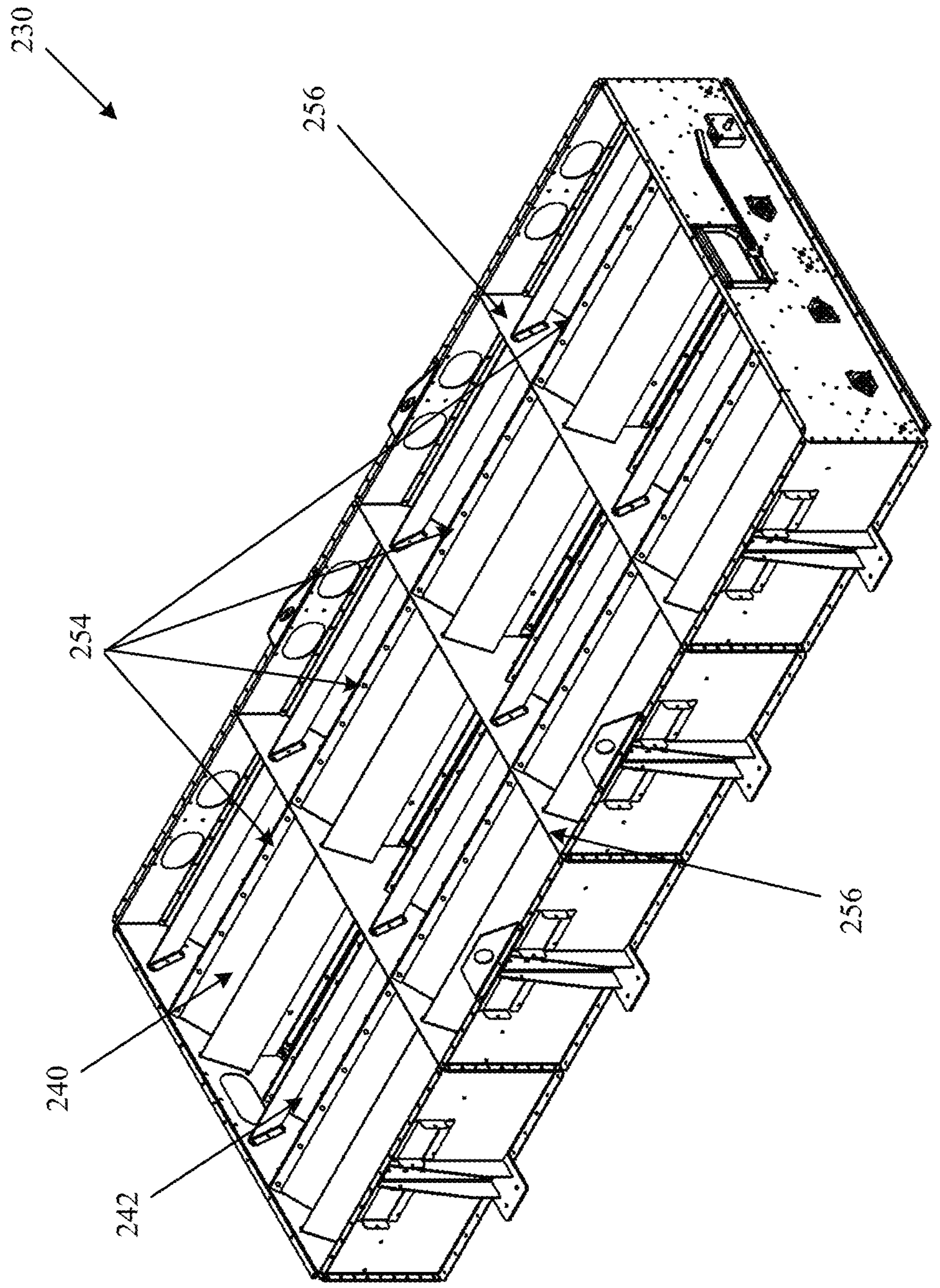
FIG. 36 shows an upper rear right perspective view of a metering section of an unloading system of a mixed-flow grain dryer system, in accordance with one or more embodiments of the present disclosure.
Figure 37:
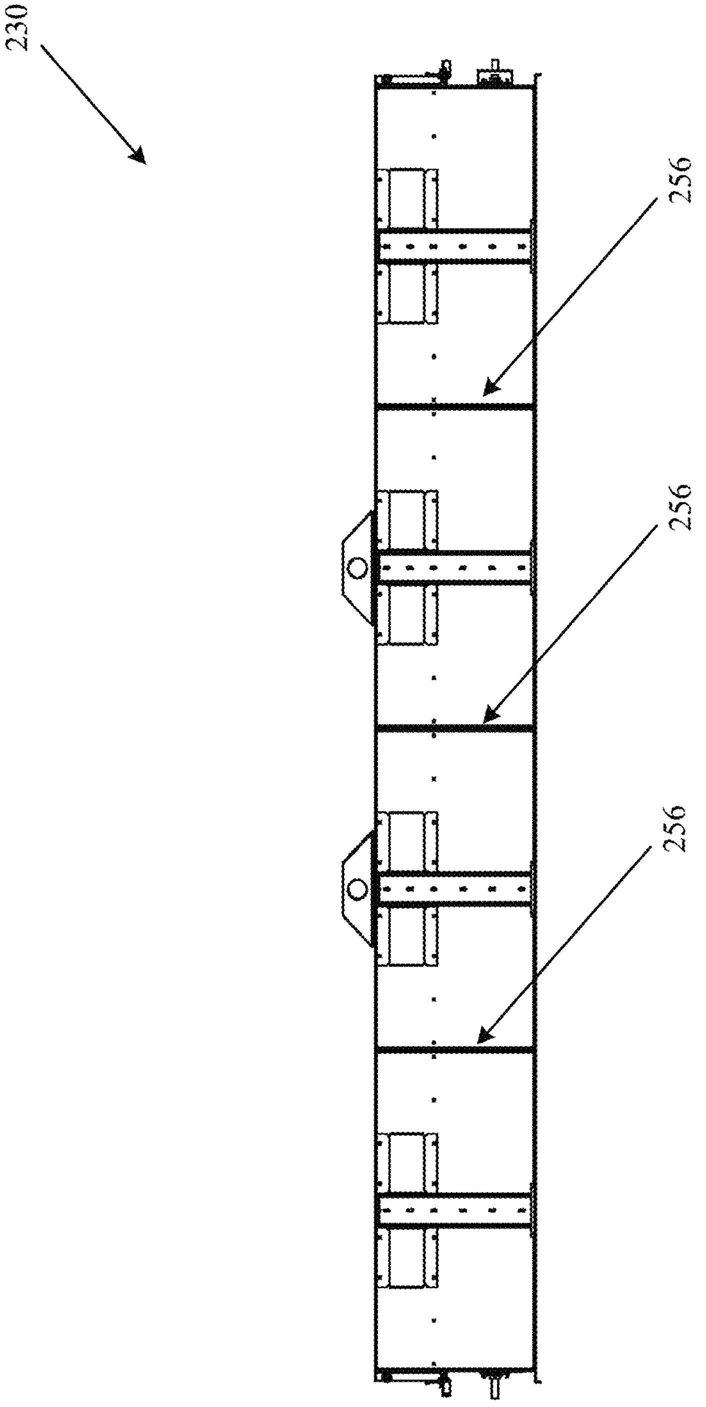
FIG. 37 shows a front view of a metering section of an unloading system of a mixed-flow grain dryer system, in accordance with one or more embodiments of the present disclosure
Figure 38:
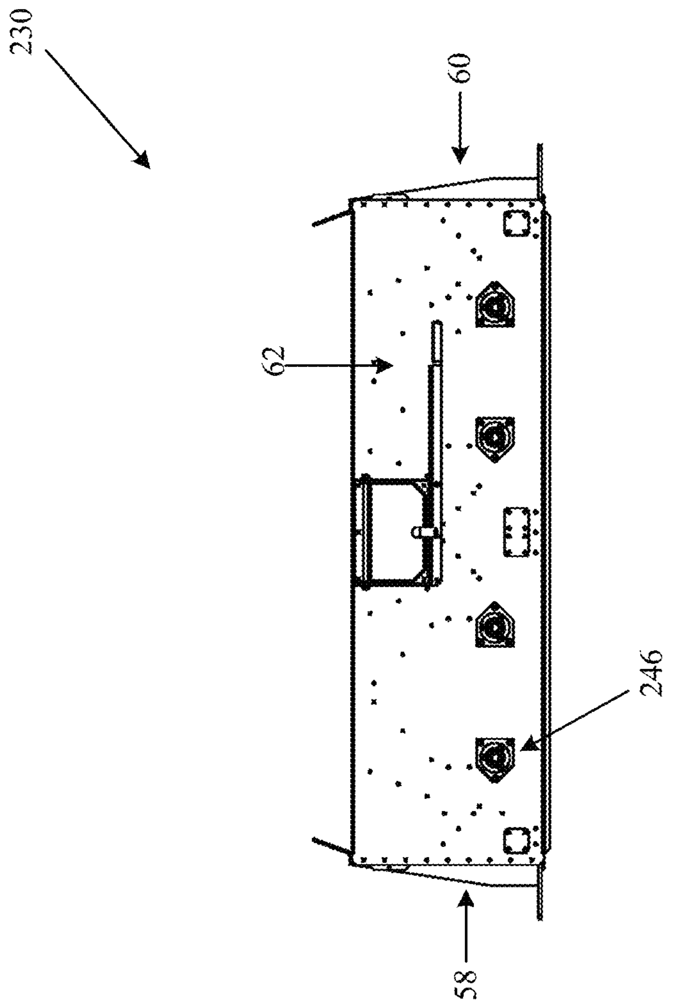
FIG. 38 shows a left side view of a metering section of an unloading system of a mixed-flow grain dryer system, in accordance with one or more embodiments of the present disclosure.
Figure 39:
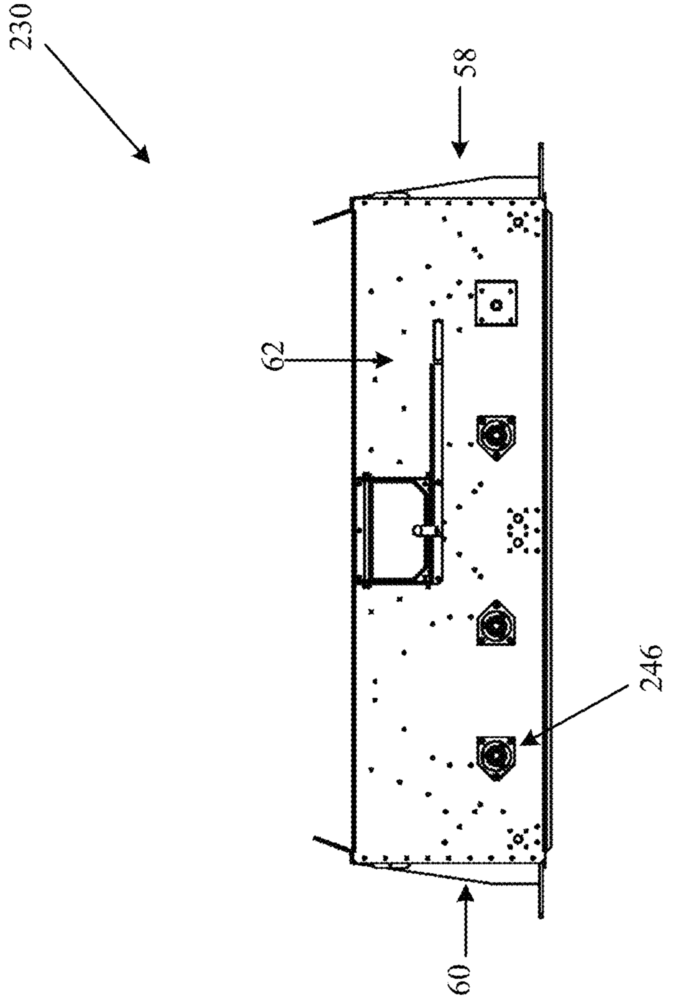
FIG. 39 shows a right side view of a metering section of an unloading system of a mixed-flow grain dryer system, in accordance with one or more embodiments of the present disclosure.
Figure 40:
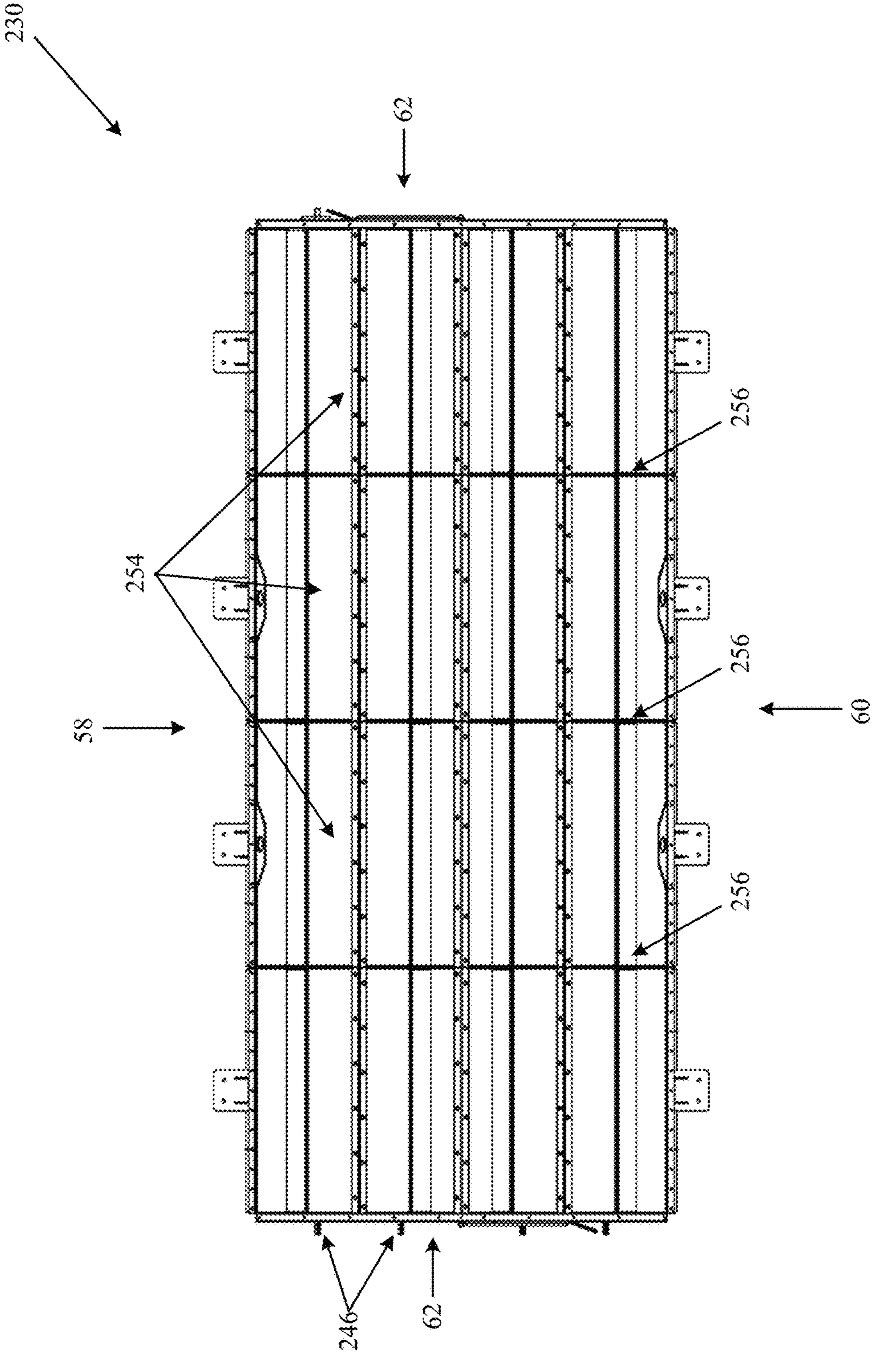
FIG. 40 shows a top side view of a metering section of an unloading system of a mixed-flow grain dryer system, in accordance with one or more embodiments of the present disclosure
Figure 41:
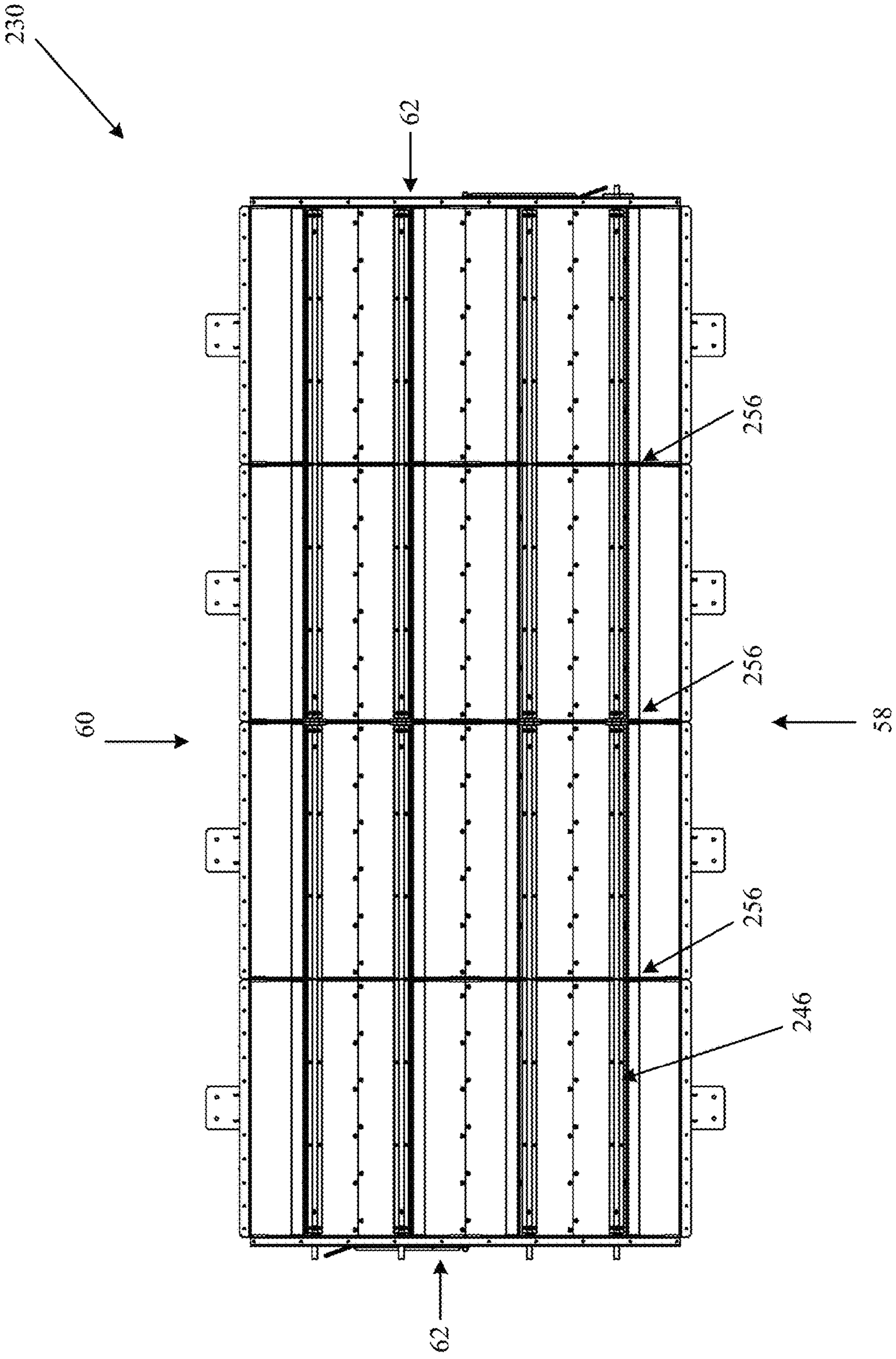
FIG. 41 shows a bottom side view of a metering section of an unloading system of a mixed-flow grain dryer system, in accordance with one or more embodiments of the present disclosure
Figure 42:
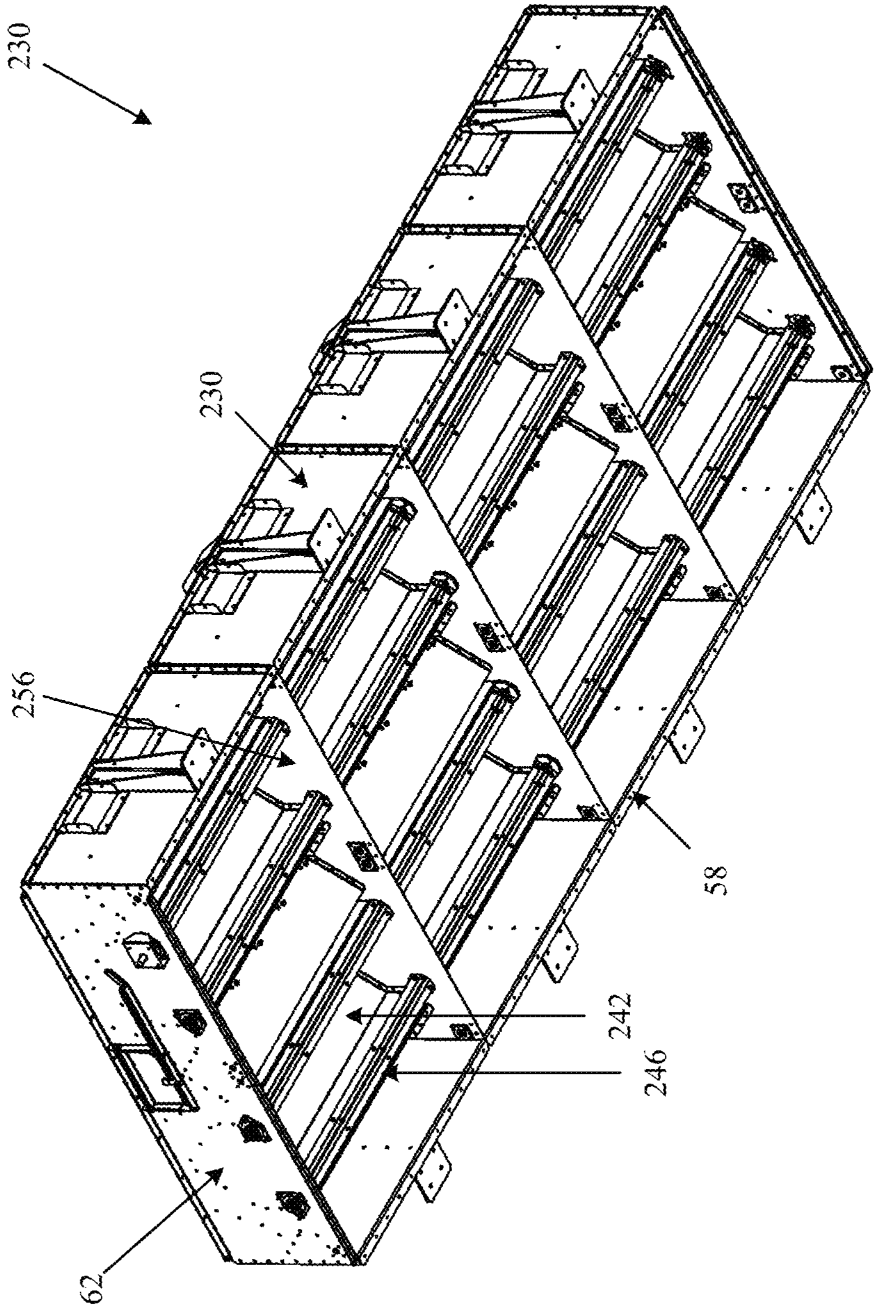
FIG. 42 shows a lower rear right perspective view of a metering section of an unloading system of a mixed-flow grain dryer system, in accordance with one or more embodiments of the present disclosure.
Figure 43:
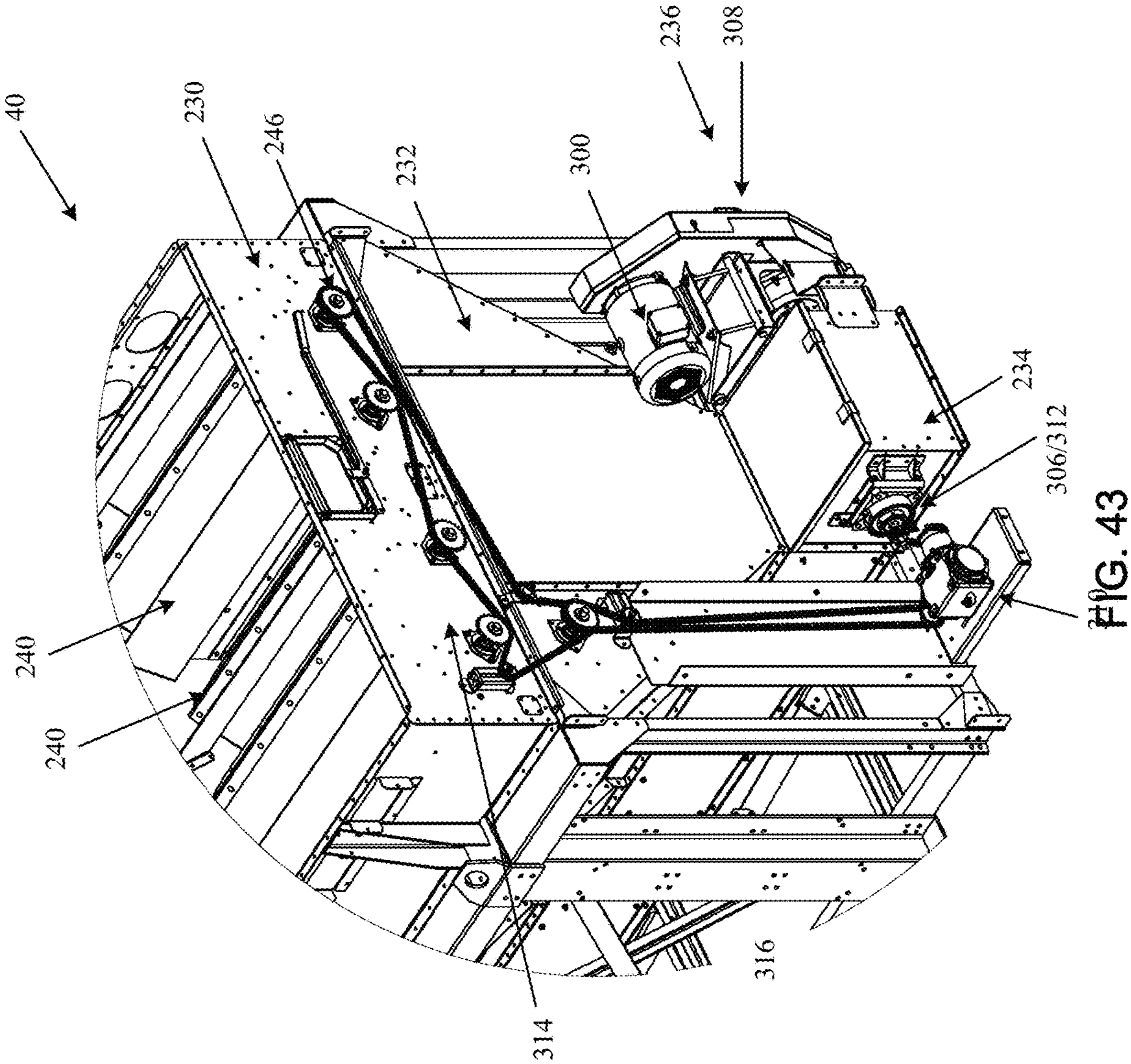
FIG. 43 shows a close up upper front left perspective view of an unloading system of a mixed-flow grain dryer system, in accordance with one or more embodiments of the present disclosure; the view showing a close up of the left side of the unloading system.
Figure 44:
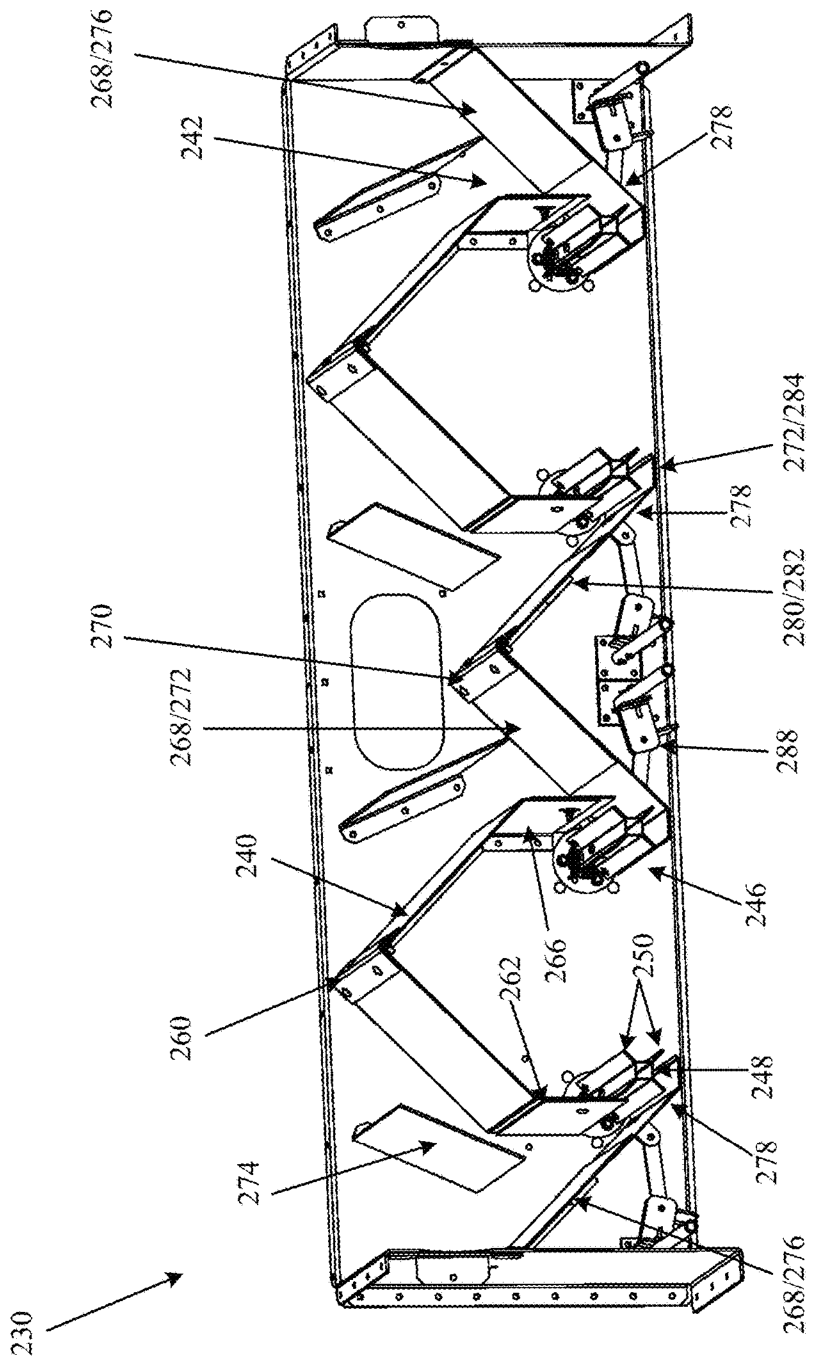
FIG. 44 shows an upper front left perspective cross sectional view of a metering section of an unloading system of a mixed-flow grain dryer system, in accordance with one or more embodiments of the present disclosure.
Figure 45:
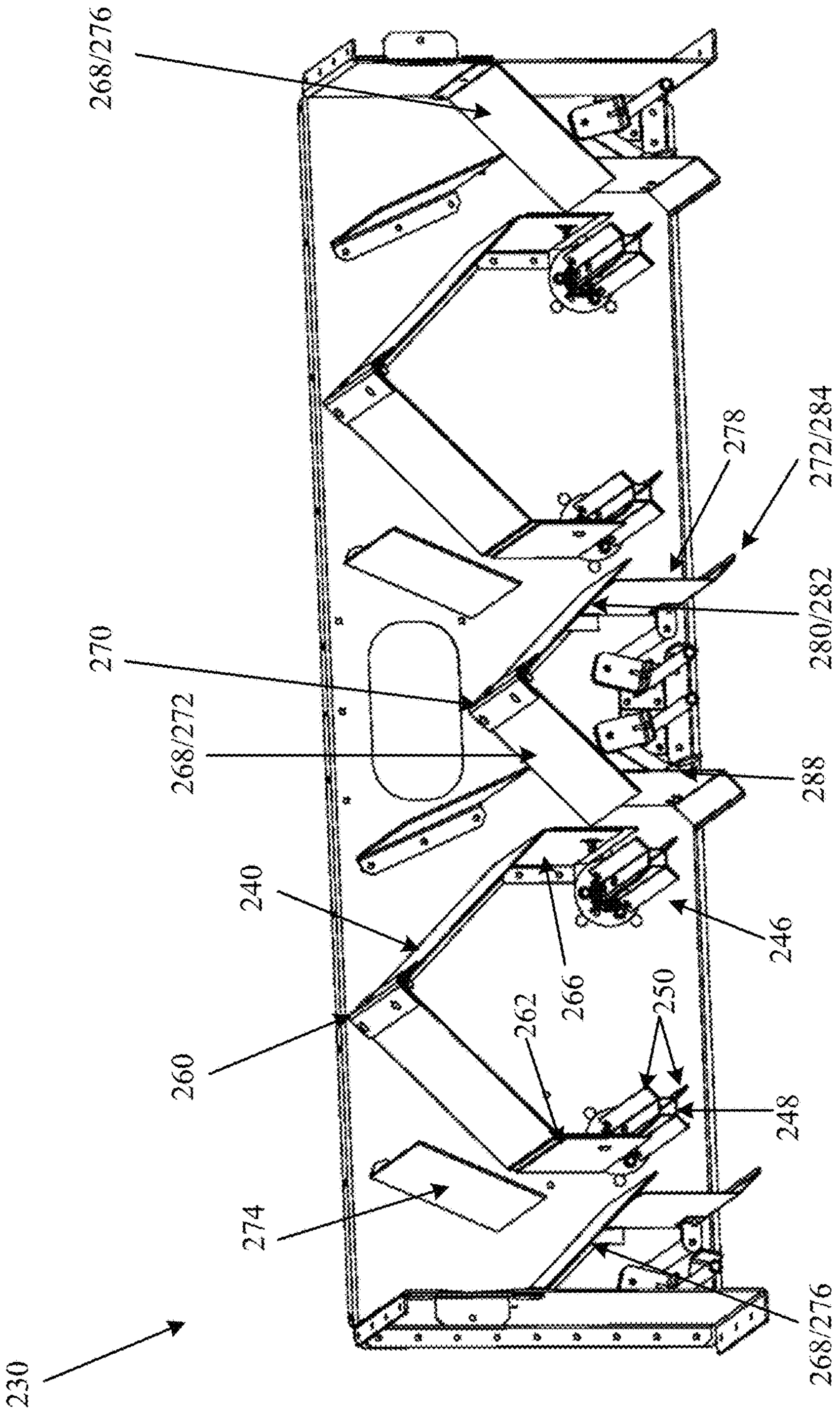
FIG. 45 shows an upper front left perspective cross sectional view of a metering section of an unloading system of a mixed-flow grain dryer system, in accordance with one or more embodiments of the present disclosure; the view showing hinged lower portions of the metering section opened to provide access to meter wheels to facilitate cleaning and/or maintenance.
Figure 46:
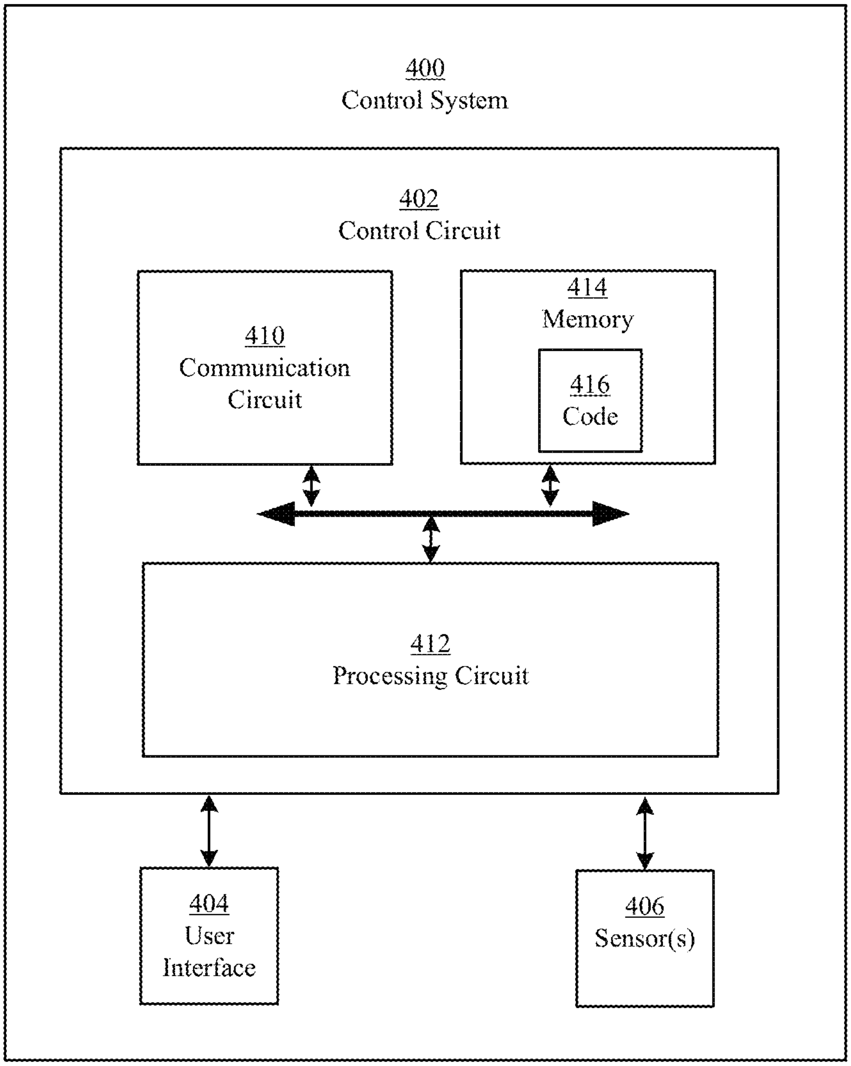
FIG. 46 shows an example control system for use with a mixed-flow grain dryer system, in accordance with one or more embodiments of the present disclosure.

In this example arrangement, recovery plenum 72, when viewed from the side (as is shown in FIG. 2) is generally L-shaped with a rectangular upper portion extending between rearward interior wall 60, divider 102, and exterior side walls 62 from an upper divider 110 to a lower end wall 112 of recovery plenum 72. The lower portion of recovery plenum 72, which is wider than the upper portion of recovery plenum 72 in this example, extends between rearward interior wall 60, rearward exterior wall 104, and exterior side walls 62 from a lower end wall 112 on its lower side, to lower end of duct 118 on its upper side.

In this example arrangement, a portion of a fan system 44 of air handling system 42 is positioned within the lower portion of recovery plenum 72 near rearward exterior wall 104. Fan system 44 draws in air from recovery plenum 72 and blows the air upward through duct 118, where it is heated by heating system 46, to upper heat plenum 76.

Upper Heat Plenum 76:

Upper heat plenum 76 is formed of any suitable size, shape, and design and is configured to receive heated air from duct 118 and heating system 46 and facilitate the flow of the heated air through upper drying section 24 of grain column 22. In the arrangement shown, as one example, upper heat plenum 76 extends between rearward interior wall 60, rearward exterior wall 104, and exterior side walls 62, from upper divider 110 to upper exterior wall 122. In this example arrangement, pressure created by air handling system 42 causes higher heat air to be pushed from upper heat plenum 76 through upper drying section 24 of grain column 22 to exhaust plenum 78.

Exhaust Plenum 78:

Exhaust plenum 78 is formed of any suitable size, shape, and design and is configured to receive heated air pushed through upper drying section 24 of grain column 22 and transport the received air out to the outside through an exhaust vent 124. In the arrangement shown, as one example, exhaust plenum 78 extends between forward interior wall 58, forward exterior wall 82, and exterior side walls 62, from upper divider 96 to upper exterior wall 122. In this example arrangement, pressure created by air handling system 42 pushes humid higher heat air out from system 10 through exhaust vent 124. In this example arrangement, exhaust vent 124 is positioned in an upper end of forward exterior wall 82 so as to help facilitate the collection of fines, debris, dust and other contaminants so as to prevent venting them to the surrounding environment. In one arrangement, exhaust vent 124 may be covered by a filter member to further capture fines, debris, dust and other contaminants prior to venting them to the surrounding environment.

Loading System 30:

In one or more arrangements, mixed-flow grain dryer system 10 includes a loading system 30. Loading system 30 is formed of any suitable size, shape, and design and is configured to facilitate loading of wet grain into system 10. As one example, in one or more arrangements, loading system 30 may include an auger system having an input 170 (not shown), that receives grain from a chute or other device. A shaft 172 (not shown) with flighting 174 (not shown) extends across the upper end of system 10. The shaft 172 with flighting 174 is connected to a motor 176 (not shown) by a pulley and belt system and is configured to rotate the shaft 172 with fighting 174. A housing 178 (not shown) is positioned over and around the shaft 172 with fighting 174 so as to constrain the grain moved by the shaft 172 with flighting 174. In one example arrangement, housing 178 is generally square or rectangular with an open lower end that connects to wet hold section 32 so as to facilitate the transfer of grain from the loading system 30 to wet hold section 32. Additionally or alternatively, a gravity fill system is hereby contemplated for use as loading system 30. Additionally or alternatively, a belt, a conveyor, a paddle sweep, a drag chain system, and/or any other grain movement device or system is hereby contemplated for use as loading system 30. Any other structure or configuration of a system for loading grain is hereby contemplated for use as loading system 30.

Wet Hold Section 32:

In the arrangement shown, as one example, mixed-flow grain dryer system 10 includes a wet hold section 32. Wet hold section 32 is formed of any suitable size, shape, and design and is configured to hold and stage a quantity of wet grain prior to the grain passing through the grain column 22.

In the arrangement shown, as one example, wet hold section 32 connects at its upper end to the lower end of loading system 30 and connects at its lower end to the upper end of grain column 22. In the arrangement shown, as one example, wet hold section 32 starts the formation of grain columns 22.

In the arrangement shown, as one example, the upper side of wet hold section 32 includes upper side walls 186 and upper end walls 188 that enclose the upper end of wet hold section 32. In the arrangement shown, as one example, upper side walls 186 connect at their upper end to the lower end of the sides of housing 178 of loading system 30, and upper side walls 186 connect at their lower end to the upper end of forward interior wall 58 and rearward interior wall 60. Similarly, in the arrangement shown, as one example, upper end walls 188 connect at their upper end to the lower end of the ends of housing 178 of loading system 30, and upper end walls 188 connect at their lower end to the upper end of exterior side walls 62. In the arrangement shown, as one example, upper side walls 186 and upper end walls 188 extend downward at an angle as they extend outward thereby forming a sloped roof at the upper end of system 10.

In the arrangement shown, as one example, a door 190 is positioned in one or both upper end walls 188. Door 190 is formed of any suitable size, shape, and design and is configured to provide access to the hollow interior of wet hold section 32 so as to facilitate repair and cleaning of the components of wet hold section 32. In some various arrangements, additional doors 190 may be placed in other parts wet hold section 32, such as upper side walls 186, or for that matter in any other part of system 10 such as exterior side walls 62 of grain column 22 as well as any other place or position.

Grain moves through wet hold section 32 from loading system 30 and into upper drying section 24 of grain column 22. The volumetric holding capacity of wet hold section 32 ensures that an adequate buffer of wet grain is on hand at all times to ensure the grain column 22 is always filled while accommodating loading variability during use. In this way, wet hold section 32 stages grain for drying in grain column 22 as well as directs grain into grain column 22 under the force of gravity. To be clear, in a manner of speaking, grain column 22 begins in wet hold section 32 between upper side walls 186 and lower walls 54.

Mixed-Flow Drying Sections 24, 26, and 28:

The upper drying section 24, middle drying section 26 and lower drying section 28 of grain column 22 are formed of any suitable size, shape, and design and are configured to facilitate drying of grain by flowing air through the grain as it moves through the drying sections 24, 26, and 28. In the arrangement shown, as one example, upper drying section 24, middle drying section 26, and lower drying section 28 are all configured in a mixed flow arrangement. However, embodiments are not so limited. Rather, it is contemplated that grain column 22 may additionally or alternately include one or more cross-flow drying sections.

In the arrangement shown, as one example, upper drying section 24 extends between forward interior wall 58, rearward interior wall 60 and exterior side walls 62 from a lower end of wet hold section 32 to upper divider 110 between upper heat plenum 76 and recovery plenum 72. In this example arrangement, middle drying section 26 extends between forward interior wall 58, rearward interior wall 60 and exterior side walls 62 from upper divider 110 to lower end 94 of lower heat plenum 70. In this example arrangement, lower drying section 28 extends between forward interior wall 58, rearward interior wall 60, and exterior side walls 62 from lower end 94 of lower heat plenum 70 to upper end 86 of intake plenum 68 and/or the lower airflow diverter 128 and/or the lower end of grain column 22, where lower drying section 28 connects to unloading system 40.

In the arrangement shown, as one example, drying sections 24, 26, and 28 of grain column 22 include a set of inlet ducts 200 and a set of exhaust ducts 202 to facilitate flow of air through grain column 22. Inlet ducts 200 and exhaust ducts 202 may be formed of any suitable size, shape, and design and are configured to allow the flow of heated air through the grain in grain column 22 so as to facilitate gentle heating and drying of the grain. In the arrangement shown, as one example, when viewed from the front or rear, inlet ducts 200 and exhaust ducts 202 are generally triangular-shaped members having a pair of opposing walls 204 that connect to one another at their upper end at a peak 206 and extend outward and downward from the peak 206 at an angle before terminating their lower ends. The lower ends of inlet ducts 200 and exhaust ducts 202 are open, thereby allowing for the free flow of air out of the inlet ducts 200 and into the grain and into the exhaust ducts 202 and out of the grain from their open lower end.

In one arrangement, the lower end of inlet ducts 200 and exhaust ducts 202 are completely open. This configuration of having an open lower end of inlet ducts 200 and exhaust ducts 202 is acceptable in many applications due to the manner in which grain moves through grain columns 22 under the force of gravity which prevents the grain from escaping through the open lower end of inlet ducts 200 and exhaust ducts 202. In some another arrangements, the lower end of inlet ducts 200 and exhaust ducts 202 may be covered by a screen, a perforated sheet or another component that allows airflow there through while preventing grain from escaping inlet ducts 200 and exhaust ducts 202.

Inlet ducts 200 and exhaust ducts 202 extend a length between opposing ends. In the arrangement shown, as on example, inlet ducts 200 and exhaust ducts 202 extend approximately the depth of grain column 22 between forward interior wall 58 and rearward interior wall 60.

In the arrangement shown, as one example, inlet ducts 200 of lower drying section 28 are configured to facilitate airflow from cool duct 90 through forward interior wall 58 into lower drying section 28. In this example arrangement, exhaust ducts 202 of lower drying section 28 are configured to facilitate airflow from lower drying section 28 through rearward interior wall 60 to recovery plenum 72.

In the arrangement shown, inlet ducts 200 of middle drying section 26 are configured to facilitate airflow from lower heat plenum 70 through forward interior wall 58 into middle drying section 26. In this example arrangement, exhaust ducts 202 of middle drying section 26 are configured to facilitate airflow from middle drying section 26 through rearward interior wall 60 to recovery plenum 72.

In the arrangement shown, inlet ducts 200 of upper drying section 24 are configured to facilitate airflow from upper heat plenum 76 through rearward interior wall 60 into upper drying section 24. In this example arrangement, exhaust ducts 202 of upper drying section 24 are configured to facilitate airflow from upper drying section 24 through forward interior wall 58 to exhaust plenum 78.

In the arrangement shown, as one example, inlet ducts 200 and exhaust ducts 202 are arranged in rows or tiers that extend between exterior side walls 62 with each inlet duct 200 or exhaust duct 202 spaced from the inlet duct 200 or exhaust duct 202 on either side and/or above or below. In the arrangement shown, as one example, inlet ducts 200 are arranged in rows 210, and exhaust ducts 202 are arranged in rows 212. In the arrangement shown, as one example, drying sections are formed of alternating rows 210 inlet ducts 200 and rows 212 of exhaust ducts 202.

However, any other configuration or arrangement of inlet ducts 200 and exhaust ducts 202 is hereby contemplated for use such as rows or tiers having an alternating pattern of an inlet duct 200 next to an exhaust duct 202 or any other arrangement or configuration.

Also, in the arrangement shown, as one example, the rows 210 of inlet ducts 200 and rows 212 exhaust ducts 202 are laterally offset from one another. That is, the inlet ducts 200 are laterally offset from the exhaust ducts 202 rows 212. Or, said another way, inlet ducts 200 of one row 210 are not positioned directly above or below the exhaust ducts 202 of adjacent rows 212. Instead, inlet ducts 200 of one row 210 are positioned between the exhaust ducts 202 of vertically adjacent row 212, and similarly exhaust ducts 202 of one row 212 are positioned between the inlet ducts 200 of adjacent rows 210. This lateral offsetting of vertically adjacent inlet ducts 200 and exhaust ducts 202 helps to cause mixing airflow through the grain in grain column 22. This lateral offsetting of vertically adjacent inlet ducts 200 and exhaust ducts 202 helps to cause the grain to move within grain column 22 as it travels vertically through the grain column 22 by engaging the offset inlet ducts 200 and exhaust ducts 202. This mixing of the airflow as well as mixing of the grain in grain column 22 facilitates consistent and gentle drying of the grain.

Bridge Reducing Outermost Ducts 218:

In the arrangement shown, as one example, outward most ducts 218 in drying sections 24, 26, and 28 are configured to reduce bridging of grain. While mixed flow configuration have many benefits, it has been observed that mixed flow grain dryers 10 may suffer from plugging or bridging in some situations. Plugging is a serious problem because plugged grain reduces the throughput of the grain dryer system 10. Plugging is also a serious problem because the plugged grain can get overly dried, and once dried, can catch fire, thereby causing damage to the grain dryer system 10.

It has been discovered that, in some instances, mixed flow grain dryer systems suffer from bridging of grain or grain clumps between exterior side walls 62 and the outward-most positioned inlet ducts 200 and/or exhaust ducts 202. This is because, in this area the grain is funneled through an ever-narrowing space between ducts 200, 202 and exterior side wall 62.

Bridged grain can occur for any number of reasons such as grain clumps, particularly moist grain, sticky grain, dirty grain, large grain, roughness on the walls 204 of ducts 200, 202, roughness on the exterior side wall 62, foreign objects in the grain, or any combination of these factors, among countless other reasons. When bridged grain occurs, this stops the flow of grain at the outward sides of mixed flow grain dryer system 10. When bridged grain occurs, this can require manual removal of the bridged grain or other maintenance to remove the bridged grain and/or prevent bridged grain from occurring again. In some instances, when bridging occurs, the bridged grain is heated longer than intended and may catch fire, which can damage or destroy the grain dryer system 10 and/or cause injury or death, loss of drying capacity, loss of grain, among other problems.

In the example arrangement shown, outward most ducts 218 of mixed flow grain dryer system 10 are configured to reduce the bridging of grain between exterior side walls 62 and the outward most ducts 218. Outward most ducts 218 are formed of any suitable size, shape, and design and are configured to allow the flow of heated air through the grain in drying sections 24, 26, and 28 of grain column 22 so as to facilitate gentle heating and drying of the grain while also inhibiting bridging of grain between exterior side walls 62 and the outward most ducts 218. In the arrangement shown, as one example, outward most ducts 218 have an elongated shape extending between rearward interior wall 60 and forward interior wall 58. That is, outward most ducts 218, like all other inlet ducts 200 and exhaust ducts 202 extend across the grain column and connect to interior wall 60 and forward interior wall 58.

In this example arrangement, when viewed from the end, outward most ducts 218 are generally triangular-shaped members having an outer wall 222 and an inner wall 224, which are jointed together at a peak 226. In this example arrangement, inner wall 224 extends outward and downward from the peak 226 at an angle away from exterior side wall 62, similar to walls 204 of the other inlet ducts 200 and exhaust ducts 202.

In this example arrangement, outer walls 222 of outward most ducts 218 extend in a generally vertical downward fashion from peak 226. That is, this outward most duct 218 includes an outer wall 222 that extends in approximate parallel spaced relation to the interior facing side of exterior side wall 62 that defines the end of grain column 22 between forward interior wall 58 and rearward interior wall 60. In this way, the use of outward most duct 218 does not form a narrowing area, or pinch-point, between the outward most duct 218 and the interior facing surface of exterior side wall 62 of grain column 22. In this way, grain does not have an opportunity to compact or clump up and form bridged grain. As such, in this way, system 10 provides an improved mixed flow grain dryer that is not susceptible of getting plugged by bridged grain between the outward most duct 218 and exterior side wall 62.

It is contemplated that ducts 200/202 in rows 210/212 may be separated from each other greater or lesser distances which may be uniform or non-uniform than that shown. Furthermore, it is contemplated that outward most ducts 218 may be separated from exterior side walls 62 of grain columns by greater or lesser distances which may be different from the distance separating ducts 200/202 in rows 210/212.

Although the arrangements are primarily shown and described with reference to system 10 having an outward most duct 218 with a vertical extending outer wall 222, embodiments are not so limited. Rather, it is contemplated that in some various arrangements, outer wall 222 of outward most duct 218 may be oriented at various slopes (e.g., a slope configured to prevent grain from bridging between outer wall 222 and exterior side wall 62 of grain column 22). For example, in some arrangements, outward most duct 218 has an inner wall 224 having a first slope (e.g., that is approximately the same as the slope of walls 204 of other ducts 200/202) and an outer wall 222 having a second slope that is greater than the first slope. The increased second slope of outer wall 222 helps to inhibit bridging of grain.

In the arrangement shown, as one example, inlet ducts 200 and exhaust ducts 202 are arranged in alternating horizontal rows 210 of inlet ducts 200 and horizontal rows 212 of exhaust ducts 200. In this example arrangement, due to the particular spacing and dimensions, all outward most ducts 218 happen to be in the rows 210 of inlet ducts 200. However, embodiments are not so limited. Rather, it is contemplated that, in various arrangements, the outward most ducts 218 may be configured to operate as inlet ducts 200, as exhaust ducts 202, or with some outward most ducts 218 operating as inlet ducts 200 and others operating as exhaust ducts 202.

Furthermore, it is contemplated that, in various embodiments, inlet ducts 200 and exhaust ducts 202 may be positioned in any arrangement along forward interior wall 58 and rearward interior wall 60. For instance, as one alternative example, inlet ducts 200 and exhaust ducts 202 may be arranged in alternating columns of inlet ducts 200 and columns of exhaust ducts 202.

Additional details regarding systems for reducing bridging of grain in grain dryers are discussed in U.S. patent application Ser. No. 16/990,257, titled BRIDGE REDUCING MIXED-FLOW GRAIN DRYER WITH CROSS- FLOW VACUUM COOL HEAT RECOVERY SYSTEM and filed Aug. 11, 2020, which is hereby fully incorporated by reference herein.

Unloading System 40:

In the arrangement shown, as one example, mixed-flow grain dryer system 10 includes an unloading system 40 connected to receive dry drain from lower drying section 28 of grain column 22. Unloading system 40 is formed of any suitable size, shape, and design and is configured to facilitate unloading of dry (or partially dry) grain from system 10. Any form of a grain unloading system is hereby contemplated for use as unloading system 40. In the arrangement shown, as one example, unloading system 40 includes a metering section 230, a funnel section 232, an unloading section 234, and a drive section 236.

Metering Section 230:

In this example arrangement, dried grain is provided from the lower end of lower drying section 28 of grain column 22 to metering section 230. Metering section 230 is formed of any suitable size, shape, and design and is configured to control the speed at which grain is metered out of the lower end of grain column 22 for unloading. In the arrangement shown, as one example, metering section 230 extends between forward interior wall 58, rearward interior wall 60 and exterior side walls 62 from a lower end of lower drying section 28 of grain column 22 to an upper end of funnel section 232.

Upper Baffles 240 and Lower Baffles 242:

In the arrangement shown, as one example, metering section 230 includes a set of upper baffles 240, secondary upper baffles 274, and lower baffles 242 positioned in metering section 230 a distance upstream from metering rolls 246 of metering section 230. Upper baffles 240 and lower baffles 242 are formed of any suitable size, shape, and design and are configured to direct grain from grain column 22 to metering rolls 246 in such a way that the grain is evenly removed from grain column 22.

In the arrangement shown, as one example, upper baffles 240, secondary upper baffles 274, and lower baffles 242 extend between exterior side walls 62 in segments 254 joined together at cross supports 256. In this example arrangement, upper baffles 240 have a generally planar shape extending downward at either a forward or rearward angle from an upper end 260 to a lower end 262. In this example arrangement, upper baffles 240 form a generally triangular shape. In this example arrangement, secondary upper baffles 274 have a generally planar shape oriented at an angled and are spaced a distance away from upper baffles 240 thereby providing a space between upper baffles 240 and secondary upper baffles 274 for the passage of grain. Upper baffles 240 and secondary upper baffles 274 serve to direct grain to lower baffles 242.

In this example arrangement, lower baffles 242 include vertical members 266, extending downward from lower end 262 of upper baffles 240 to metering rolls 246, and include an oppositely positioned angled members 268 extending downward at an angle from an upper end 270 to a lower end 272 toward vertical members 266. In this way, vertical members 266 and angled members 268 of lower baffles 242 operate to funnel or to direct grain from upper baffles 240 to metering rolls 246.

In one or more arrangements, lower baffles 242 are configured to provide access to metering rolls 246 to facilitate cleaning and maintenance. Lower baffles 242, are formed of any suitable size, shape, and design and are configured to provide such access to metering rolls 246. In the arrangement shown, as one example, the angled members 268 of lower baffles 242 include a fixed upper portion 276 and a hinged lower portion 278 configured to provide access to metering rolls 246.

In this example arrangement, hinged lower portion 278 is connected to fixed upper portion 276 by a hinged connection 280 at an upper end 282 of hinged lower portion 278. Hinged connection 280 permits hinged lower portion 278 to swing downward to an open position, which provides access to a metering roll 246, and swing upward to a closed position, where lower end 272 of angled member 268 and hinged lower portion 278 is positioned adjacent to metering roll 246. In this example arrangement, in the closed position, hinged lower portion 278 extends downward from hinged connection 280 at approximately the same angle as fixed upper portion 276. In this example arrangement, hinged lower portion 278 includes a flange 284 at lower end 272 that extends a distance horizontally, or at any other angle, when hinged lower portion 278 is in the closed position. Flange 284 operates with metering roll 246 to facilitate controlled metering of grain and helps to hold grain from falling out of metering section 230 until the grain is moved by metering roll 246. Any other configuration is hereby contemplated for use as metering section 230.

In this example arrangement, metering section 230 includes latches 288 connected to the hinged lower portion 278. Latches 288 are formed of any suitable size, shape, and design and are configured to facilitate holding of hinged lower portion 278 in the closed position during operation while permitting hinged lower portion 278 to be intentionally moved to the open position to facilitate maintenance and cleaning. In the arrangement, shown, as one example, latches 288 are formed of what is known as an over center latch. In this example arrangement, when a hinged lower portion 278 is moved to the closed position by extending the latch, the latch 288 can be slightly moved past the full extended position to a point where weight or forces exerted on the latch 288 by hinged lower portion 278 hold the latch in place. In this manner, hinged lower portion 278 is prevented from being unintentionally moved to the open position during operation. Or, said another way, an over center latch is a form of a mechanical arrangement having a plurality of mechanical linkages that cooperate with one another to facilitate opening and closing while locking in a closed position. An over center latch is one type of draw latch and includes at least two parts—a latch and a keeper—which are mounted on opposite sides of a closure and pull both sides together during the closing action. An over center latch is designed so that the arm that latches onto the keeper extends over the pin on which the lever rotates. This ensures that it stays latched while under tension, so that it cannot be opened by accident. In this way, the use of an over center latch for latch 288 ensures that hinged lower portion 278 may be opened and closed while remaining locked in a closed position, while allowing for quick, easy and secure operation.

Metering Rolls 246:

Metering rolls 246 are formed of any suitable size, shape, and design and are configured to control the speed at which grain is metered out of the lower end of grain column 22 and into the unloading system 40 for discharge out of the system 10. In the arrangement shown, as one example, metering rolls 246 include a shaft 248 having flights 250. As the metering rolls 246 rotate, a quantity of grain is discharged to be unloaded. As such, the faster the metering rolls 246 rotate the faster the grain is discharged. The faster the metering rolls 246 rotate, the faster the grain moves through grain columns 22. In the arrangement shown, upper baffles 240 and lower baffles 242 and metering rolls 246 extend a length between exterior side walls 62 in approximate parallel spaced alignment. In this way, upper baffles 240 and lower baffles 242 and metering rolls 246 may extend the entire length of grain column 22, thereby facilitating even and smooth unloading of grain from grain column 22 along the entire length of grain column 22, and thereby facilitating consistent drying of grain in all parts of grain column 22.

In the arrangement shown, as one example, upper baffles 240 and lower baffles 242 direct grain to four metering rolls 246. In this example arrangement, one metering roll 246 is positioned at each side of two upper baffles 240. However, it is hereby contemplated that arrangements may use any number of metering rolls 246 as well as upper baffles 240 and lower baffles 242, which can provide operational advantages, such as independent control, increased or decreased capacity, increased or decreased holding time, and increased discharge rates, among other advantages.

In operation, when grain in grain column 22 reaches unloading system 40 the grain is directed by upper baffles 240 towards lower baffles 242 and metering roll 246, which eventually meters the grain out of metering section 230. The shape, position and configuration of upper baffles 240 and lower baffles 242 and metering rolls 246 serves to ensure that grain is evenly removed from grain column 22. As metering rolls 246 rotate, and as each flight 250 rotates, an amount of grain is moved passed lower baffle 242 and metering roll 246.

Funnel Section 232:

Funnel Section 232 is formed of any suitable size, shape, and design and is configured to receive grain metered by metering section 230 and transport the grain to unloading section 234 under the force of gravity. In the arrangement shown, as one example, forward interior wall 58 and rearward interior wall 60 extend downward and toward each other in funnel section 232 to form a funnel that directs grain to unloading section 234 under the force of gravity.

Unloading Section 234:

Unloading section 234 is formed of any suitable size, shape, and design, and is configured to facilitate discharge of grain at a single discharge point 294. In one or more arrangements, unloading section 234 is an auger system configured to move grain outward toward the single discharge point. In this example, unloading section includes a shaft 296 (not shown) with flighting 298 (not shown) that extends across the lower end of system 10. The shaft 296 with flighting 298 is connected to drive section 236, which is configured to rotate the shaft 296 with flighting 298. Rotation of the shaft 296 moves grain in the unloading section to the single discharge point 294.

However, embodiments are not so limited. Alternatively, in one or more arrangements, unloading section 234 may utilize various other mechanism to move grain to the single discharge point, including but not limited to, for example, a belt, a conveyor, a paddle sweep and/or a drag chain system. Any other structure or configuration of a system for loading grain is hereby contemplated for use as unloading section 234.

Drive Section 236:

Drive section 236 is formed of any size, shape, and design, and is configured to drive shaft 296 of unloading section 234 and metering rolls 246 in metering section 230. In the arrangement shown, as one example, drive section 236 includes a motor 300 operably connected to drive shaft 296 of unloading section 234 and metering rolls 246 in metering section 230 by a mechanical assembly 302. Mechanical assembly 302 is formed of any suitable size, shape, and design and is configured to transfer rotational energy from motor 300 to unloading section 234 and metering section 230. Mechanical assembly 302 may include various components to facilitate operably connection between motor 300 and unloading section 234 and metering section 230 including, but not limited to, for example, sprockets, chains, pulleys, belts, drive shafts, and/or gears.

In the arrangement shown, as one example, motor 300 is operably connected to a drive shaft 306 of unloading section 234 by a first assembly 308 of sprockets and chains (not shown). In this example arrangement, a gearbox 310 is operably connected to drive shaft 306 by a second assembly 312 of sprockets and chains. In this example arrangement, gearbox 310 transfers rotational energy to metering rolls 246 in metering section 230 by a third assembly 314 of sprockets and chains.

In one or more arrangements, mechanical assembly 302 is adjustable to adjust the speed at which metering rolls 246 are operated relative to the speed at which unloading section 234 is operated. In this example arrangement, the third assembly 314 of sprockets and chains includes a sprocket assembly 316 having a first larger sprocket rotated by a first chain connected to gearbox 310 and a second smaller sprocket that drives a second chain to rotate metering rolls 246. In this manner, the speed of metering rolls 246 is adjusted. By adjusting sizes of the sprockets of sprocket assembly 316, the speed at which metering rolls 246 are operated relative to the speed at which unloading section 234 is operated may be adjusted. In this way, by selecting the appropriate gear ratios of sprocket assembly 316, unloading section 234 and metering section 230 are ensured to operate at appropriate and complimentary speeds to one another. Also, by connecting metering section 230 and unloading section 234 in this way (with connecting chains) this ensures that metering section 230 and unloading section 234 simultaneously rotate and when the speed of one of metering section 230 and unloading section 234 speeds up or slows down the other of metering section 230 and unloading section 234 speeds up or slows down in like fashion. However, it is contemplated that mechanical assembly 302 may use any other mechanism to cause, control and adjust the speed at which metering rolls 246 are operated relative to the speed at which unloading section 234 is operated.

Air Handling System 42:

In the arrangement shown, as one example, system 10 includes an air handling system 42. Air handling system 42 is formed of any suitable size, shape, and design and is configured to facilitate air movement through system 10.

In use, air handling system 42 is fluidly connected to the plenums 34 of system 10. In this example arrangement, air handling system 42 is configured to apply a vacuum to recovery plenum 72, thereby sucking or pulling outside air into and through intake plenum 68, through cool duct 90 and heat duct 92, through lower heat plenum 70, through middle drying section 26 and through lower drying section 28 of grain column 22. Air handling system 42 utilizes a fan system 44, which pulls air into recovery plenum 72 and blows it under pressure through duct 118, through upper heat plenum 76, through upper drying section 24, through exhaust plenum 78 and out of system 10 to vent it outside. As lower and ambient temperature air is drawn through the middle drying section 26 and lower drying section 28 of grain column 22, the air cools the hot grain from upper drying section 24 and is itself warmed. This airflow also helps to carry away moisture from the heated grain thereby further drying the grain. The result is that the air that is recovered by recovery plenum 72 is warmed thereby harnessing the principles of heat conservation, and recycling heat. This means that the air that is blown into the upper heat plenum 76 must be warmed to a lesser degree than it would otherwise be if ambient air was used. As the air blown into upper heat plenum 76 needs to be heated to a lesser degree to achieve the desired temperature due to the conservation of heat and recycling of heat, less energy is used to dry the grain thereby making the system more energy efficient. Another benefit is that the temperature of the grain that is discharged from lower drying section 28 of grain column 22 is cooler than it would otherwise be if it were not passed through the middle drying section 26 and lower drying section 28. This is particularly true when running the system 10 in a heat and cool mode where ambient temperature air is passed though lower drying section 28. Cooling the grain before it is stored improves the stability of the grain in long term storage and requires fewer handling precautions.

More specifically, in the arrangement shown, as one example, air handling system 42 is connected to the rearward exterior wall 104 of system 10. More specifically, in this example arrangement air handling system 42 is connected to both the recovery plenum 72 as well as to duct 118.

Fan System 44:

In the arrangement shown, as one example, air handling system 42 includes a fan system 44. Fan system 44 is formed of any suitable size shape and design and is configured to provide airflow through the system 10. Fan system 44 may be formed of a single fan, or a plurality of fans or any other device that facilitates airflow. In the arrangement shown, as one example, fan system 44 includes a fan 320 positioned on an interior side of rearward exterior wall 104 within recovery plenum 72. In this example arrangement, the fan 320 is driven by a motor 322 positioned on an exterior side of rearward exterior wall 104. By positioning motor 322 outside of system 10, motor 332 is not exposed to grain dust, heat, moisture and the other environmental aspects of recovery plenum 72, which are harsh on equipment, particularly motors. By positioning motor 322 outside of recovery plenum 72, motor 322 requires less frequent cleaning and/or maintenance and a specialized motor, such as a sealed motor or an explosion proof motor, is not needed. This reduces the cost of motor 322, reduces the maintenance required, improves the ease of maintenance and repair on motor 322 and extends the life of motor 322.

In the arrangement shown, as one example, fan system 44 is fluidly connected to recovery plenum 72 at its input end. In this way, when in operation, fan system 44 applies a vacuum to recovery plenum 72, which has the effect of pulling or drawing ambient air into intake plenum 68, through cool duct 90 and through heat duct 92 and lower heat plenum 70, and through middle drying section, 26 and lower drying section 28.

In the arrangement shown, fan system 44 is fluidly connected to duct 118 and upper heat plenum 76 at its output end. In this way, when in operation, fan system 44 applies pressurized airflow to duct 118 and upper heat plenum 76, which has the effect of forcing air into upper heat plenum 76, through upper drying section 24 of grain column 22, and through exhaust plenum 78, where it is vented to the environment.

Heating System 46:

In the arrangement shown, as one example, air handling system 42 includes a heating system 46. Heating system 46 is formed of any suitable size shape and design and is configured to provide heat to heat the airflow through the system 10. In the arrangement shown, as one example, heating system 46 includes a first heating element 326 positioned in heat duct 92 and a second heating element 328 positioned in duct 118. In this example arrangement, heating element 326 is configured to heat air to a lower heated temperature as it passes through heat duct 92 on its way to lower heat plenum 70. In this example arrangement, heating element 328 is configured to heat air to a higher heated temperature as it passes through duct 118 on its way to upper heat plenum 76. In various arrangements, heating elements 326 and 328 may be burners, electric heating coils, and/or any other means for generating heat. This arrangement having heating element 326 associated with lower heat plenum 70 and heating element 328 associated with upper heat plenum 76 allows for independent temperatures in lower heat plenum 70 and upper heat plenum 76, which allows for finer and more-precise control of drying the grain.

Particulate Removal System 52:

In one or more arrangements, air handling system 42 includes a particulate removal system 52 (not shown). Particulate removal system 52 is formed of any suitable size shape and design and is configured to remove particulates from air moving through system 10. As some illustrative example, in some various different arrangements, particulate removal system 52 may include various different means and/or method for removing particulates from air including but not limited to, for example, filters, centrifugal separators, and/or any other means or method for removing particulates from air. Particulates in air (e.g., dust and debris of grain) are particularly susceptible to catching fire which can result in explosion or other damage to grain dryer system 10. By reducing particulates, risk of fire or explosion can be reduced.

In one or more arrangements, system 10 may include a particulate removal system 52 incorporated into fan system 44 to remove particulates before air is heated by heating system 46. As an illustrative example, in one or more arrangements, particulate removal system 52 is a centrifugal separator incorporated into a squirrel fan of fan system 44. For instance, in one or more arrangements, particulate removal system 52 may include a scoop or skimmer positioned on an outer edge of the fan scroll proximate to rearward exterior wall 104, where particulate congregates during operation due to centripetal force.

Additionally or alternatively, in one or more arrangements, particulate removal system 52 may include openings 340 (not shown) in upper divider 110, which separates upper heat plenum 76 from recovery plenum 72. Operation of fan system 44 or air handling system 42 pull some air from upper heat plenum 76 through the openings 340 back into recovery plenum. In this manner, build-up of particulate in upper heat plenum, where there is a risk the particulates may catch fire, can be reduced. Openings 340 are formed of any suitable size shape and design and are configured to permit air and heavier particulate to fall through openings 340 during operation. As one example, in one or more arrangements, openings 340 may be provided by expanded metal grating used to form a portion of upper divider 110. As another example, in one or more arrangements, openings 340 may additionally or alternatively be formed as louvers in upper divider.

Support System 50:

In the arrangement shown, as one example, mixed-flow grain dryer system 10 includes a support system 50. Support system 50 is formed of any suitable size, shape, and design and is configured to provide strength and rigid support for system 10. In the arrangement shown, as one example, support system 50 is formed of a plurality of horizontal, vertical, and diagonal supports 332. Supports 332 are formed of any suitable size, shape, and design and extend between and connect structural components of the system 10 to one another.

In Operation:

In operation, wet grain is supplied to the input 170 of loading system 30. The as the motor 176 operates this causes the shaft 172 with fighting 174 to rotate which causes the grain to evenly move across the upper end of the wet hold section 32. When the wet grain is added to the wet hold section 32 the grain travels down under the force of gravity. As the grain exits the lower end of the wet hold section 32 the grain enters the upper end of the upper drying section 24 of grain column 22.

As the grain travels down the upper drying section 24, the grain encounters the triangular-shaped inlet ducts 200 and exhaust ducts 202 that extend across the grain columns 22. As the grain encounters the triangular-shaped inlet ducts 200 and exhaust ducts 202, the grain is directed to one side or the other due to the triangular-shaped inlet ducts 200 and exhaust ducts 202. It is worth noting that due to the off-set position of vertically adjacent inlet ducts 200 and exhaust ducts 202, the grain is moved laterally within the grain column 22. This lateral movement, as the grain moves vertically, has a mixing effect on the grain, which facilitates gentle and even heating of the grain.

As the grain passes through the upper drying section 24 of grain column 22, higher temperature air is blown by the air handling system 42 into the upper heat plenum 76. This heated pressurized airflow applied to upper heat plenum 76 is forced through the inlet ducts 200 that connect with upper heat plenum 76. This heated pressurized airflow is then forced along the length of inlet ducts 200 until it passes out the open lower end of inlet ducts 200 and into the grain in upper drying section 24 grain column 22. This heated pressurized airflow passes through the grain in the grain column 22, thereby heating and drying the grain. This heated pressurized airflow finds its way into the open lower end of exhaust ducts 202. This heated pressurized air is then forced along the length of exhaust ducts 202 until it passes out the open exterior end of exhaust ducts 202, at which point it is vented through exhaust plenum 78 and to the outside atmosphere. As the air travels through exhaust plenum 78, fines, debris, dust, and/or other contaminants are captured within exhaust plenum 78, thereby preventing them from venting to the surrounding environment. In one arrangement, exhaust vent 124 of exhaust plenum 78 may be covered by a filter member to further capture fines, debris, dust and other contaminants prior to venting them to the surrounding environment.

As the grain travels downward and passes the lower end of upper drying section 24, the grain enters middle drying section 26 of grain column 22. As the grain passes through the middle drying section 26 of grain column 22, air handling system 42 creates a vacuum in recovery plenum 72, which pulls air outward from middle drying section 26 through exhaust ducts 202 connected to recovery plenum 72. This flow of air causes lower temperature heated air to be pulled from lower heat plenum 70 into middle drying section 26 through inlet ducts 200 connected to lower heat plenum 70. This lower temperature air passes through the grain in the middle drying section 26 of grain column 22, thereby slowly heating the grain and pulling away moisture. This air is pulled by air handling system 42 through exhaust ducts 202 and into recovery plenum 72.

As the grain travels downward and passes the lower end of middle drying section 26, the grain enters lower drying section 28 of grain column 22. As the grain passes through the lower drying section 28 of grain column 22, the vacuum in recovery plenum 72 pulls air from lower drying section 28 through exhaust ducts 202 in lower drying section 28, which are connected to recovery plenum 72. This flow of air causes air to be pulled from cool duct 90. In various modes of operation, air in cool duct 90 may be lower temperature air from lower heat plenum 70, ambient temperature air from intake plenum 68, or a mixture of the ambient and lower temperature air. This air passes through the grain in lower drying section 28 of grain column 22, thereby pulling away moisture from the grain. When ambient air is pulled through the grain, the grain is also cooled. This air is pulled by air handling system 42 through exhaust ducts 202 and into recovery plenum 72, where it is mixed with air pulled from middle drying section 26. As previously discussed, this air is heated to a higher temperature and provided to upper heat plenum 76 for drying grain in upper drying section 24.

As the grain travels downward and passes the lower end of lower drying section 28 of grain column 22, the grain enters the unloading system 40. As the grain travels down the grain column 22 of unloading system 40, the grain engages and is directed by upper baffles 240 and lower baffles 242 and secondary upper baffles 274 in metering section 230 toward metering rolls 246. As the metering rolls 246 rotate, grain is dispensed to the funnel section 232 which directs grain to the unloading section 234. As the shaft 296 with flighting 298 of unloading section 234 is rotated, the grain is moved along the length of the system 10 until it passes out the discharge point 294. In this way, grain is heated and dried in an efficient and gentle manner using system 10.

Heat and Cool Mode Configuration:

One of the substantial benefits of the enclosed mixed flow grain dryer system 10 is its ability to convert between a heat and cool mode configuration and a full heat mode configuration. In a heat and cool mode configuration, ambient temperature air or air of a cooler temperature is passed through the lower drying section 28 and air heated to a first temperature, which is higher than the ambient temperature or cooler temperature, is passed through the middle drying section 26.

In this heat and cool mode configuration, ambient air is pulled into intake plenum 68. A portion of this air is pulled through lower airflow diverter 128 and through cool duct 90. This air is then pulled through the inlet ducts 200 and exhaust ducts 202 associated with the lower drying section 28 and into recovery plenum 72.

Simultaneously, in this heat and cool mode configuration, a portion of the ambient air is pulled into through intake plenum 68, through heat duct 92 and into lower heat plenum 70. As this air is pulled through intake plenum 68, through heat duct 92 and into lower heat plenum 70 this air is heated to a first heated temperature as it passes by and/or through first heating element 326 associated with heat duct 92. This air heated to a first heated temperature is pulled through lower heat plenum 70 and around divider 88. This air is then pulled through the inlet ducts 200 and exhaust ducts 202 associated with the middle drying section 26 and into recovery plenum 72.

In this heat and cool mode configuration, lower airflow diverter 128 and upper airflow diverter 130 are complimentarily configured. That is, the doors 132 of upper airflow diverter 130 are moved to a fully closed position. That is the doors 132 are raised into a closed position and locked in place. In this configuration, upper airflow diverter 130 prevents air from flowing from lower heat plenum 70 through upper airflow diverter 130 and into cool duct 90 and through lower drying section 28. Instead, essentially all of the air that flows through heat duct 92 and through lower heat plenum 70 flows through middle drying section 26.

In this heat and cool mode configuration, the airflow adjustment member 146 or louvers 146 of lower airflow diverter 128 are adjusted to the proper amount of openness, which conversely means that they are adjusted to the proper amount of closedness, to allow for the proper amount of air to flow through the lower airflow diverter 128 and into cool duct 90. Said another way, airflow adjustment member 146 or louvers 146 of lower airflow diverter 128 can be used to adjust the amount that airflow into cool duct 90 is restricted. This proper adjustment of the amount of airflow through lower airflow diverter 128 causes the proper amount of air to flow through heat duct 92 and into lower heat plenum 70. This adjustment of airflow adjustment member 146 or louvers 146 of lower airflow diverter 128 causes the desired amount of air to flow through cool duct 90 and through lower drying section 28. For example, by adjusting airflow adjustment member 146 or louvers 146 to make openings through lower airflow diverter 128 smaller, airflow into cool duct 90 is restricted, which decreases airflow through lower drying section 28 and increases airflow through middle drying section 26. Conversely, by adjusting airflow adjustment member 146 or louvers 146 to make openings through lower airflow diverter 128 larger, airflow into cool duct 90 is increased, which increases airflow through lower drying section 28 and decreases airflow through middle drying section 26.

In this way the adjustment of airflow adjustment member 146 or louvers 146 of lower airflow diverter 128 allows for balancing of airflow through middle drying section 26 and lower drying section 28. Notably, airflow adjustment member 146 or louvers 146 of lower airflow diverter 128 may be infinitely adjusted to achieve optimal performance. In one arrangement, the slidable gate 148 is slid to cover or uncover the appropriate portion of louvers 146 to achieve the desired amount of openness (and conversely closedness) of louvers 146 of lower airflow diverter 128. Notably, also in this configuration, the doors 132 of lower airflow diverter 128 are raised into a closed position and locked in place. In this configuration, lower airflow diverter 128 allows a portion of air flowing into intake plenum 68 to pass through cool duct 90 and a portion to pass through heat duct 92. To achieve optimum drying results, in one or more arrangements, louvers 146 are infinitely adjustable to facilitate adjustment of the amount of airflow that passes through from intake plenum 68 to cool duct 90 relative to the amount of airflow that passes through from intake plenum 68 to heat duct 92.

Full Heat Mode Configuration:

One of the substantial benefits of the enclosed mixed flow grain dryer system 10 is its ability to convert between a heat and cool mode configuration and a full heat mode configuration. In a full heat mode configuration, air heated to a first temperature, which is higher than the ambient temperature or cooler temperature air is passed through the lower drying section 28 and is passed through the middle drying section 26.

In this full heat mode configuration, ambient air is pulled into intake plenum 68. Airflow adjustment member 146 or louvers 146 of lower airflow diverter 128 are essentially closed and therefore essentially all of this ambient air is prevented from passing through cool duct 90. Instead the ambient air is pulled into through intake plenum 68, through heat duct 92 and into lower heat plenum 70.

As air is pulled through intake plenum 68, through heat duct 92 and into lower heat plenum 70 this air is heated to a first heated temperature as it passes by and/or through first heating element 326 associated with heat duct 92. This air heated to a first heated temperature is pulled through lower heat plenum 70 and around divider 88.

A portion of this air passes through upper airflow diverter 130, which is in an open position. This air is then pulled through the inlet ducts 200 and exhaust ducts 202 associated with the middle drying section 26 as well as lower drying section 28 and into recovery plenum 72.

In this full heat mode configuration, lower airflow diverter 128 and upper airflow diverter 130 are complimentarily configured. That is, the doors 132 of upper airflow diverter 130 are moved to a fully open position. That is the doors 132 are lowered into an open position and in one arrangement locked in place. In this configuration, upper airflow diverter 130 allows the free flow of air from lower heat plenum 70 through upper airflow diverter 130 and into cool duct 90 and through lower drying section 28. Simultaneously, a portion of the air that flows through heat duct 92 and through lower heat plenum 70 flows through middle drying section 26.

In this full heat mode configuration, the airflow adjustment member 146 or louvers 146 of lower airflow diverter 128 are adjusted to a full closed position, thereby essentially preventing ambient air from passing into cool duct 90. This proper adjustment of the amount of airflow through lower airflow diverter 128 (which is essentially no airflow through lower airflow diverter 128 in a full heat mode configuration) causes the proper amount of air to flow through heat duct 92 and into lower heat plenum 70 and then into cool duct 90. In this way the adjustment of airflow adjustment member 146 or louvers 146 of lower airflow diverter 128 to a closed position in association with opening the doors 132 of upper airflow diverter 128 allows for running the system in a full heat mode configuration.

In this way, the enclosed mixed flow grain dryer system 10 may run in either a full heat mode configuration or a heat and cool mode configuration. Furthermore, the enclosed mixed flow grain dryer system 10 may be easily and quickly converted between a full heat mode configuration and a heat and cool mode configuration with only a few adjustments. In this way, this provides enclosed mixed flow grain dryer system 10 with added versatility and usability.

Although some arrangement may be described with reference to louvers 146 of lower airflow diverter 128 being fully closed when upper airflow diverter 130 is opened, the embodiments are not so limited. Rather, it is contemplated that in one or more arrangements, louvers 146 of lower airflow diverter 128 may be open or partially open so as to cause a mixture of ambient air from intake plenum 68 and heated air from lower heat plenum 70 to flow through cool duct 90 and into lower drying section 28.

Control System 400:

In one or more arrangements, system 10 includes a control system 400. Control system 400 is formed of any suitable any suitable size, shape, and design and is configured to control operation of the mixed-flow grain dryer system 10, or more specifically controls operation of the loading system 30, the unloading system 40, the air handling system 42 including fan system 44, heating system 46, and any other electrical and/or controllable component of the system 10 in response to signals from sensors 406 and/or input from user interface 404. In the arrangement shown, as one example, control system 400 includes a control circuit 402, user interface 404, and/or sensors 406, among other components.

Control Circuit 402:

Control circuit 402 is formed of any suitable size, shape, design and is configured to control operation of components of system 10 to facilitate drying of grain in response to signals of sensors 406 and/or input from user interface 404. In the arrangement shown, as one example, implementation, control circuit 402 includes a communication circuit 410, a processing circuit 412, and a memory 414 having software code 416 or instructions that facilitates the operation of system 10.

Processing circuit 412 may be any computing device that receives and processes information and outputs commands according to software code 416 stored in memory 414. For example, in some various arrangements, processing circuit 412 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 414. Memory 414 may be any form of information storage such as flash memory, ram memory, dram memory, a hard drive, and/or any other form of memory.

Processing circuit 412 and memory 414 may be formed of a single combined unit. Alternatively, processing circuit 412 and memory 414 may be formed of separate but electrically connected components. Alternatively, processing circuit 412 and memory 414 may each be formed of multiple separate but communicatively connected components.

Software code 416 is any form of instructions or rules that direct processing circuit 412 how to receive, interpret and respond to information to operate as described herein. Software code 416 or instructions is stored in memory 414 and accessible to processing circuit 412. As an illustrative example, in one or more arrangements, software code 416 or instructions may configure processing circuit 412 control circuit 402 to monitor sensors 406 and perform various preprogramed actions in response to signals from sensors 406 satisfying one or more trigger conditions.

As some illustrative examples, some actions that may be initiated by control circuit 402 in response to signals from sensors 406 and/or user input from user interface 404 include but are not limited to, for example, controlling operation and/or speed of loading system 30, the unloading system 40, the air handling system 42 including fan system 44, heating system 46, and/or other components of system 10, and/or sending notifications to users (e.g., emails, SMS, push notifications, automated phone call, social media messaging, and/or any other type of messaging).

Communication circuit 410 is formed of any suitable size, shape, design, technology, and in any arrangement and is configured to facilitate communication with devices to be controlled, monitored, and/or alerted by control system 400. In one or more arrangements, as one example, communication circuit 410 is a includes a transmitter (for one-way communication) or transceiver (for two-way communication). In various arrangements, communication circuit 410 may be configured to communicate with various components of system 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.14.4/ZigBee, ZWave, GSM/EDGE, UMTS/HSPA+/HSDPA, CDMA, LTE, FM/VHF/UHF networks, and/or any other communication protocol, technology or network.

Sensors 406:

Sensors 406 are formed of any suitable size, shape, design, technology, and in any arrangement configured to measure conditions pertaining to grain processed by system 10. In some various arrangements, sensors 406 may include but are not limited to, for example, optical sensors, grain detection sensors, temperature sensors, humidity sensors, moisture sensors, chemical sensors, particulate sensors, and/or any other type of sensor. In some arrangements, sensors 406 may be formed along with control circuit 402 as a single combined unit. Alternatively, in some arrangements, sensors 406 and control circuit 402 may be communicatively connected by communication circuit 410.

User Interface 404:

User Interface is formed of any suitable size, shape, design, technology, and in any arrangement and is configured to facilitate user control and/or adjustment of various components of system 10. In one or more arrangements, as one example, user interface 404 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, and/or any other form of user input. Optionally, in one or more arrangements, user interface includes a display (not shown). Display is formed of any suitable size, shape, design, technology, and in any arrangement and is configured to facilitate display information of settings, sensor readings, time elapsed, and/or other information pertaining to drying of grain. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to control circuit 402. For example, in one or more arrangements, operation of control circuit 402 may customized using a smartphone or other computing device that is communicatively connected to the control circuit 402 (e.g., via Bluetooth, WIFI, and/or the internet). From the above discussion it will be appreciated that the mixed-flow grain dryer system presented herein improves upon the state of the art. More specifically, and without limitation, it will be appreciated in one or more arrangements a mixed-flow grain dryer system is presented that: is efficient to use; facilitates heat recovery; reduces fuel consumption; is gentle on grain; does not damage grain when drying; does not overly dry grain; facilitates cooling of grain before it is discharged; evenly dries grain; does not have variability of grain quality across the grain column; does not have variability of moisture across the grain column; can be precisely controlled; that provides optimum results; that facilitates unloading of grain from the dryer at a single point; is relatively compact; is relatively inexpensive; can be used with all kinds of grain; that minimizes maintenance; requires less cleaning; is cleaner to use than prior art systems; is safe to use; reduces the potential for a fire; requires less air pressure; requires less airflow; provides improved grain quality; is easy to use; has a robust design; is high quality; and/or reduces bridging of grain among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A mixed flow grain dryer system, comprising:

a grain column;

the grain column having an upper drying section, a middle drying section, and a lower drying section;

an intake plenum;

the intake plenum configured to receive ambient air;

a lower heat plenum;

the lower heat plenum configured to receive heated air of a first temperature and provide the heated air the of first temperature to the middle drying section;

a duct arrangement;

the duct arrangement configured to convert between a heat and cool mode and a full heat mode;

wherein when in a heat and cool mode the duct arrangement transfers ambient air from the intake plenum to the lower drying section;

wherein when in a full heat mode the duct arrangement transfers the heated air of the first temperature to the lower drying section.

2. The system of claim 1, wherein when in the heat and cool mode:

higher temperature heated air is moved into the upper drying section from an upper heat plenum;

lower temperature heated air is moved into the middle drying section from the lower heat plenum; and ambient temperature air is moved into the lower drying section.

3. The system of claim 1, wherein when in the full heat mode:

higher temperature heated air is moved into the upper drying section from an upper heat plenum;

lower temperature heated air is moved into the middle drying section from the lower heat plenum; and lower temperature heated air is moved into the lower drying section from the lower heat plenum.

4. The system of claim 1, further comprising:

a recovery plenum;

the recovery plenum configured to receive air from the middle drying section and the lower drying section;

an upper heat plenum;

the upper heat plenum configured to receive air from the recovery plenum;

the upper heat plenum configured to receive heated air of a second temperature;

wherein the upper heat plenum is configured to transmit heated air of a second temperature to the upper drying section.

5. The system of claim 1, wherein the ambient air is of an ambient temperature.

6. The system of claim 1, further comprising an exhaust plenum;

wherein the exhaust plenum is configured to receive air from the upper drying section and vent it outside.

7. The system of claim 1, further comprising:

an unloading system;

the unloading system operably connected to receive grain from the grain column;

the unloading system having a metering section;

the unloading system having an unloading section;

wherein the metering section includes one or more metering rolls;

wherein the one or more metering rolls are configured to meter grain out of the grain column.

8. The system of claim 7, wherein the one or more metering rolls are configured to meter grain out of the grain column so as to facilitate continuous flow operation of the mixed flow grain dryer system.

9. The system of claim 7, wherein at least one of the one or more metering rolls has a first baffle associated with the at least one metering roll;

the first baffle having a hinged portion configured to move from a closed position to an open position to facilitate access to the first metering roll;

the first baffle having an over center latch configured to facilitate movement of the hinged portion between the open position and the closed position.

10. The system of claim 7, wherein the unloading system is operably connected to the one or more metering rolls so that operation of the unloading system causes the metering rolls to rotate.

11. A mixed flow grain dryer system, comprising:

a grain column;

the grain column having an upper drying section, a middle drying section, and a lower drying section;

an intake plenum;

the intake plenum configured to receive ambient air;

a first airflow path from the intake plenum to the middle drying section, and a second airflow path from the intake plenum to the lower drying section;

a first airflow diverter in the second airflow path;

the first airflow diverter configured to restrict airflow in the second airflow path and thereby increase airflow through the first airflow path;

wherein the first airflow diverter is adjustable to adjust an amount that airflow in the second airflow path is restricted.

12. A mixed flow grain dryer system, comprising:

a grain column;

the grain column having an upper drying section, a middle drying section, and a lower drying section;

an intake plenum;

the intake plenum configured to receive ambient air;

a first airflow path from the intake plenum to the middle drying section, and a second airflow path from the intake plenum to the lower drying section;

a first airflow diverter in the second airflow path;

the first airflow diverter configured to restrict airflow in the second airflow path and thereby increase airflow through the first airflow path;

wherein the first airflow diverter is configured to balance airflow between the lower drying section and the middle drying section.

13. The system of claim 11, wherein the first airflow diverter is adjustable to adjust an amount that airflow in the second airflow path is restricted and thereby adjust the airflow in the first airflow path relative to airflow in the second airflow path.

14. The system of claim 11, wherein air is heated in the first airflow path.

15. The system of claim 11, further comprising a second airflow diverter positioned between the first airflow path and the second airflow path;

wherein when the second airflow diverter is opened and the first airflow diverter is closed, heated air in the first airflow path is directed into the lower drying section and into the middle drying section.

16. A mixed flow grain diver system, comprising:

a grain column;

the grain column having an upper drying section, a middle drying section, and a lower drying section;

an intake plenum;

the intake plenum configured to receive ambient air;

a first airflow path from the intake plenum to the middle drying section, and a second airflow path from the intake plenum to the lower drying section;

a first airflow diverter in the second airflow path;

the first airflow diverter configured to restrict airflow in the second airflow path and thereby increase airflow through the first airflow path;

wherein the first airflow diverter has a plurality of louvers through which air flows from the intake plenum through the lower drying section.

17. The system of claim 11, wherein the first airflow diverter has a plurality of louvers through which air flows from the intake plenum through the lower drying section;

wherein the plurality of louvers are adjustable between an open position, a closed position, and an infinite number of positions in between the open position and the closed position.

18. The system of claim 11, wherein the first airflow diverter is adjustable between an open position, a closed position, and an infinite number of positions in between the open position and the closed position.

19. The system of claim 11, further comprising:

a recovery plenum;

the recovery plenum configured to receive air from the middle drying section and the lower drying section;

an upper heat plenum;

the upper heat plenum configured to receive a second heated air;

wherein the upper heat plenum facilitates the second heated air to move through the upper drying section.

20. The system of claim 11, further comprising:

an unloading system;

the unloading system operably connected to receive grain from the grain column;

the unloading system having a metering section;

the unloading system having an unloading section;

wherein the metering section includes one or more metering rolls;

wherein the one or more metering rolls are configured to meter grain out of the grain column.

21. The system of claim 20, wherein the one or more metering rolls are configured to meter grain out of the grain column so as to facilitate continuous flow operation of the mixed flow grain dryer system.

22. The system of claim 20, wherein the unloading system is operably connected to the one or more metering rolls so that operation of the unloading system causes the metering rolls to rotate.

23. The system of claim 20, wherein the plurality of metering rolls extend in parallel spaced relation to one another between the forward wall and the rearward wall.

24. The system of claim 20, wherein at least one of the one or more metering rolls has a first baffle associated with the at least one metering roll;

the first baffle having a hinged portion configured to move from a closed position to an open position to facilitate access to the at least one metering roll;

the first baffle having an over center latch configured to facilitate movement of the hinged portion between the open position and the closed position.

25. The system of claim 24, wherein the over center latch is configured to hold the hinged portion in the closed position when latched.

26. A mixed flow grain dryer system, comprising:

a grain column;

the grain column having an upper drying section, a middle drying section, and a lower drying section;

a duct arrangement;

the duct arrangement configured to receive ambient air;

wherein the duct arrangement facilitates movement of air through the lower drying section;

a lower heat plenum;

the lower heat plenum configured to receive a first heated air;

wherein the lower heat plenum facilitates movement of the first heated air through the middle drying section;

an upper airflow diverter;

the upper airflow diverter positioned between the lower heat plenum and the duct arrangement;

wherein the upper airflow diverter has one or more doors;

wherein the one or more doors are configured to direct air from the lower heat plenum into the duct arrangement when open;

wherein the one or more doors are configured to prevent air from the lower heat plenum from entering into the duct arrangement when closed.

27. The system of claim 26, further comprising:

a lower airflow diverter;

wherein the duct arrangement is configured to receive the ambient air through the lower airflow diverter;

wherein the lower airflow diverter is configured to balance airflow between the lower drying section and the middle drying section.

28. The system of claim 26, further comprising:

a recovery plenum;

the recovery plenum configured to receive air from the middle drying section and the lower drying section;

an upper heat plenum;

the upper heat plenum configured to receive a second heated air;

wherein the upper heat plenum facilitates the second heated air to move through the upper drying section.

29. A mixed flow grain dryer system, comprising:

a grain column;

the grain column having an upper drying section, a middle drying section, and a lower drying section;

the grain column having a set of intake ducts configured to move air into the grain column;

the grain column having a set of exhaust ducts configured to move air out from the grain column;

a lower heat plenum;

wherein the lower heat plenum is configured to direct heated air through into the middle drying section through a first subset of the set of intake ducts that are fluidically connected to the lower heat plenum;

a cool duct;

the cool duct configured to direct ambient temperature air into the lower drying section through a second subset of the set of intake ducts that are fluidically connected to the cool duct;

wherein the ambient temperature air flows into the cool duct through an upper airflow diverter;
wherein the upper airflow diverter is movable between a plurality of positions to facilitate adjustment of the number of the set of intake ducts that are fluidically connected to the lower heat plenum and adjustment of the number of the set of intake ducts that are fluidically connected to the cool duct.

30. The system of claim 29, further comprising:
a lower airflow diverter;
wherein the ambient temperature air flows into the cool duct through the lower airflow diverter;
wherein the lower airflow diverter includes one or more passageways;
wherein the upper airflow diverter includes one or more passageways;
wherein when the one or more passageways of the lower airflow diverter are opened and the one or more passageways of the upper airflow diverter are closed, the ambient temperature air is directed into the lower drying section and heated air is directed into the middle drying section;
wherein when the one or more passageways of the lower airflow diverter are closed and the one or more passageways of the upper airflow diverter are opened, heated air is directed into the lower drying section and middle drying section.

31. The system of claim 29, further comprising:
an intake plenum;
the intake plenum configured to receive the ambient temperature air;
a heat duct;
the heat duct configured to allow air to move from the intake plenum to the lower heat plenum.

32. The system of claim 29, further comprising:
a recovery plenum;
the recovery plenum configured to receive air from the middle drying section and the lower drying section;
a fan duct;
an upper heat plenum;
wherein the fan duct is configured to allow air to move from the recovery plenum to the upper heat plenum;
wherein the upper heat plenum is configured to allow air to move from the fan duct to the upper drying section; and
an exhaust plenum;
the exhaust plenum configured to allow air to move from the upper drying section to vent outside.

33. The system of claim 29, further comprising:
an unloading system;
the unloading system operably connected to a lower end of the grain column;
the unloading system having a metering section;
the unloading system having an unloading section;
wherein the metering section includes a plurality of metering rolls;
wherein the plurality of metering rolls are configured to meter grain out of the grain column.

34. The system of claim 33, wherein the plurality of metering rolls includes four metering rolls.

35. The system of claim 33, wherein the plurality of metering rolls are configured to meter grain out of the grain column so as to facilitate continuous flow operation of the mixed flow grain dryer system.

36. The system of claim 33, wherein the plurality of metering rolls extend in parallel spaced relation to one another.

37. The system of claim 33, wherein the unloading system is operably connected to the plurality of metering rolls so that operation of the unloading system causes the metering rolls to rotate.

38. The system of claim 29, further comprising:
an unloading system;
the unloading system operably connected to a lower end of the grain column;
the unloading system having a metering section;
the metering section having a first metering roll;
the first metering roll having a first baffle associated with the first metering roll;
the first baffle having a hinged portion configured to move from a closed position to an open position to facilitate access to the first metering roll;
the first baffle having an over center latch configured to facilitate movement of the hinged portion between the open position and the closed position.

39. The system of claim 38, wherein the over center latch is configured to hold the hinged portion in the closed position when latched.

40. The system of claim 38, wherein the first metering roll is configured to meter grain out of the grain column so as to facilitate continuous flow operation of the mixed flow grain dryer system.

41. The system of claim 38, wherein the first metering roll extends in parallel spaced relation to a forward wall and a rearward wall of the lower drying section.

42. A mixed flow grain dryer system, comprising:
a grain column;
the grain column having an upper drying section, a middle drying section, and a lower drying section;
an intake plenum;
the intake plenum configured to receive ambient air;
a lower heat plenum;
a heat duct;
the heat duct configured to allow air to move from the intake plenum to the lower heat plenum;
wherein the lower heat plenum is configured to allow air to move through the middle drying section;
a cool duct;
the cool duct configured to allow air to move from the intake plenum to the lower drying section;
a first airflow diverter;
the first airflow diverter separating the cool duct from the intake plenum;
the first airflow diverter having a plurality of louvers through which air flows from the intake plenum into the cool duct;
a recovery plenum; the recovery plenum configured to receive air from the middle drying section and the lower drying section;
a fan duct;
an upper heat plenum;
wherein the fan duct is configured to allow air to move from the recovery plenum to the upper heat plenum;
wherein the upper heat plenum is configured to allow air to move from the fan duct to the upper drying section; and
an exhaust plenum;
the exhaust plenum configured to allow air to move from the upper drying section to vent outside.

43. The system of claim 42, further comprising a heating system,
the heating system having a first heating element associated with the heat duct;

wherein the first heating element is configured to heat air to be passed through the lower heat section;

the heating system having a second heating element associated with the fan duct wherein the second heating element is configured to heat air to be passed through the upper heat plenum.

44. The system of claim 42, wherein the first airflow diverter has a plurality of louvers through which air flows from the intake plenum into the cool duct;

wherein the plurality of louvers are adjustable between an open position, a closed position, and an infinite number of positions in between the open position and the closed position.

45. The system of claim 42, wherein the first airflow diverter includes one or more doors that are configured to open and close.

46. The system of claim 42, further comprising:

a second airflow diverter;

the second airflow diverter separating the cool duct from the lower heat plenum;

the second airflow diverter having one or more doors that are configured to open and close;

wherein the one or more doors are configured to direct air from the lower heat plenum to the cool duct when open;

wherein the one or more doors are configured to prevent air from the lower heat plenum from entering the cool duct when closed.

* * * * *